US012701220B2

(12) United States Patent
Deng et al.

(10) Patent No.: US 12,701,220 B2
(45) Date of Patent: Aug. 4, 2026

(54) METHOD, APPARATUS, AND MEDIUM FOR VIDEO PROCESSING

(71) Applicants:Beijing Bytedance Network Technology Co., Ltd., Beijing (CN); Bytedance Inc., Los Angeles, CA (US)

(72) Inventors: Zhipin Deng, Beijing (CN); Kai Zhang, Los Angeles, CA (US); Li Zhang, Los Angeles, CA (US)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/913,797

(22) Filed: Oct. 11, 2024

(65) Prior Publication Data

US 2025/0039362 A1 Jan. 30, 2025

Related U.S. Application Data

(63) Continuation of application No. PCT/CN2023/087627, filed on Apr. 11, 2023.

(30) Foreign Application Priority Data

Apr. 11, 2022 (WO) ................ PCT/CN2022/086117

(51) Int. Cl.
*H04N 19/00* (2014.01)
*H04N 19/105* (2014.01)
*H04N 19/176* (2014.01)

(52) U.S. Cl.
CPC ......... *H04N 19/105* (2014.11); *H04N 19/176* (2014.11)

(58) Field of Classification Search
CPC ...................................................... H04N 19/00
See application file for complete search history.

(56) References Cited

U.S. PATENT DOCUMENTS

2020/0045309 A1 2/2020 Xu et al.
2020/0296360 A1 9/2020 Han et al.
(Continued)

FOREIGN PATENT DOCUMENTS

CN 109891882 A 6/2019
CN 113853783 A 12/2021
(Continued)

OTHER PUBLICATIONS

International Search Report for PCT/CN2023/086038, mailed on Jul. 13, 2023, 4 pages.
(Continued)

*Primary Examiner* — Maryam A Nasri
(74) *Attorney, Agent, or Firm* — Astute IP Law Group

(57) ABSTRACT

Embodiments of the present disclosure provide a solution for video processing. A method for video processing is proposed. The method comprises: determining, for a conversion between a current video block of a video and a bitstream of the video, motion information of the current video block, the current video block being coded with at least one of: an intra block copy (IBC) merge mode, an IBC with template matching mode, or an intra template matching mode; updating the motion information based on a constraint, the constraint indicating a target value of a component of the motion information; and performing the conversion based on the updated motion information.

20 Claims, 17 Drawing Sheets

(56) References Cited

U.S. PATENT DOCUMENTS

| | | |
|---|---|---|
| 2022/0053211 A1 | 2/2022 | Huo et al. |
| 2022/0086447 A1 | 3/2022 | Xu et al. |
| 2022/0103852 A1 | 3/2022 | Wang et al. |
| 2023/0254477 A1 | 8/2023 | Li et al. |
| 2024/0022710 A1* | 1/2024 | Zhao .................... H04N 19/176 |
| 2024/0137515 A1* | 4/2024 | Zhao .................... H04N 19/186 |
| 2024/0179302 A1* | 5/2024 | Rufitskiy ............. H04N 19/105 |
| 2024/0205386 A1 | 6/2024 | Robert et al. |
| 2025/0039458 A1* | 1/2025 | Gao ..................... H04N 19/132 |

FOREIGN PATENT DOCUMENTS

| | | |
|---|---|---|
| CN | 113924783 A | 1/2022 |
| EP | 3139607 A1 | 3/2017 |
| WO | 2021023262 A1 | 2/2021 |
| WO | 2022022299 A1 | 2/2022 |

OTHER PUBLICATIONS

International Search Report for PCT/CN2023/087627, mailed on Jul. 13, 2023, 4 pages.

Li et al., "CE8-related: IBC modifications", Joint Video Experts Team (JVET) of ITU-T SG 16 WP 3 and ISO/IEC JTC 1/SC 29/WG 11 15th Meeting: Gothenburg, SE, Jul. 3-12, 2019, JVET-O0127-v3, Jul. 12, 2019 (Jul. 12, 2019), pp. 1-11.

Xu et al., "Bitstream conformance with a virtual IBC buffer concept", Joint Video Experts Team (JVET) of ITU-T SG 16 WP 3 and ISO/IEC JTC 1/SC 29/WG 11 15th Meeting: Gothenburg, SE, Jul. 3-12, 2019, JVET-O1170-v1, Jul. 12, 2019 (Jul. 12, 2019), pp. 1-8.

Zhu et al., "CE8-related: Default chroma IBC mode with vertical/horizontal copying", Joint Video Experts Team (JVET) of ITU-T SG 16 WP 3 and ISO/IEC JTC 1/SC 29/WG 11 15th Meeting: Gothenburg, SE, Jul. 3-12, 2019, JVET-O0565-v3, Jul. 12, 2019 (Jul. 12, 2019), pp. 1-3.

Coban et al., "Algorithm description of Enhanced Compression Model 7 (ECM 7)", Joint Video Experts Team (JVET) of ITU-T SG 16 WP 3 and ISO/IEC JTC 1/SC 29 28th Meeting, Mainz, DE, Oct. 20-28, 2022, Document: JVET-AB2025, 62 pages.

Extended European Search Report received for European Application No. 23784254.7, mailed on Jan. 26, 2026, 12 pages.

Seregin et al., "EE2: Summary Report on Enhanced Compression beyond VVC capability", EE coordinators, Joint Video Experts Team (JVET) of ITU-T SG 16 WP 3 and ISO/IEC JTC 1/SC 29 25th Meeting, by teleconference, Jan. 12-21, 2022, Document: JVET-Y0024-v1, 21 pages.

Sole et al., "HEVC Screen Content Coding Core Experiment 1 (SCCE1): Intra Block Copying Extensions", SCCE coordinators, Joint Collaborative Team on Video Coding (JCT-VC) of ITU-T SG 16 WP3 and ISO/IEC JTC1/SC29/WG 11 17th Meeting: Valencia, ES, 27 Mar.-Apr. 4, 2014, Document: JCTVC-Q1121, 2014, 5 pages.

Zhang et al., "EE2-3.13: Modifications of IBC Merge/AMVP List Construction", Bytedance Inc., Joint Video Experts Team (JVET) of ITU-T SG 16 WP 3 and ISO/IEC JTC 1/SC 29 25th Meeting, by teleconference, Jan. 12-21, 2022, Document: JVET-Y0058, 3 pages.

Non-Final Office Action for U.S. Appl. No. 18/907,309, mailed on Oct. 7, 2025, 9 pages.

Chen et al., "Improvements on Intra Block Copy in Natural Content Video Coding", 2015 IEEE International Symposium on Circuits and Systems (ISCAS), May 24, 2015, 4 pages.

Deng et al., "Non-EE2: Reconstruction-Recorded IBC for screen content coding", Joint Video Experts Team (JVET) of ITU-T SG 16 WP 3 and ISO/IEC JTC 1/SC 29, 26th Meeting, by teleconference, Apr. 20-29, 2022, Document JVET-Z00159-v1, Apr. 14, 2022, 3 pages.

Extended European Search Report for European Patent Application No. 23787706.3, mailed on Mar. 27, 2026, 13 pages.

Lin et al., "Non-EE2: IntraTMP with multiple modes", Qualcomm Incorporated, Joint Video Experts Team (JVET) of ITU-T SG 16 WP 3 and ISO/IEC JTC 1/SC 29, 29th Meeting, by teleconference, Jan. 11-20, 2023, Document: JVET-AC0198-v, Jan. 13, 2023, 3 pages.

Zhang et al., "Symmetric Intra Block Copy in Video Coding", 2015 IEEE International Symposium on Circuits and System (ISCAS), May 24, 2015, 4 pages.

\* cited by examiner

410

430

450

470

800

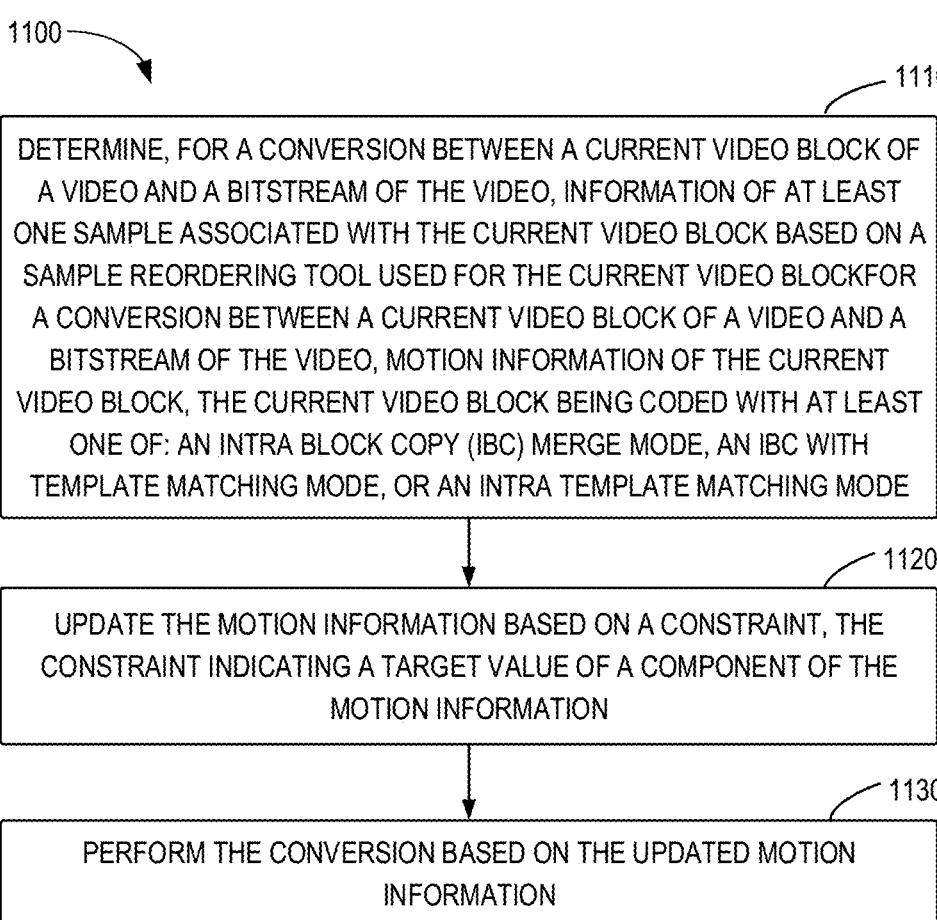

1100

1110

DETERMINE, FOR A CONVERSION BETWEEN A CURRENT VIDEO BLOCK OF A VIDEO AND A BITSTREAM OF THE VIDEO, INFORMATION OF AT LEAST ONE SAMPLE ASSOCIATED WITH THE CURRENT VIDEO BLOCK BASED ON A SAMPLE REORDERING TOOL USED FOR THE CURRENT VIDEO BLOCKFOR A CONVERSION BETWEEN A CURRENT VIDEO BLOCK OF A VIDEO AND A BITSTREAM OF THE VIDEO, MOTION INFORMATION OF THE CURRENT VIDEO BLOCK, THE CURRENT VIDEO BLOCK BEING CODED WITH AT LEAST ONE OF: AN INTRA BLOCK COPY (IBC) MERGE MODE, AN IBC WITH TEMPLATE MATCHING MODE, OR AN INTRA TEMPLATE MATCHING MODE

1120

UPDATE THE MOTION INFORMATION BASED ON A CONSTRAINT, THE CONSTRAINT INDICATING A TARGET VALUE OF A COMPONENT OF THE MOTION INFORMATION

1130

PERFORM THE CONVERSION BASED ON THE UPDATED MOTION INFORMATION

Fig. 11

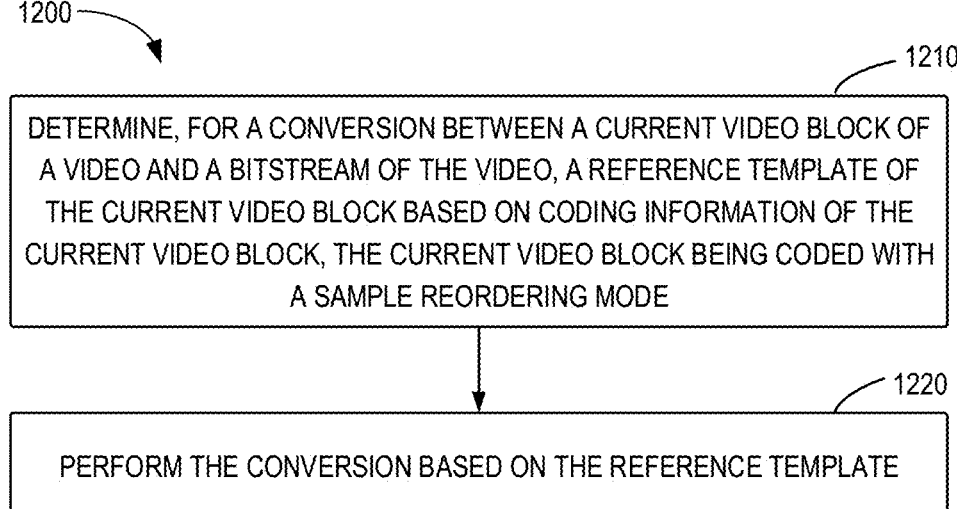

1200

1210

DETERMINE, FOR A CONVERSION BETWEEN A CURRENT VIDEO BLOCK OF A VIDEO AND A BITSTREAM OF THE VIDEO, A REFERENCE TEMPLATE OF THE CURRENT VIDEO BLOCK BASED ON CODING INFORMATION OF THE CURRENT VIDEO BLOCK, THE CURRENT VIDEO BLOCK BEING CODED WITH A SAMPLE REORDERING MODE

1220

PERFORM THE CONVERSION BASED ON THE REFERENCE TEMPLATE

Fig. 12

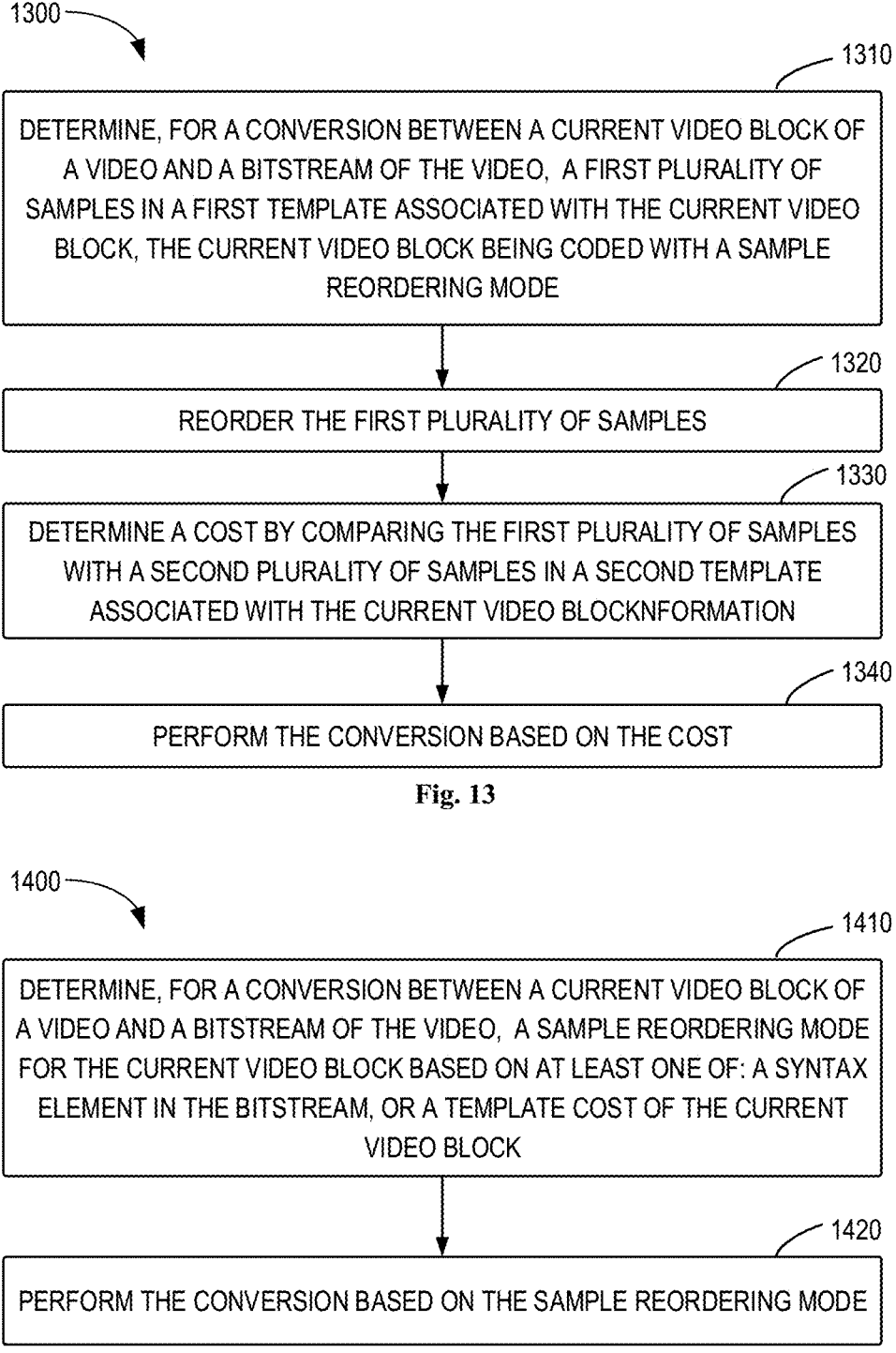

1300

1310

DETERMINE, FOR A CONVERSION BETWEEN A CURRENT VIDEO BLOCK OF A VIDEO AND A BITSTREAM OF THE VIDEO, A FIRST PLURALITY OF SAMPLES IN A FIRST TEMPLATE ASSOCIATED WITH THE CURRENT VIDEO BLOCK, THE CURRENT VIDEO BLOCK BEING CODED WITH A SAMPLE REORDERING MODE

1320

REORDER THE FIRST PLURALITY OF SAMPLES

1330

DETERMINE A COST BY COMPARING THE FIRST PLURALITY OF SAMPLES WITH A SECOND PLURALITY OF SAMPLES IN A SECOND TEMPLATE ASSOCIATED WITH THE CURRENT VIDEO BLOCKNFORMATION

1340

PERFORM THE CONVERSION BASED ON THE COST

DETERMINE, FOR A CONVERSION BETWEEN A CURRENT VIDEO BLOCK OF A VIDEO AND A BITSTREAM OF THE VIDEO, A SAMPLE REORDERING MODE FOR THE CURRENT VIDEO BLOCK BASED ON AT LEAST ONE OF: A SYNTAX ELEMENT IN THE BITSTREAM, OR A TEMPLATE COST OF THE CURRENT VIDEO BLOCK

1420

PERFORM THE CONVERSION BASED ON THE SAMPLE REORDERING MODE

METHOD, APPARATUS, AND MEDIUM FOR VIDEO PROCESSING

CROSS REFERENCE TO RELATED APPLICATIONS

This application is a continuation of International Application No. PCT/CN2023/087627, filed on Apr. 11, 2023, which claims the benefit of International Application No. PCT/CN2022/086117 filed on Apr. 11, 2022. The entire contents of these applications are hereby incorporated by reference in their entireties.

FIELD

Embodiments of the present disclosure relates generally to video coding techniques, and more particularly, to reference template determination.

BACKGROUND

In nowadays, digital video capabilities are being applied in various aspects of peoples' lives. Multiple types of video compression technologies, such as MPEG-2, MPEG-4, ITU-TH.263, ITU-TH.264/MPEG-4 Part 10 Advanced Video Coding (AVC), ITU-TH.265 high efficiency video coding (HEVC) standard, versatile video coding (VVC) standard, have been proposed for video encoding/decoding. However, coding efficiency of conventional video coding techniques is generally very low, which is undesirable.

SUMMARY

Embodiments of the present disclosure provide a solution for video processing.

In a first aspect, a method for video processing is proposed. The method comprises: determining, for a conversion between a current video block of a video and a bitstream of the video, motion information of the current video block, the current video block being coded with at least one of: an intra block copy (IBC) merge mode, an IBC with template matching mode, or an intra template matching mode; updating the motion information based on a constraint, the constraint indicating a target value of a component of the motion information; and performing the conversion based on the updated motion information. The method in accordance with the first aspect of the present disclosure updates the motion information for a current video block coded with an IBC merge or IBC with template matching based on the constraint, and thus the coding efficiency and coding effectiveness can be improved.

In a second aspect, another method for video processing is proposed. The method comprises: determining, for a conversion between a current video block of a video and a bitstream of the video, a reference template of the current video block based on coding information of the current video block, the current video block being coded with a sample reordering mode; and performing the conversion based on the reference template. The method in accordance with the second aspect of the present disclosure determines the reference template for the current video block coded with a sample reordering mode, and thus the coding efficiency and coding effectiveness can be improved.

In a third aspect, another method for video processing is proposed. The method comprises: determining, for a conversion between a current video block of a video and a bitstream of the video, a first plurality of samples in a first template associated with the current video block, the current video block being coded with a sample reordering mode; reordering the first plurality of samples; determining a cost by comparing the first plurality of samples with a second plurality of samples in a second template associated with the current video block; and performing the conversion based on the cost. The method in accordance with the third aspect of the present disclosure reorders a plurality of samples before determining a cost, and thus the coding efficiency and coding effectiveness can be improved.

In a fourth aspect, another method for video processing is proposed. The method comprises: determining, for a conversion between a current video block of a video and a bitstream of the video, a sample reordering mode for the current video block based on at least one of: a syntax element in the bitstream, or a template cost of the current video block; and performing the conversion based on the sample reordering mode. The method in accordance with the fourth aspect of the present disclosure determines a sample reordering mode for the current video block based on a syntax element or a template cost, and thus the coding efficiency and coding effectiveness can be improved.

In a fifth aspect, an apparatus for video processing is proposed. The apparatus comprises a processor and a non-transitory memory with instructions thereon. The instructions upon execution by the processor, cause the processor to perform a method in accordance with the first, second, third or fourth of the present disclosure.

In a sixth aspect, a non-transitory computer-readable storage medium is proposed. The non-transitory computer-readable storage medium stores instructions that cause a processor to perform a method in accordance with the first, second, third or fourth aspect of the present disclosure.

In a seventh aspect, another non-transitory computer-readable recording medium is proposed. The non-transitory computer-readable recording medium stores a bitstream of a video which is generated by a method performed by an apparatus for video processing. The method comprises: determining motion information of a current video block of the video, the current video block being coded with at least one of: an intra block copy (IBC) merge mode, an IBC with template matching mode, or an intra template matching mode; updating the motion information based on a constraint, the constraint indicating a target value of a component of the motion information; and generating the bitstream based on the updated motion information.

In an eighth aspect, a method for storing a bitstream of a video is proposed. The method comprises: determining motion information of a current video block of the video, the current video block being coded with at least one of: an intra block copy (IBC) merge mode, an IBC with template matching mode, or an intra template matching mode; updating the motion information based on a constraint, the constraint indicating a target value of a component of the motion information; generating the bitstream based on the updated motion information; and storing the bitstream in a non-transitory computer-readable recording medium.

In a ninth aspect, another non-transitory computer-readable recording medium is proposed. The non-transitory computer-readable recording medium stores a bitstream of a video which is generated by a method performed by an apparatus for video processing. The method comprises: determining a reference template of a current video block of the video based on coding information of the current video block, the current video block being coded with a sample reordering mode; and generating the bitstream based on the reference template.

3

4

In a tenth aspect, a method for storing a bitstream of a video is proposed. The method comprises: determining a reference template of a current video block of the video based on coding information of the current video block, the current video block being coded with a sample reordering mode; generating the bitstream based on the reference template; and storing the bitstream in a non-transitory computer-readable recording medium.

In an eleventh aspect, another non-transitory computer-readable recording medium is proposed. The non-transitory computer-readable recording medium stores a bitstream of a video which is generated by a method performed by an apparatus for video processing. The method comprises: determining a first plurality of samples in a first template associated with a current video block of the video, the current video block being coded with a sample reordering mode; reordering the first plurality of samples; determining a cost by comparing the first plurality of samples with a second plurality of samples in a second template associated with the current video block; and generating the bitstream based on the cost.

In a twelfth aspect, a method for storing a bitstream of a video is proposed. The method comprises: determining a first plurality of samples in a first template associated with a current video block of the video, the current video block being coded with a sample reordering mode; reordering the first plurality of samples; determining a cost by comparing the first plurality of samples with a second plurality of samples in a second template associated with the current video block; generating the bitstream based on the cost; and storing the bitstream in a non-transitory computer-readable recording medium.

In a thirteenth aspect, another non-transitory computer-readable recording medium is proposed. The non-transitory computer-readable recording medium stores a bitstream of a video which is generated by a method performed by an apparatus for video processing. The method comprises: determining a sample reordering mode for a current video block of the video based on at least one of: a syntax element in the bitstream, or a template cost of the current video block; and generating the bitstream based on the sample reordering mode.

In a fourteenth aspect, a method for storing a bitstream of a video is proposed. The method comprises: determining a sample reordering mode for a current video block of the video based on at least one of: a syntax element in the bitstream, or a template cost of the current video block; generating the bitstream based on the sample reordering mode; and storing the bitstream in a non-transitory computer-readable recording medium.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of the present disclosure, the same reference numerals usually refer to the same components.

FIG. 11 illustrates a flowchart of a method for video processing in accordance with some embodiments of the present disclosure;

FIG. 12 illustrates another flowchart of a method for video processing in accordance with some embodiments of the present disclosure;

FIG. 13 illustrates another flowchart of a method for video processing in accordance with some embodiments of the present disclosure;

FIG. 14 illustrates another flowchart of a method for video processing in accordance with some embodiments of the present disclosure.

Throughout the drawings, the same or similar reference numerals usually refer to the same or similar elements.

DETAILED DESCRIPTION

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Example Environment

Figure 1:
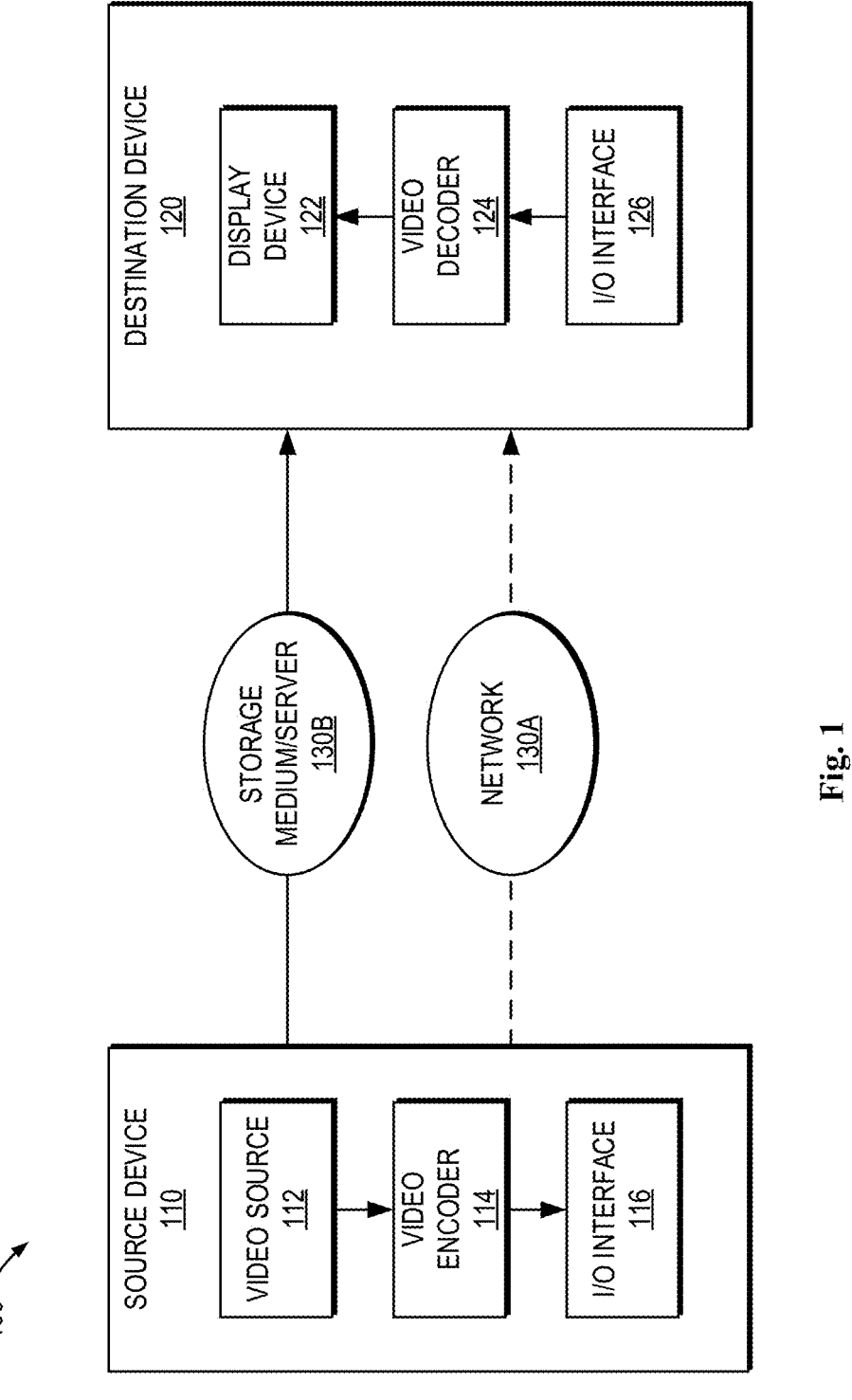
FIG. 1 illustrates a block diagram that illustrates an example video coding system, in accordance with some embodiments of the present disclosure.

FIG. 1 is a block diagram that illustrates an example video coding system 100 that may utilize the techniques of this disclosure. As shown, the video coding system 100 may include a source device 110 and a destination device 120. The source device 110 can be also referred to as a video encoding device, and the destination device 120 can be also referred to as a video decoding device. In operation, the source device 110 can be configured to generate encoded video data and the destination device 120 can be configured to decode the encoded video data generated by the source device 110. The source device 110 may include a video source 112, a video encoder 114, and an input/output (I/O) interface 116.

The video source 112 may include a source such as a video capture device. Examples of the video capture device include, but are not limited to, an interface to receive video data from a video content provider, a computer graphics system for generating video data, and/or a combination thereof.

The video data may comprise one or more pictures. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator and/or a transmitter. The encoded video data may be transmitted directly to destination device 120 via the I/O interface 116 through the network 130A. The encoded video data may also be stored onto a storage medium/server 130B for access by destination device 120.

The destination device 120 may include an I/O interface 126, a video decoder 124, and a display device 122. The I/O interface 126 may include a receiver and/or a modem. The I/O interface 126 may acquire encoded video data from the source device 110 or the storage medium/server 130B. The video decoder 124 may decode the encoded video data. The display device 122 may display the decoded video data to a user. The display device 122 may be integrated with the destination device 120, or may be external to the destination device 120 which is configured to interface with an external display device.

The video encoder 114 and the video decoder 124 may operate according to a video compression standard, such as the High Efficiency Video Coding (HEVC) standard, Versatile Video Coding (VVC) standard and other current and/or further standards.

Figure 2:
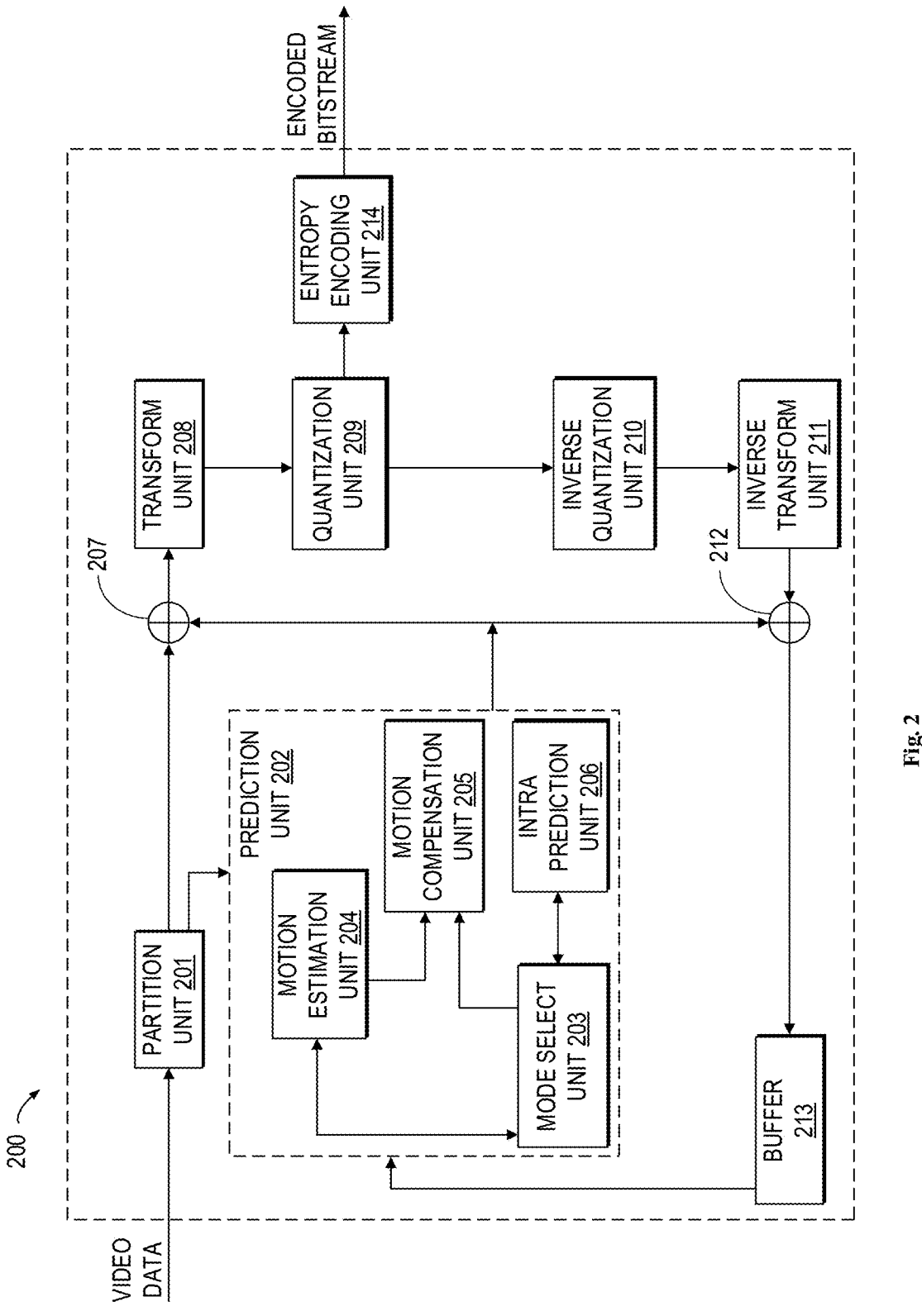
FIG. 2 illustrates a block diagram that illustrates a first example video encoder, in accordance with some embodiments of the present disclosure.

FIG. 2 is a block diagram illustrating an example of a video encoder 200, which may be an example of the video encoder 114 in the system 100 illustrated in FIG. 1, in accordance with some embodiments of the present disclosure.

The video encoder 200 may be configured to implement any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure.

In some embodiments, the video encoder 200 may include a partition unit 201, a prediction unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the prediction unit 202 may include an intra block copy (IBC) unit. The IBC unit may perform prediction in an IBC mode in which at least one reference picture is a picture where the current video block is located.

Furthermore, although some components, such as the motion estimation unit 204 and the motion compensation unit 205, may be integrated, but are represented in the example of FIG. 2 separately for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra-coded or inter-coded block to a residual generation unit 207 to generate residual block data and to a reconstruction unit 212 to reconstruct the encoded block for use as a reference picture. In some examples, the mode select unit 203 may select a combination of intra and inter prediction (CIIP) mode in which the prediction is based on an inter prediction signal and an intra prediction signal. The mode select unit 203 may also select a resolution for a motion vector (e.g., a sub-pixel or integer pixel precision) for the block in the case of inter-prediction.

To perform inter prediction on a current video block, the motion estimation unit 204 may generate motion information for the current video block by comparing one or more reference frames from buffer 213 to the current video block. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current video block based on the reference video block indicated by the motion information of the current video block.

Alternatively, in other examples, the motion estimation unit 204 may perform bi-directional prediction for the current video block. The motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder. Alternatively, in some embodiments, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

The intra prediction unit 206 may perform intra prediction on the current video block. When the intra prediction unit 206 performs intra prediction on the current video block, the intra prediction unit 206 may generate prediction data for the current video block based on decoded samples of other video blocks in the same picture. The prediction data for the current video block may include a predicted video block and various syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform processing unit 208 may generate one or more transform coefficient video blocks for the current video block by applying one or more transforms to a residual video block associated with the current video block.

After the transform processing unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the prediction unit 202 to produce a reconstructed video block associated with the current video block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When the entropy encoding unit 214 receives the data, the entropy encoding unit 214 may perform one or more entropy encoding operations to generate entropy encoded data and output a bitstream that includes the entropy encoded data.

Figure 3:
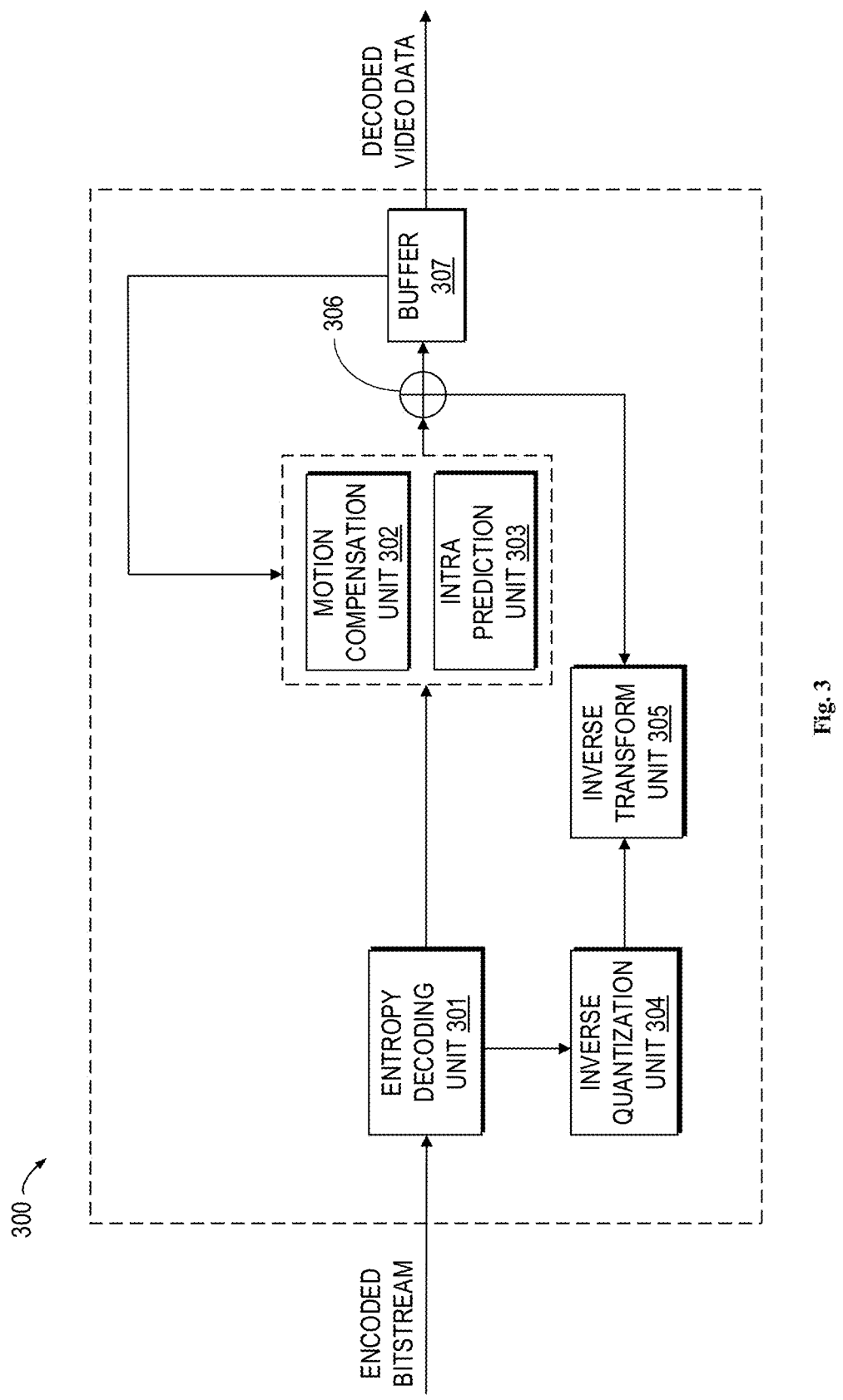
FIG. 3 illustrates a block diagram that illustrates an example video decoder, in accordance with some embodiments of the present disclosure.
Figures 4A, 4B, 4C, 4D:
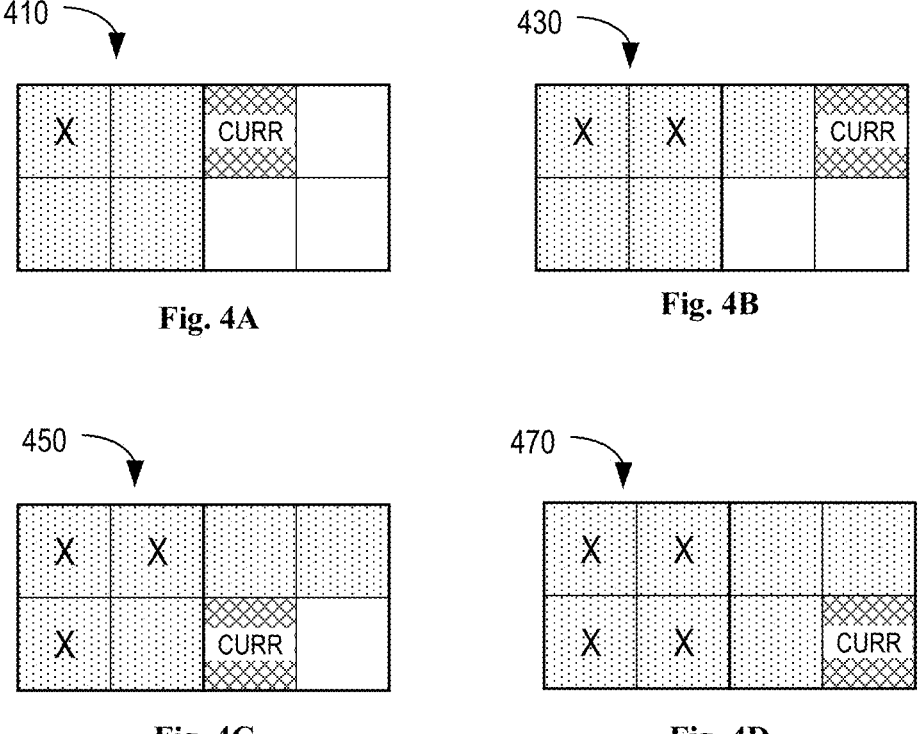
FIG. 4A-FIG. 4D illustrate current CTU processing order and available samples in current and left CTU, respectively.

FIG. 3 is a block diagram illustrating an example of a video decoder 300, which may be an example of the video decoder 124 in the system 100 illustrated in FIG. 1, in accordance with some embodiments of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure.

In the example of FIG. 3, the video decoder 300 includes an entropy decoding unit 301, a motion compensation unit 302, an intra prediction unit 303, an inverse quantization unit 304, an inverse transformation unit 305, and a reconstruction unit 306 and a buffer 307. The video decoder 300 may, in some examples, perform a decoding pass generally reciprocal to the encoding pass described with respect to video encoder 200.

The entropy decoding unit 301 may retrieve an encoded bitstream. The encoded bitstream may include entropy coded video data (e.g., encoded blocks of video data). The entropy decoding unit 301 may decode the entropy coded video data, and from the entropy decoded video data, the motion compensation unit 302 may determine motion information including motion vectors, motion vector precision, reference picture list indexes, and other motion information. The motion compensation unit 302 may, for example, determine such information by performing the AMVP and merge mode. AMVP is used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in the syntax elements.

The motion compensation unit 302 may use the interpolation filters as used by the video encoder 200 during encoding of the video block to calculate interpolated values for sub-integer pixels of a reference block. The motion compensation unit 302 may determine the interpolation filters used by the video encoder 200 according to the received syntax information and use the interpolation filters to produce predictive blocks.

The motion compensation unit 302 may use at least part of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra prediction unit 303 may use intra prediction modes for example received in the bitstream to form a prediction block from spatially adjacent blocks. The inverse quantization unit 304 inverse quantizes, i.e., de-quantizes, the quantized video block coefficients provided in the bitstream and decoded by entropy decoding unit 301. The inverse transform unit 305 applies an inverse transform.

The reconstruction unit 306 may obtain the decoded blocks, e.g., by summing the residual blocks with the corresponding prediction blocks generated by the motion compensation unit 302 or intra-prediction unit 303. If desired, a deblocking filter may also be applied to filter the decoded blocks in order to remove blockiness artifacts. The decoded video blocks are then stored in the buffer 307, which provides reference blocks for subsequent motion compensation/intra prediction and also produces decoded video for presentation on a display device.

Some exemplary embodiments of the present disclosure will be described in detailed hereinafter. It should be understood that section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1 BRIEF SUMMARY

This disclosure is related to video coding technologies. Specifically, it is about prediction, signalling, and reordering of samples in image/video coding. It may be applied to the existing video coding standard like HEVC, VVC, and etc. It may be also applicable to future video coding standards or video codec.

2 INTRODUCTION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by VCEG and MPEG jointly in 2015. The JVET meeting is concurrently held once every quarter, and the new video coding standard was officially named as Versatile Video Coding (VVC) in the April 2018 JVET meeting, and the first version of VVC test model (VTM) was released at that time. The VVC working draft and test model VTM are then updated after every meeting. The VVC project achieved technical completion (FDIS) at the July 2020 meeting.

2.1 Existing Screen Content Coding Tools 2.1.1 Intra Block Copy (IBC)

Intra block copy (IBC) is a tool adopted in HEVC extensions on SCC. It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector rounds to integer precision as well. When combined with AMVR, the IBC mode can switch between 1-pel and 4-pel motion vector precisions. An IBC-coded CU is treated as the third prediction mode other than intra or inter prediction modes. The IBC mode is applicable to the CUs with both width and height smaller than or equal to 64 luma samples.

At the encoder side, hash-based motion estimation is performed for IBC. The encoder performs RD check for blocks with either width or height no larger than 16 luma samples. For non-merge mode, the block vector search is performed using hash-based search first. If hash search does not return valid candidate, block matching based local search will be performed.

In the hash-based search, hash key matching (32-bit CRC) between the current block and a reference block is extended to all allowed block sizes. The hash key calculation for every position in the current picture is based on 4×4 subblocks. For the current block of a larger size, a hash key is determined to match that of the reference block when all the hash keys of all 4×4 subblocks match the hash keys in the corresponding reference locations. If hash keys of multiple reference blocks are found to match that of the current block, the block vector costs of each matched reference are calculated and the one with the minimum cost is selected.

In block matching search, the search range is set to cover both the previous and current CTUs.

At CU level, IBC mode is signalled with a flag and it can be signaled as IBC AMVP mode or IBC skip/merge mode as follows:

IBC skip/merge mode: a merge candidate index is used to indicate which of the block vectors in the list from neighboring candidate IBC coded blocks is used to predict the current block. The merge list consists of spatial, HMVP, and pairwise candidates.

IBC AMVP mode: block vector difference is coded in the same way as a motion vector difference. The block vector prediction method uses two candidates as predictors, one from left neighbor and one from above neighbor (if IBC coded). When either neighbor is not available, a default block vector will be used as a predictor. A flag is signaled to indicate the block vector predictor index.

2.1.1.1 IBC Reference Region

To reduce memory consumption and decoder complexity, the IBC in VVC allows only the reconstructed portion of the predefined area including the region of current CTU and some region of the left CTU. FIG. 4A-FIG. 4D illustrate example diagrams 410, 430, 450 and 470 of the reference region of IBC Mode, where each block represents 64×64 luma sample unit, respectively. FIG. 4A-FIG. 4D illustrate current CTU processing order and its available reference samples in current and left CTU.

Depending on the location of the current coding CU location within the current CTU, the following applies:

If current block falls into the top-left 64×64 block of the current CTU, then in addition to the already reconstructed samples in the current CTU, it can also refer to the reference samples in the bottom-right 64×64 blocks of the left CTU, using CPR mode. The current block can also refer to the reference samples in the bottom-left 64×64 block of the left CTU and the reference samples in the top-right 64×64 block of the left CTU, using CPR mode.

If current block falls into the top-right 64×64 block of the current CTU, then in addition to the already reconstructed samples in the current CTU, if luma location (0, 64) relative to the current CTU has not yet been reconstructed, the current block can also refer to the reference samples in the bottom-left 64×64 block and bottom-right 64×64 block of the left CTU, using CPR mode; otherwise, the current block can also refer to reference samples in bottom-right 64×64 block of the left CTU.

If current block falls into the bottom-left 64×64 block of the current CTU, then in addition to the already reconstructed samples in the current CTU, if luma location (64, 0) relative to the current CTU has not yet been reconstructed, the current block can also refer to the reference samples in the top-right 64×64 block and bottom-right 64×64 block of the left CTU, using CPR mode. Otherwise, the current block can also refer to the reference samples in the bottom-right 64×64 block of the left CTU, using CPR mode.

If current block falls into the bottom-right 64×64 block of the current CTU, it can only refer to the already reconstructed samples in the current CTU, using CPR mode.

This restriction allows the IBC mode to be implemented using local on-chip memory for hardware implementations.

2.1.1.2 IBC Interaction with Other Coding Tools

The interaction between IBC mode and other inter coding tools in VVC, such as pairwise merge candidate, history-based motion vector predictor (HMVP), combined intra/inter prediction mode (CIIP), merge mode with motion vector difference (MMVD), and geometric partitioning mode (GPM) are as follows:

IBC can be used with pairwise merge candidate and HMVP. A new pairwise IBC merge candidate can be generated by averaging two IBC merge candidates. For HMVP, IBC motion is inserted into history buffer for future referencing.

IBC cannot be used in combination with the following inter tools: affine motion, CIIP, MMVD, and GPM.

IBC is not allowed for the chroma coding blocks when DUAL_TREE partition is used.

Unlike in the HEVC screen content coding extension, the current picture is no longer included as one of the reference pictures in the reference picture list 0 for IBC prediction. The derivation process of motion vectors for IBC mode excludes all neighboring blocks in inter mode and vice versa. The following IBC design aspects are applied:

IBC shares the same process as in regular MV merge including with pairwise merge candidate and history-based motion predictor, but disallows TMVP and zero vector because they are invalid for IBC mode.

Separate HMVP buffer (5 candidates each) is used for conventional MV and IBC.

Block vector constraints are implemented in the form of bitstream conformance constraint, the encoder needs to ensure that no invalid vectors are present in the bitstream, and merge shall not be used if the merge candidate is invalid (out of range or 0). Such bitstream conformance constraint is expressed in terms of a virtual buffer as described below.

For deblocking, IBC is handled as inter mode.

If the current block is coded using IBC prediction mode, AMVR does not use quarter-pel; instead, AMVR is signaled to only indicate whether MV is inter-pel or 4 integer-pel.

The number of IBC merge candidates can be signalled in the slice header separately from the numbers of regular, subblock, and geometric merge candidates.

A virtual buffer concept is used to describe the allowable reference region for IBC prediction mode and valid block vectors. Denote CTU size as ctbSize, the virtual buffer, ibcBuf, has width being wIbcBuf=128×128/ctbSize and height hIbcBuf=ctbSize. For example, for a CTU size of 128×128, the size of ibcBuf is also 128×128; for a CTU size of 64×64, the size of ibcBuf is 256×64; and a CTU size of 32×32, the size of ibcBuf is 512×32.

The size of a VPDU is min (ctbSize, 64) in each dimension, $W_v$=min (ctbSize, 64).

The virtual IBC buffer, ibcBuf is maintained as follows.

At the beginning of decoding each CTU row, refresh the whole ibcBuf with an invalid value −1.

At the beginning of decoding a VPDU (xVPDU, yVPDU) relative to the top-left corner of the picture, set the ibcBuf[x][y]=−1, with x=xVPDU%wIbcBuf, . . . , xVPDU%wIbcBuf+W$_v$−1; y=yVPDU%ctbSize, . . . , yVPDU%ctbSize+W$_v$−1.

After decoding a CU contains (x, y) relative to the top-left corner of the picture, set ibcBuf[x%wIbcBuf] [y%ctbSize]=recSample[x][y].

For a block covering the coordinates (x, y), if the following is true for a block vector bv=(bv[0], bv[1]), then it is valid; otherwise, it is not valid:

ibcBuf[(x+bv[0])%wIbcBuf][(y+bv[1])%ctbSize] shall not be equal to −1.

2.1.2 Block Differential Pulse Coded Modulation (BDPCM)

VVC supports block differential pulse coded modulation (BDPCM) for screen content coding. At the sequence level, a BDPCM enable flag is signalled in the SPS; this flag is signalled only if the transform skip mode (described in the next section) is enabled in the SPS.

When BDPCM is enabled, a flag is transmitted at the CU level if the CU size is smaller than or equal to MaxTsSize by MaxTsSize in terms of luma samples and if the CU is intra coded, where MaxTsSize is the maximum block size for which the transform skip mode is allowed. This flag indicates whether regular intra coding or BDPCM is used. If BDPCM is used, a BDPCM prediction direction flag is transmitted to indicate whether the prediction is horizontal or vertical. Then, the block is predicted using the regular horizontal or vertical intra prediction process with unfiltered reference samples. The residual is quantized and the difference between each quantized residual and its predictor, i.e., the previously coded residual of the horizontal or vertical (depending on the BDPCM prediction direction) neighbouring position, is coded.

For a block of size M (height)×N (width), let $r_{i,j}$, 0≤i≤M−1, 0≤j≤N−1 be the prediction residual.

Let $Q(r_{i,j})$, 0≤i≤M−1, 0≤j≤N−1 denote the quantized version of the residual $r_{i,j}$. BDPCM is applied to the quantized residual values, resulting in a modified M×N array $\tilde{R}$ with elements $\tilde{r}_{i,j}$, where $\tilde{r}_{i,j}$ is predicted from its neighboring quantized residual value. For vertical BDPCM prediction mode, for 0????N−1), the following is used to derive $\tilde{r}_{i,j}$:

$$\tilde{r}_{i,j} = \begin{cases} Q(r_{i,j}), & i = 0 \\ Q(r_{i,j}) - Q(r_{(i-1),j}), & 1 \le i \le (M-1) \end{cases}. \quad (2\text{-}1)$$

For horizontal BDPCM prediction mode, for 0≤i≤(M−1), the following is used to derive $\tilde{r}_{i,j}$:

$$\tilde{r}_{i,j} = \begin{cases} Q(r_{i,j}), & j = 0 \\ Q(r_{i,j}) - Q(r_{i,(j-1)}), & 1 \le j \le (N-1) \end{cases}. \quad (2\text{-}2)$$

At the decoder side, the above process is reversed to compute $Q(r_{i,j})$, 0≤i≤M−1, 0≤j≤N−1, as follows:

$$Q(r_{i,j}) = \sum_{k=0}^{i} \tilde{r}_{k,j}, \text{ if vertical } BDPCM \text{ is used,} \quad (2\text{-}3)$$

$$Q(r_{i,j}) = \sum_{k=0}^{j} \tilde{r}_{i,k}, \text{ if horizontal } BDPCM \text{ is used.} \quad (2\text{-}4)$$

The inverse quantized residuals, $Q^{-1}(Q(r_{i,j}))$, are added to the intra block prediction values to produce the reconstructed sample values.

The predicted quantized residual values $\tilde{r}_{i,j}$ are sent to the decoder using the same residual coding process as that in transform skip mode residual coding. For lossless coding, if slice_ts_residual_coding_disabled_flag is set to 1, the quantized residual values are sent to the decoder using regular transform residual coding as described in 2.2.2. In terms of the MPM mode for future intra mode coding, horizontal or vertical prediction mode is stored for a BDPCM-coded CU if the BDPCM prediction direction is horizontal or vertical, respectively. For deblocking, if both blocks on the sides of a block boundary are coded using BDPCM, then that particular block boundary is not deblocked.

2.1.3 Residual Coding for Transform Skip Mode

VVC allows the transform skip mode to be used for luma blocks of size up to MaxTsSize by MaxTsSize, where the value of MaxTsSize is signaled in the PPS and can be at most 32. When a CU is coded in transform skip mode, its prediction residual is quantized and coded using the transform skip residual coding process. This process is modified from the transform coefficient coding process described in 2.2.2. In transform skip mode, the residuals of a TU are also coded in units of non-overlapped subblocks of size 4×4. For better coding efficiency, some modifications are made to customize the residual coding process towards the residual signal's characteristics. The following summarizes the differences between transform skip residual coding and regular transform residual coding:

Forward scanning order is applied to scan the subblocks within a transform block and also the positions within a subblock;

no signalling of the last (x, y) position;

coded_sub_block_flag is coded for every subblock except for the last subblock when all previous flags are equal to 0;

sig_coeff_flag context modelling uses a reduced template, and context model of sig_coeff_flag depends on top and left neighbouring values;

context model of abs_level_gt1 flag also depends on the left and top sig_coeff_flag values;

par_level_flag using only one context model;

additional greater than 3, 5, 7, 9 flags are signalled to indicate the coefficient level, one context for each flag;

rice parameter derivation using fixed order=1 for the binarization of the remainder values;

context model of the sign flag is determined based on left and above neighbouring values and the sign flag is parsed after sig_coeff_flag to keep all context coded bins together.

For each subblock, if the coded_subblock_flag is equal to 1 (i.e., there is at least one non-zero quantized residual in the subblock), coding of the quantized residual levels is performed in three scan passes (see FIG. 5):

First scan pass: significance flag (sig_coeff_flag), sign flag (coeff_sign_flag), absolute level greater than 1 flag (abs_level_gtx_flag[0]), and parity (par_level_flag) are coded. For a given scan position, if sig_coeff_flag is equal to 1, then coeff_sign_flag is coded, followed by the abs_level_gtx_flag[0] (which specifies whether the absolute level is greater than 1). If abs_level_gtx_flag [0] is equal to 1, then the par_level_flag is additionally coded to specify the parity of the absolute level.

Greater-than-x scan pass: for each scan position whose absolute level is greater than 1, up to four abs_level_gtx_flag[i] for i=1 . . . 4 are coded to indicate if the absolute level at the given position is greater than 3, 5, 7, or 9, respectively.

Remainder scan pass: The remainder of the absolute level abs_remainder are coded in bypass mode. The remainder of the absolute levels are binarized using a fixed rice parameter value of 1.

The bins in scan passes #1 and #2 (the first scan pass and the greater-than-x scan pass) are context coded until the maximum number of context coded bins in the TU have been exhausted. The maximum number of context coded bins in a residual block is limited to $1.75*block\_width*block\_height$, or equivalently, 1.75 context coded bins per sample position on average. The bins in the last scan pass (the remainder scan pass) are bypass coded. A variable, RemCcbs, is first set to the maximum number of context-coded bins for the block and is decreased by one each time a context-coded bin is coded. While RemCcbs is larger than or equal to four, syntax elements in the first coding pass, which includes the sig_coeff_flag, coeff_sign_flag, abs_level_gt1_flag and par_level_flag, are coded using context-coded bins. If RemCcbs becomes smaller than 4 while coding the first pass, the remaining coefficients that have yet to be coded in the first pass are coded in the remainder scan pass (pass #3).

Figure 5:
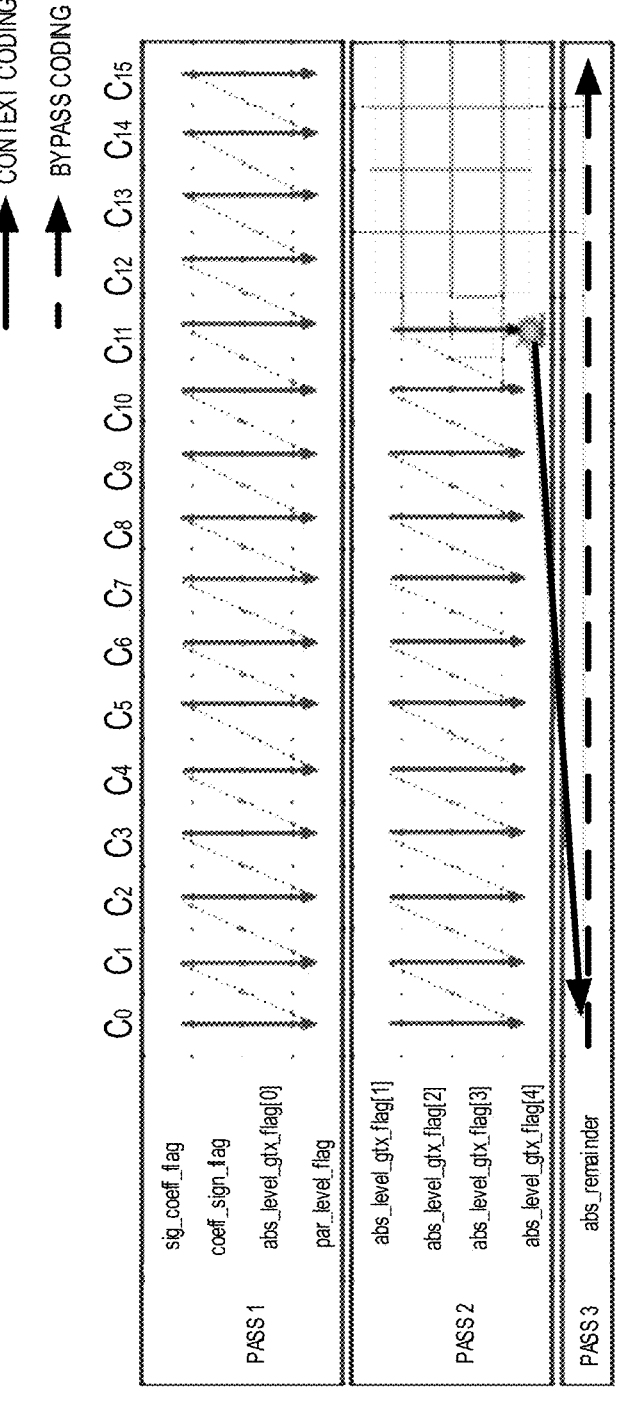
FIG. 5 illustrates the transform skip residual coding process.

After completion of first pass coding, if RemCcbs is larger than or equal to four, syntax elements in the second coding pass, which includes abs_level_gt3_flag, abs_level_gt5_flag, abs_level_gt7_flag, and abs_level_gt9_flag, are coded using context coded bins. If the RemCcbs becomes smaller than 4 while coding the second pass, the remaining coefficients that have yet to be coded in the second pass are coded in the remainder scan pass (pass #3). FIG. 5 illustrates the transform skip residual coding process. The star marks the position when context coded bins are exhausted, at which point all remaining bins are coded using bypass coding.

Further, for a block not coded in the BDPCM mode, a level mapping mechanism is applied to transform skip residual coding until the maximum number of context coded bins has been reached. Level mapping uses the top and left neighbouring coefficient levels to predict the current coefficient level in order to reduce signalling cost. For a given residual position, denote absCoeff as the absolute coefficient level before mapping and absCoeffMod as the coefficient level after mapping. Let $X_0$ denote the absolute coefficient level of the left neighbouring position and let $X_1$ denote the absolute coefficient level of the above neighbouring position. The level mapping is performed as follows:

```
pred = max(X0, X1);
if (absCoeff = = pred)
    absCoeffMod = 1;
else
    absCoeffMod = (absCoeff < pred) ? absCoeff + 1 : absCoeff;
```

Then, the absCoeffMod value is coded as described above. After all context coded bins have been exhausted, level mapping is disabled for all remaining scan positions in the current block.

2.1.4 Palette Mode

In VVC, the palette mode is used for screen content coding in all of the chroma formats supported in a 4:4:4 profile (that is, 4:4:4, 4:2:0, 4:2:2 and monochrome). When palette mode is enabled, a flag is transmitted at the CU level if the CU size is smaller than or equal to 64×64, and the amount of samples in the CU is greater than 16 to indicate whether palette mode is used. Considering that applying palette mode on small CUs introduces insignificant coding gain and brings extra complexity on the small blocks, palette mode is disabled for CU that are smaller than or equal to 16 samples. A palette coded coding unit (CU) is treated as a prediction mode other than intra prediction, inter prediction, and intra block copy (IBC) mode.

Figure 6:
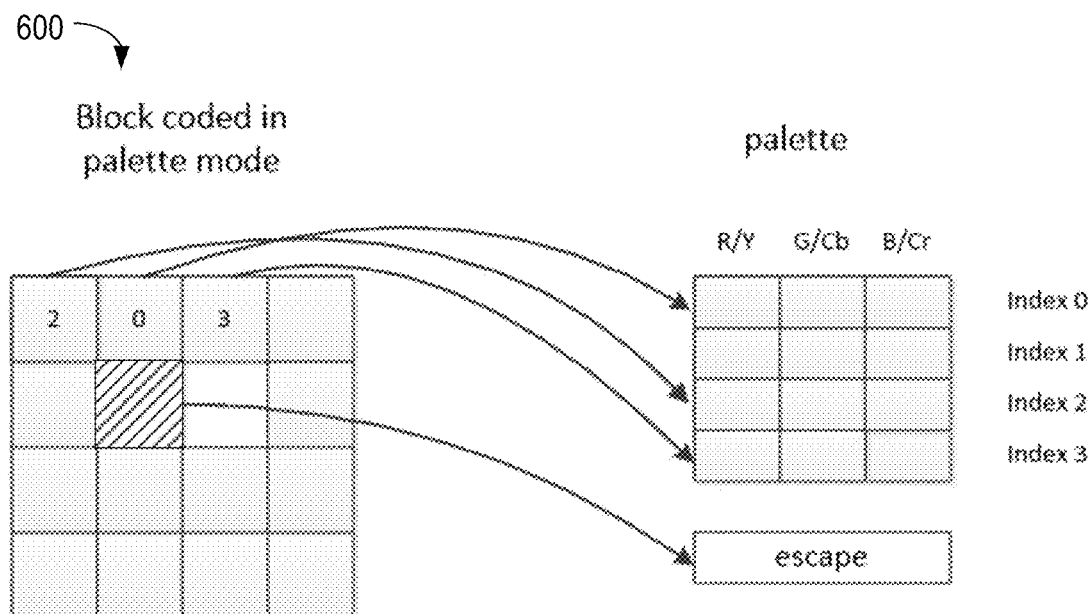
FIG. 6 illustrates example of a block coded in palette mode.

If the palette mode is utilized, the sample values in the CU are represented by a set of representative colour values. The set is referred to as the palette. For positions with sample values close to the palette colours, the palette indices are signalled. It is also possible to specify a sample that is outside the palette by signalling an escape symbol. For samples within the CU that are coded using the escape symbol, their component values are signalled directly using (possibly) quantized component values. This is illustrated in FIG. 6. FIG. 6 illustrates example diagram 600 of a block coded in palette mode. The quantized escape symbol is binarized with fifth order Exp-Golomb binarization process (EG5).

For coding of the palette, a palette predictor is maintained. The palette predictor is initialized to 0 at the beginning of each slice for non-wavefront case. For WPP case, the palette predictor at the beginning of each CTU row is initialized to the predictor derived from the first CTU in the previous CTU row so that the initialization scheme between palette predictors and CABAC synchronization is unified. For each entry in the palette predictor, a reuse flag is signalled to indicate whether it is part of the current palette in the CU. The reuse flags are sent using run-length coding of zeros. After this, the number of new palette entries and the component values for the new palette entries are signalled. After encoding the palette coded CU, the palette predictor will be updated using the current palette, and entries from the previous palette predictor that are not reused in the current palette will be added at the end of the new palette predictor until the maximum size allowed is reached. An escape flag is signaled for each CU to indicate if escape symbols are present in the current CU. If escape symbols are present, the palette table is augmented by one and the last index is assigned to be the escape symbol.

Figure 7:
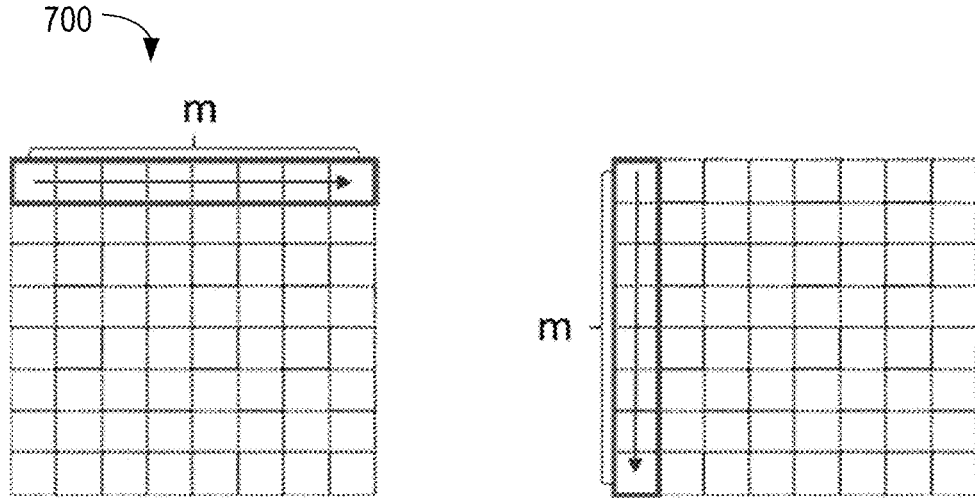
FIG. 7 illustrates an example subblock-based index map scanning for palette, left for horizontal scanning and right for vertical scanning.

In a similar way as the coefficient group (CG) used in transform coefficient coding, a CU coded with palette mode is divided into multiple line-based coefficient group, each consisting of m samples (i.e., m=16), where index runs, palette index values, and quantized colors for escape mode are encoded/parsed sequentially for each CG. Same as in HEVC, horizontal or vertical traverse scan can be applied to scan the samples, as shown in FIG. 7. FIG. 7 illustrates a diagram 700 of subblock-based index map scanning for palette, left for horizontal scanning and right for vertical scanning.

The encoding order for palette run coding in each segment is as follows: For each sample position, 1 context coded bin run_copy_flag=0 is signalled to indicate if the pixel is of the same mode as the previous sample position, i.e., if the previously scanned sample and the current sample are both of run type COPY_ABOVE or if the previously scanned sample and the current sample are both of run type INDEX and the same index value. Otherwise, run_copy_flag=1 is signaled. If the current sample and the previous sample are of different modes, one context coded bin copy_above_palette_indices_flag is signaled to indicate the run type, i.e., INDEX or COPY_ABOVE, of the current sample. Here, decoder doesn't have to parse run type if the sample is in the first row (horizontal traverse scan) or in the first column (vertical traverse scan) since the INDEX mode is used by default. With the same way, decoder doesn't have to parse run type if the previously parsed run type is COPY_ABOVE. After palette run coding of samples in one coding pass, the index values (for INDEX mode) and quantized escape colors are grouped and coded in another coding pass using CABAC bypass coding. Such separation of context coded bins and bypass coded bins can improve the throughput within each line CG.

For slices with dual luma/chroma tree, palette is applied on luma (Y component) and chroma (Cb and Cr components) separately, with the luma palette entries containing only Y values and the chroma palette entries containing both Cb and Cr values. For slices of single tree, palette will be applied on Y, Cb, Cr components jointly, i.e., each entry in the palette contains Y, Cb, Cr values, unless when a CU is coded using local dual tree, in which case coding of luma and chroma is handled separately. In this case, if the corresponding luma or chroma blocks are coded using palette mode, their palette is applied in a way similar to the dual tree case (this is related to non-4:4:4 coding and will be further explained in 2.1.4.1).

For slices coded with dual tree, the maximum palette predictor size is 63, and the maximum palette table size for coding of the current CU is 31. For slices coded with dual tree, the maximum predictor and palette table sizes are halved, i.e., maximum predictor size is 31 and maximum table size is 15, for each of the luma palette and the chroma palette. For deblocking, the palette coded block on the sides of a block boundary is not deblocked.

2.1.4.1 Palette Mode for Non-4:4:4 Content

Palette mode in VVC is supported for all chroma formats in a similar manner as the palette mode in HEVC SCC. For non-4:4:4 content, the following customization is applied:

1. When signaling the escape values for a given sample position, if that sample position has only the luma component but not the chroma component due to chroma subsampling, then only the luma escape value is signaled. This is the same as in HEVC SCC.

2. For a local dual tree block, the palette mode is applied to the block in the same way as the palette mode applied to a single tee block with two exceptions:

a. The process of palette predictor update is slightly modified as follows. Since the local dual tree block only contains luma (or chroma) component, the predictor update process uses the signalled value of luma (or chroma) component and fills the "missing" chroma (or luma) component by setting it to a default value of (1<<(component bit depth−1)).

b. The maximum palette predictor size is kept at 63 (since the slice is coded using single tree) but the maximum palette table size for the luma/chroma block is kept at 15 (since the block is coded using separate palette).

3. For palette mode in monochrome format, the number of colour components in a palette coded block is set to 1 instead of 3.

2.1.4.2 Encoder Algorithm for Palette Mode

At the encoder side, the following steps are used to produce the palette table of the current CU.

1. First, to derive the initial entries in the palette table of the current CU, a simplified K-means clustering is applied. The palette table of the current CU is initialized as an empty table. For each sample position in the CU, the SAD between this sample and each palette table entry is calculated and the minimum SAD among all palette table entries is obtained. If the minimum SAD is smaller than a pre-defined error limit, errorLimit, then the current sample is clustered together with the palette table entry with the minimum SAD. Otherwise, a new palette table entry is created. The threshold errorLimit is QP-dependent and is retrieved from a look-up table containing 57 elements covering the entire QP range. After all samples of the current CU have been processed, the initial palette entries are sorted according to the number of samples clustered together with each palette entry, and any entry after the $31^{st}$ entry is discarded.

2. In the second step, the initial palette table colours are adjusted by considering two options: using the centroid of each cluster from step 1 or using one of the palette colours in the palette predictor. The option with lower rate-distortion cost is selected to be the final colours of the palette table. If a cluster has only a single sample and the corresponding palette entry is not in the palette predictor, the corresponding sample is converted to an escape symbol in the next step.

3. A palette table thus generated contains some new entries from the centroids of the clusters in step 1, and some entries from the palette predictor. So this table is reordered again such that all new entries (i.e. the centroids) are put at the beginning of the table, followed by entries from the palette predictor.

Given the palette table of the current CU, the encoder selects the palette index of each sample position in the CU. For each sample position, the encoder checks the RD cost of all index values corresponding to the palette table entries, as well as the index representing the escape symbol, and selects the index with the smallest RD cost using the following equation:

$$RD \text{ cost} = \tag{2-5}$$
$$\text{distortion} \times (isChroma? \ 0.8{:}1) + \text{lambda} \times \text{bypass coded bits.}$$

After deciding the index map of the current CU, each entry in the palette table is checked to see if it is used by at least one sample position in the CU. Any unused palette entry will be removed.

After the index map of the current CU is decided, trellis RD optimization is applied to find the best values of run_copy_flag and run type for each sample position by comparing the RD cost of three options: same as the previously scanned position, run type COPY_ABOVE, or run type INDEX. When calculating the SAD values, sample values are scaled down to 8 bits, unless the CU is coded in lossless mode, in which case the actual input bit depth is used to calculate the SAD. Further, in the case of lossless coding, only rate is used in the rate-distortion optimization steps mentioned above (because lossless coding incurs no distortion).

2.1.5 Adaptive Color Transform

Figure 8:
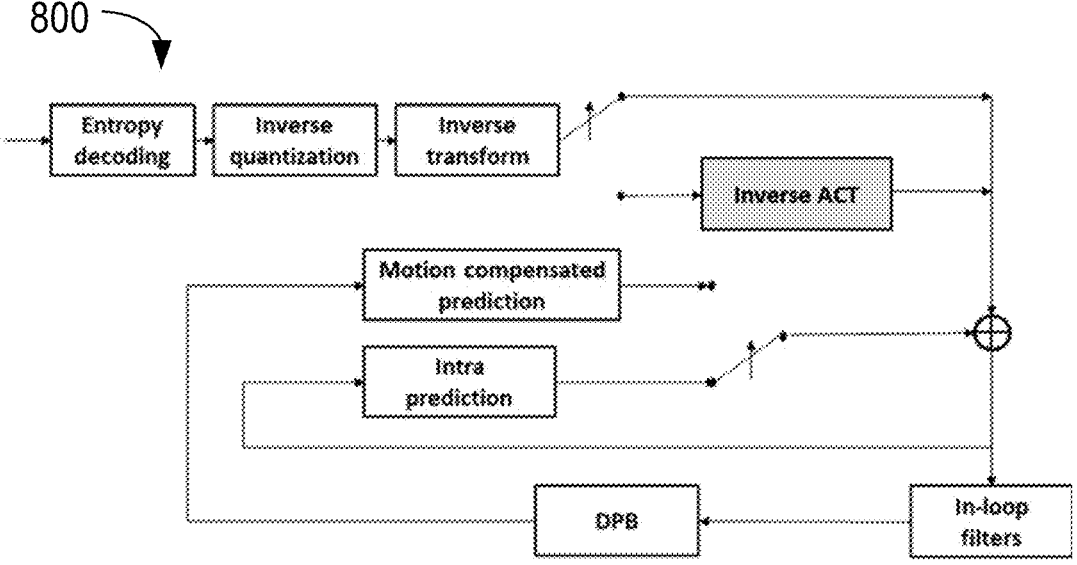
FIG. 8 illustrates an example decoding flowchart with ACT.

In HEVC SCC extension, adaptive color transform (ACT) was applied to reduce the redundancy between three color components in 444 chroma format. The ACT is also adopted into the VVC standard to enhance the coding efficiency of 444 chroma format coding. Same as in HEVC SCC, the ACT performs in-loop color space conversion in the prediction residual domain by adaptively converting the residuals from the input color space to YCgCo space. FIG. 8 illustrates the decoding flowchart 800 with the ACT being applied. Two color spaces are adaptively selected by signaling one ACT flag at CU level. When the flag is equal to one, the residuals of the CU are coded in the YCgCo space; otherwise, the residuals of the CU are coded in the original color space. Additionally, same as the HEVC ACT design, for inter and IBc CUs, the ACT is only enabled when there is at least one non-zero coefficient in the CU. For intra CUs, the ACT is only enabled when chroma components select the same intra prediction mode of luma component, i.e., DM mode.

2.1.5.1 ACT Mode

In HEVC SCC extension, the ACT supports both lossless and lossy coding based on lossless flag (i.e., cu_transquant_bypass_flag). However, there is no flag signalled in the bitstream to indicate whether lossy or lossless coding is applied. Therefore, YCgCo-R transform is applied as ACT to support both lossy and lossless cases. The YCgCo-R reversible colour transform is shown as below.

| Forward Conversion:<br>GBR to YCgCo | Backward Conversion:<br>YCgCo to GBR |
|---|---|
| Co = R − B;<br>t = B + (Co >> 1);<br>Cg = G − t;<br>Y = t + (Cg >> 1); | t = Y − (Cg >> 1)<br>G = Cg + t<br>B = t − (Co >> 1)<br>R = Co + B |

Since the YCgCo-R transform are not normalized. To compensate the dynamic range change of residuals signals before and after color transform, the QP adjustments of (−5, 1, 3) are applied to the transform residuals of Y, Cg and Co components, respectively. The adjusted quantization parameter only affects the quantization and inverse quantization of the residuals in the CU. For other coding processes (such as deblocking), original QP is still applied. Additionally, because the forward and inverse color transforms need to access the residuals of all three components, the ACT mode is always disabled for separate-tree partition and ISP mode where the prediction block size of different color component is different. Transform skip (TS) and block differential pulse coded modulation (BDPCM), which are extended to code chroma residuals, are also enabled when the ACT is applied.

2.1.5.2 ACT Fast Encoding Algorithms

To avoid brutal R-D search in both the original and converted color spaces, the following fast encoding algorithms are applied in the VTM reference software to reduce the encoder complexity when the ACT is enabled.

The order of RD checking of enabling/disabling ACT is dependent on the original color space of input video. For RGB videos, the RD cost of ACT mode is checked first; for YCbCr videos, the RD cost of non-ACT mode is checked first. The RD cost of the second color space is checked only if there is at least one non-zero coefficient in the first color space.

The same ACT enabling/disabling decision is reused when one CU is obtained through different partition path. Specifically, the selected color space for coding the residuals of one CU will be stored when the CU is coded at the first time. Then, when the same CU is obtained by another partition path, instead of checking the RD costs of the two spaces, the stored color space decision will be directly reused.

The RD cost of a parent CU is used to decide whether to check the RD cost of the second color space for the current CU. For instance, if the RD cost of the first color space is smaller than that of the second color space for the parent CU, then for the current CU, the second color space is not checked.

To reduce the number of tested coding modes, the selected coding mode is shared between two color spaces. Specifically, for intra mode, the preselected intra mode candidates based on SATD-based intra mode selection are shared between two color spaces. For inter and IBC modes, block vector search or motion estimation is performed only once. The block vectors and motion vectors are shared by two color spaces.

2.1.6 Intra Template Matching

Intra template matching prediction (Intra TMP) is a special intra prediction mode that copies the best prediction block from the reconstructed part of the current frame, whose L-shaped template matches the current template. For a predefined search range, the encoder searches for the most similar template to the current template in a reconstructed part of the current frame and uses the corresponding block as a prediction block. The encoder then signals the usage of this mode, and the same prediction operation is performed at the decoder side.

Figure 9:
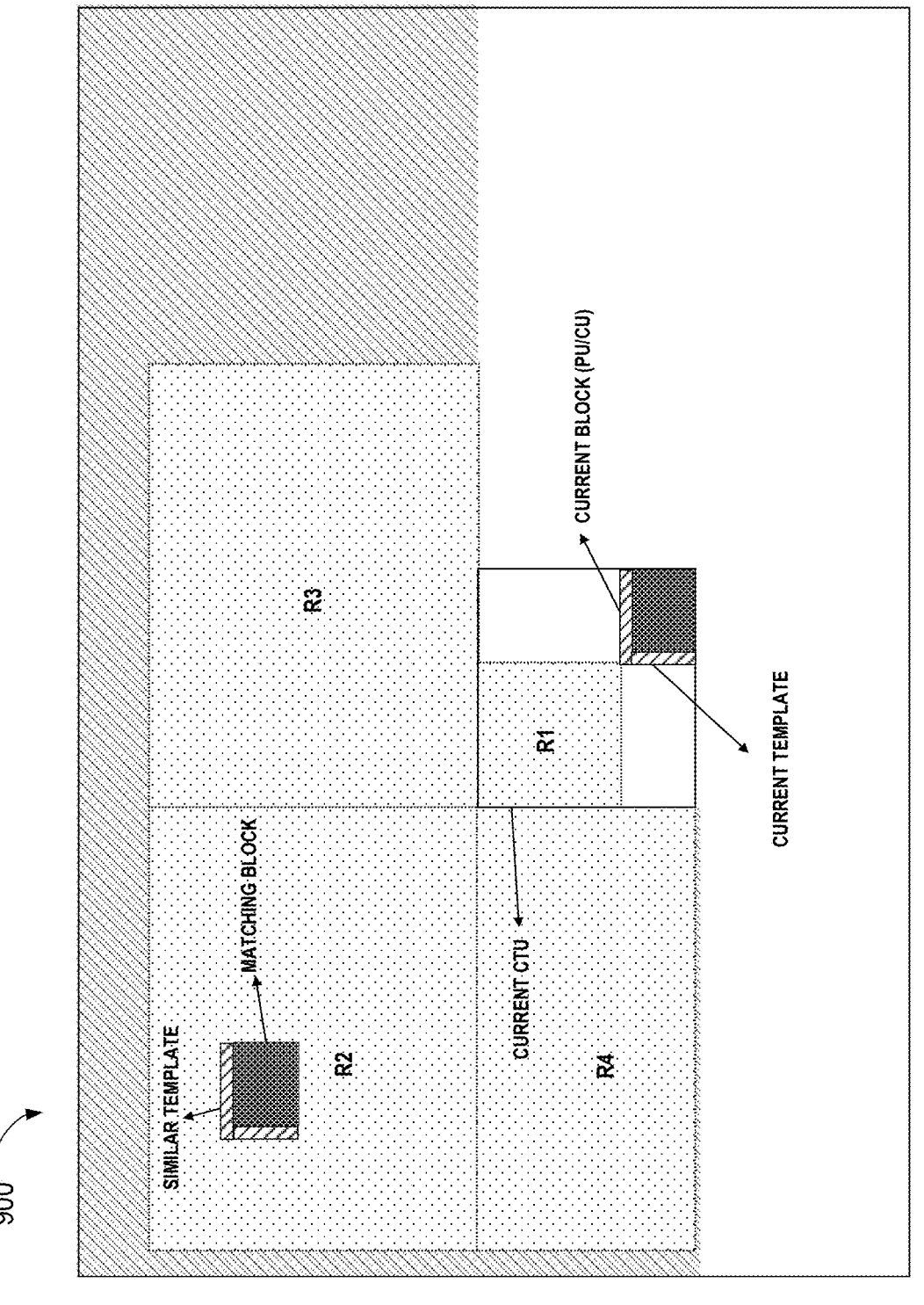
FIG. 9 illustrates an example intra template matching search area used.

FIG. 9 illustrates a diagram 900 showing an intra template matching search area used. The prediction signal is generated by matching the L-shaped causal neighbor of the current block with another block in a predefined search area in FIG. 9 consisting of:

R1: current CTU,
R2: top-left CTU,
R3: above CTU,
R4: left CTU.
SAD is used as a cost function.

Within each region, the decoder searches for the template that has least SAD with respect to the current one and uses its corresponding block as a prediction block.

The dimensions of all regions (SearchRange_w, SearchRange_h) are set proportional to the block dimension (BlkW, BlkH) to have a fixed number of SAD comparisons per pixel. That is:

$$\text{SearchRange\_w} = a * BlkW,$$

$$\text{SearchRange\_h} = a * BlkH.$$

Where 'α' is a constant that controls the gain/complexity trade-off. In practice, 'α' is equal to 5.

The Intra template matching tool is enabled for CUs with size less than or equal to 64 in width and height. This maximum CU size for Intra template matching is configurable.

The Intra template matching prediction mode is signaled at CU level through a dedicated flag when DIMD is not used for current CU.

2.2 Adaptive Motion Vector Resolution (AMVR)

In HEVC, motion vector differences (MVDs) (between the motion vector and predicted motion vector of a CU) are signalled in units of quarter-luma-sample when use_integer_mv_flag is equal to 0 in the slice header. In VVC, a CU-level adaptive motion vector resolution (AMVR) scheme is introduced. AMVR allows MVD of the CU to be coded in different precision. Dependent on the mode (normal AMVP mode or affine AVMP mode) for the current CU, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or $\frac{1}{16}$ luma-sample.

The CU-level MVD resolution indication is conditionally signalled if the current CU has at least one non-zero MVD component. If all MVD components (that is, both horizontal and vertical MVDs for reference list L0 and reference list L1) are zero, quarter-luma-sample MVD resolution is inferred.

For a CU that has at least one non-zero MVD component, a first flag is signalled to indicate whether quarter-lumaif affine inter mode is not selected after checking rate-distortion costs of affine merge/skip mode, merge/skip mode, quarter-luma-sample MVD precision normal AMVP mode and quarter-luma-sample MVD precision affine AMVP mode, then $\frac{1}{16}$ luma-sample MV precision and 1-pel MV precision affine inter modes are not checked. Furthermore, affine parameters obtained in quarter-luma-sample MV precision affine inter mode is used as starting search point in $\frac{1}{16}$ luma-sample and quarter-luma-sample MV precision affine inter modes. In VVC, if a block is coded with IBC AMVP mode and AMVR is turned ON, the IBC AMVP supports two MV precisions of 1-pel and 4-pel. Only if either L0−MVDx or L0−MVDy is not equal to zero, the AMVR precision index would be signalled.

```
...
  else if( CuPredMode[ chType ][ x0 ][ y0 ] = = MODE_IBC ) {
    mvd_coding( x0, y0, 0, 0 )
    if( MaxNumIbcMergeCand > 1 )
      mvp_l0_flag[ x0 ][ y0 ]                                      ae(v)
    if( sps_amvr_enabled_flag &&
        ( MvdL0[ x0 ][ y0 ][ 0 ] != 0 || MvdL0[ x0 ][ y0 ][ 1 ] != 0 ) )
      amvr_precision_idx[ x0 ][ y0 ]                               ae(v)
  } else {
...
``` sample MVD precision is used for the CU. If the first flag is 0, no further signaling is needed and quarter-luma-sample MVD precision is used for the current CU. Otherwise, a second flag is signalled to indicate half-luma-sample or other MVD precisions (integer or four-luma sample) is used for normal AMVP CU. In the case of half-luma-sample, a 6-tap interpolation filter instead of the default 8-tap interpolation filter is used for the half-luma sample position. Otherwise, a third flag is signalled to indicate whether integer-luma-sample or four-luma-sample MVD precision is used for normal AMVP CU. In the case of affine AMVP CU, the second flag is used to indicate whether integer-luma-sample or $\frac{1}{16}$ luma-sample MVD precision is used. In order to ensure the reconstructed MV has the intended precision (quarter-luma-sample, half-luma-sample, integer-luma-sample or four-luma-sample), the motion vector predictors for the CU will be rounded to the same precision as that of the MVD before being added together with the MVD. The motion vector predictors are rounded toward zero (that is, a negative motion vector predictor is rounded toward positive infinity and a positive motion vector predictor is rounded toward negative infinity).

The encoder determines the motion vector resolution for the current CU using RD check. To avoid always performing CU-level RD check four times for each MVD resolution, in VTM13, the RD check of MVD precisions other than quarter-luma-sample is only invoked conditionally. For normal AVMP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. Then, the check of half-luma-sample MVD precision is skipped if the RD cost of integer-luma-sample MVD precision is significantly larger than the best RD cost of previously tested MVD precisions. For affine AMVP mode,

2.3 Related Solutions

2.3.1 Reordering of Reconstruction Sample

The detailed embodiments below should be considered as examples to explain general concepts. These embodiments should not be interpreted in a narrow way. Furthermore, these embodiments can be combined in any manner. In the following disclosure, a block may refer to a coding block (CB), a coding unit (CU), a prediction block (PB), a prediction unit (PU), a transform block (TB), a transform unit (TU), a sub-block, a sub-CU, a coding tree unit (CTU), a coding tree block (CTB), or a coding group (CG).

In the following disclosure, a region may refer to any video unit, such as a picture, a slice or a block. A region may also refer to a non-rectangular region, such as a triangular.

In the following disclosure, W and H represents the width and height of a mentioned rectangular region.

1. It is proposed that the samples in a region may be reordered.
   a. Reordering of samples may be defined as following: Suppose the sample at position (x, y) in a region before reordering is denoted as S(x, y), and the sample at position (x, y) in a region after reordering is denoted as R(x, y). It is required that R(x, y)=S(f (x, y), g(x, y)), wherein (f(x, y), g(x, y)) is a position in the region, f and g are two functions.
      i. For example, it is required that there is at least one position (x, y) satisfying that (f(x, y), g(x, y)) is not equal to (x, y).
   b. The samples in a region to be reordered may be
      i. Original samples before encoding.
      ii. Prediction samples.
      iii. Reconstruction samples.
      iv. Transformed samples (transformed coefficients).
      v. Samples before inverse-transform (coefficients before inverse-transform).
      vi. Samples before deblocking filtering.
      vii. Samples after deblocking filtering.
      viii. Samples before SAO processing.
      ix. Samples after SAO processing.
      x. Samples before ALF processing.

xi. Samples after ALF processing.

xii. Samples before post processing.

xiii. Samples after post processing.

c. In one example, reordering may be applied at more than one stage.

i. For example, at least two of these samples listed in bullet 1.b may be reordered.

1) For example, different reordering methods may be applied on the two kinds of samples.

2) For example, the same reordering method may be applied on the two kinds of samples.

d. In one example, reordering may be a horizontal flip. For example, $f(x, y)=P-x$, $g(x, y)=y$. E.g. $P=W-1$.

e. In one example, reordering may be a vertical flip. For example, $f(x, y)=x$, $g(x, y)=Q-y$. E.g. $Q=H-1$.

f. In one example, reordering may be a horizontal-vertical flip. For example, $f(x, y)=P-x$, $g(x, y)=Q-y$. E.g. $P=W-1$ and $Q=H-1$.

g. In one example, reordering may be a shift. For example, $f(x, y)=(P+x)\%W$, $g(x, y)=(Q+y)\%H$, wherein P and Q are integers.

h. In one example, reordering may be a rotation.

i. In one example, there is at least one $(x, y)$ satisfying $(x, y)$ is equal to $(f(x,y), g(x,y))$.

j. In one example, whether to and/or how to reorder the samples may be signaled from the encoder to the decoder, such as in SPS/sequence header/PPS/picture header/APS/slice header/sub-picture/tile/CTU line/CTU/CU/PU/TU.

i. For example, a first flag is signaled to indicate whether reordering is applied.

1) E.g., the first flag may be coded with context coding.

ii. For example, a second syntax element (such as a flag) is signaled to indicate which reordering method is used (such as horizontal flip or vertical flip).

1) E.g., the second syntax element is signaled only if it is indicated that reordering is applied.

2) E.g., the second syntax element may be coded with context coding.

2. It is proposed that whether to and/or how to reorder the samples may depend on coding information.

a. In one example, whether to and/or how to reorder the samples may be derived depending on coding information at picture level/slice level/CTU level/CU level/PU level/TU level.

b. In one example, the coding information may comprise:

i. Dimensions of the region.

ii. Coding mode of the region (such as inter, intra or IBC).

iii. Motion information (such as motion vectors and reference indices).

iv. Intra-prediction mode (such as angular intra-prediction mode, Planar or DC).

v. Inter-prediction mode (such as affine prediction, bi-prediction/uni-prediction, merge mode, combined inter-intra prediction (CIIP), merge with motion vector difference (MMVD), temporal motion vector prediction (TMVP), sub-TMVP).

vi. Quantization parameter (QP).

vii. Coding tree splitting information such as coding tree depth.

viii. Color format and/or color component.

3. It is proposed that at least one parsing or decoding procedure other than the reordering procedure may depend on whether to and/or how to reorder samples.

a. For example, a syntax element may be signaled conditionally based on whether reordering is applied or not.

b. For example, different scanning order may be used based on whether to and/or how to reorder samples.

c. For example, deblocking filtering/SAO/ALF may be used based on whether to and/or how to reorder samples.

4. In one example, samples may be processed by at least one auxiliary procedure before or after the resampling process. Some possible auxiliary procedures may comprise: (combination may be allowed).

a. For example, at least one sample may be added by an offset.

b. For example, at least one sample may be multiplied by a factor.

c. For example, at least one sample may be clipped.

d. For example, at least one sample may be filtered.

e. For example, at least one sample X may be modified to be $T(X)$, wherein T is a function.

5. In one example, for a block coded with IBC mode.

a. For example, a first flag is signaled to indicate whether reconstruction samples should be reordered.

i. E.g., the first flag may be coded with context coding.

b. For example, a second flag may be signaled to indicate whether reconstruction samples should be flipped horizontally or vertically.

i. E.g., the second flag is signaled only if the first flag is true.

ii. E.g., the second flag may be coded with context coding.

2.3.2 on Sample Reordering-Application Condition, and the Interaction with Other Procedures The detailed embodiments below should be considered as examples to explain general concepts. These embodiments should not be interpreted in a narrow way. Furthermore, these embodiments can be combined in any manner.

The terms 'video unit' or 'coding unit' may represent a picture, a slice, a tile, a coding tree block (CTB), a coding tree unit (CTU), a coding block (CB), a CU, a PU, a TU, a PB, a TB.

The terms 'block' may represent a coding tree block (CTB), a coding tree unit (CTU), a coding block (CB), a CU, a PU, a TU, a PB, a TB.

It is noted that the terminologies mentioned below are not limited to the specific ones defined in existing standards. Any variance of the coding tool is also applicable.

1. About the application condition of sample reordering (e.g., the 1st and related issues), the following methods are proposed:

a. Whether a reordering process is applied on a reconstruction/original/prediction block may be dependent on coded information of a video unit.

a. For example, it may depend on the prediction method.

b. For example, if a video unit is coded with to one or more modes/techniques as listed below, the reordering process may be applied to the video unit. Otherwise, reordering process is disallowed.

i. Intra block copy (a.k.a., IBC).

ii. Current picture referencing (a.k.a., CPR).

iii. Intra template matching (a.k.a., IntraTM).

iv. IBC template matching (or template matching based IBC mode).

v. Merge based coding.

vi. AMVP based coding.

c. For example, it may depend on block dimensions (such as block width and/or height).

d. For example, if the dimensions W×H of the video unit conform to one or more rules as listed below, the reordering process may be applied to the video unit. Otherwise, reordering process is disallowed.

i. if W>=T1 and/or H>=T2.

ii. if W<=T1 and/or H<=T2.

iii. if W>T1 and/or H>T2.

iv. if W<T1 and/or H<T2.

v. if W×H>=T.

vi. if W×H>T.

vii. if W×H<=T.

viii. if W×H<T.

2. About what kind of samples are reordered and the interaction with other procedures (e.g., the 2th and related issues), the following methods are proposed:

a. A possible sample reordering method may refer to one or more processes as followings:

a. Reshaper domain samples (e.g., obtained based on LMCS method) of a video unit may be reordered.

i. For example, reshaper domain luma samples (e.g., obtained based on luma mapping of the LMCS method) of a video unit may be reordered.

b. The original domain (rather than LMCS reshaper domain) samples of a video unit may be reordered.

i. For example, original domain chroma samples of a video unit may be reordered.

ii. For example, original domain luma samples of a video unit may be reordered.

c. Reconstruction samples of a video unit may be reordered.

i. For example, reconstruction samples of the video unit may be reordered right after adding decoded residues to predictions.

ii. For example, reshaper domain luma reconstruction samples of the video unit may be reordered.

iii. For example, original domain luma reconstruction samples of the video unit may be reordered.

iv. For example, original domain chroma reconstruction samples of the video unit may be reordered.

d. Inverse luma mapping of LMCS process may be applied based on reordered reconstruction samples.

e. Loop filter process (e.g., luma/chroma bilateral filter, luma/chroma SAO, CCSAO, luma/chroma ALF, CCALF, etc.) may be applied based on reordered reconstruction samples.

i. For example, loop filter process may be applied based on original domain (rather than LMCS reshaper domain) reordered reconstruction samples.

f. Distortion calculation (e.g., SSE computation between original samples and reconstruction samples) may be based on reordered reconstruction samples.

i. For example, distortion calculation may be based on original domain reordered reconstruction samples.

g. Original samples of a video unit may be reordered.

i. For example, the reshaper domain original luma samples of a video unit may be reordered.

ii. For example, the original domain original luma samples of a video unit may be reordered.

iii. For example, the original domain original chroma samples of a video unit may be reordered.

iv. For example, the residues may be generated by subtracting the prediction from reordered original samples.

h. Prediction samples of a video unit may be reordered.

i. For example, the reordering process for prediction samples may be performed right after the motion compensation process.

ii. For example, sign prediction may be applied based on the reordered prediction samples of the video unit.

General

3. Whether to and/or how to apply the disclosed methods above may be signalled at sequence level/group of pictures level/picture level/slice level/tile group level, such in sequence header/picture header/SPS/VPS/DPS/DCI/PPS/APS/slice header/tile group header.

4. Whether to and/or how to apply the disclosed methods above may be signalled at PB/TB/CB/PU/TU/CU/VPDU/CTU/CTU row/slice/tile/sub-picture/other kinds of region contain more than one sample or pixel.

5. Whether to and/or how to apply the disclosed methods above may be dependent on coded information, such as block size, colour format, single/dual tree partitioning, colour component, slice/picture type.

2.3.3 on Sample Reordering—Sample Reordering, Signalling and Storage

The detailed embodiments below should be considered as examples to explain general concepts. These embodiments should not be interpreted in a narrow way. Furthermore, these embodiments can be combined in any manner.

The terms 'video unit' or 'coding unit' may represent a picture, a slice, a tile, a coding tree block (CTB), a coding tree unit (CTU), a coding block (CB), a CU, a PU, a TU, a PB, a TB.

The terms 'block' may represent a coding tree block (CTB), a coding tree unit (CTU), a coding block (CB), a CU, a PU, a TU, a PB, a TB.

It is noted that the terminologies mentioned below are not limited to the specific ones defined in existing standards. Any variance of the coding tool is also applicable.

1. About the signalling of sample reordering (e.g., the 1st and related issues), the following methods are proposed:

a. For example, at least one new syntax elements (e.g., flag, index, variable, parameter, etc) may be signalled to specify the usage of sample reordering for a video unit.

a. For example, at least one new syntax elements (e.g., a flag) may be further signalled to specify the usage of sample reordering, given that a certain prediction method is used to a video unit.

b. For example, a first new syntax element (e.g., a flag) may be further signalled, specifying the usage of sample reordering for an intra template matching coded video unit, given that the intra template matching usage flag specifies the video unit is coded by intra template matching.

c. For example, a first new syntax element (e.g., a flag) may be further signalled, specifying the usage of sample reordering for an IBC amvp coded video unit, given that the IBC amvp flag specifies the video unit is coded by IBC amvp.

d. For example, a first new syntax element (e.g., a flag) may be further signalled, specifying the usage of sample reordering for an IBC merge coded video unit, given that the IBC merge flag specifies the video unit is coded by IBC merge.

b. Furthermore, for example, if the first new syntax element specifies the sample reordering is used to the certain prediction method coded video unit, then a second new syntax element (e.g., a flag) may be further signalled, specifying which reordering method (such as horizontal flipping or vertical flipping) is used to the video unit.

c. For example, a single new syntax element (e.g., a parameter, or a variable, or an index) may be signalled to a video unit, instead of multiple cascaded syntax elements, specifying the type of reordering (such as no flipping, horizontal flipping, or vertical flipping) applied to the video unit.

a. For example, one new syntax element (e.g., an index) may be further signalled, specifying the type of sample reordering for an intra template matching coded video unit, given that the intra template matching usage flag specifies the video unit is coded by intra template matching.

b. For example, one new syntax element (e.g., an index) may be further signalled, specifying the type of sample reordering for an IBC amvp coded video unit, given that the IBC amvp flag specifies the video unit is coded by IBC amvp.

c. For example, one new syntax element (e.g., an index) may be further signalled, specifying the type of sample reordering for an IBC merge coded video unit, given that the IBC merge flag specifies the video unit is coded by IBC merge.

d. Additionally, for example, the new syntax element (e.g., an index) equal to 0 specifies that no sample reordering is used; equal to 1 specifies that sample reordering method A is used; equal to 2 specifies that sample reordering method B is used; and etc.

d. For example, one or more syntax elements related to sample reordering may be context coded.

a. For example, the context may be based on neighboring blocks/samples coding information (e.g., such as availability, prediction mode, where or not merge coded, whether or not IBC coded, whether or not apply sample reordering, which sample reordering method is used, and etc).

e. Alternatively, for example, instead of signalling whether to do the sample reordering and/or which reordering method is used to a video unit, partial (or all) of these steps may be determined based on pre-defined rules (without signalling).

a. For example, the pre-defined rules may be based on neighboring blocks/samples coded information.

b. For example, given that the IBC merge flag specifies the video unit is coded by IBC merge, a procedure may be conducted to determine whether to perform reordering and how to reorder, based on pre-defined rules/procedures without signalling.

i. Alternatively, for example, given that the first new syntax element specifies the sample reordering is used to the video unit, however, instead of further signalling the reordering method, how to reorder may be determined based on pre-defined rules/procedures (without signalling).

ii. Alternatively, for example, whether to perform reordering may be implicit determined based on pre-defined rules/procedures, but how to reorder may be signalled.

c. For example, given that the IBC amvp flag specifies the video unit is coded by IBC amvp, a procedure may be conducted to determine whether to perform reordering and how to reorder, based on pre-defined rules/procedures without signalling.

i. Alternatively, for example, given that the first new syntax element specifies the sample reordering is used to the video unit, however, instead of further signalling the reordering method, how to reorder may be determined based on pre-defined rules/procedures (without signalling).

ii. Alternatively, for example, whether to perform reordering may be implicit determined based on pre-defined rules/procedures, but how to reorder may be signalled.

d. For example, given that the intra template matching flag specifies the video unit is coded by IBC merge, a procedure may be conducted to determine whether to perform reordering and how to reorder, based on pre-defined rules/procedures without signalling.

i. Alternatively, for example, given that the first new syntax element specifies the sample reordering is used to the video unit, however, instead of further signalling the reordering method, how to reorder may be determined based on pre-defined rules/procedures (without signalling).

ii. Alternatively, for example, whether to perform reordering may be implicit determined based on pre-defined rules/procedures, but how to reorder may be signalled.

f. For example, whether to perform reordering and/or how to reorder may be inherited from coded blocks.

a. For example, it may be inherited from an adjacent spatial neighbor block.

b. For example, it may be inherited from a non-adjacent spatial neighbor block.

c. For example, it may be inherited from a history-based motion table (such as a certain HMVP table).

d. For example, it may be inherited from a temporal motion candidate.

e. For example, it may be inherited based on an IBC merge candidate list.

f. For example, it may be inherited based on an IBC amvp candidate list.

g. For example, it may be inherited based on a generated motion candidate list/table.

h. For example, the sample reordering inheritance may be allowed in case that a video unit is coded by IBC merge mode.

i. For example, the sample reordering inheritance may be allowed in case that a video unit is coded by IBC AMVP mode.

j. For example, the sample reordering inheritance may be allowed in case that a video unit is coded by intra template matching mode.

2. About the storage of sample reordering status (e.g., the 2nd and related issues), the following methods are proposed:

a. For example, the information of whether and/or how to reorder for a video unit may be stored.

a. For example, the stored information may be used for future video unit's coding.

b. For example, the information may be stored in a buffer.

i. For example, the buffer may be a line buffer, a table, more than one line buffer, picture buffer, compressed picture buffer, temporal buffer, etc.

c. For example, the information may be stored in a history motion vector table (such as a certain HMVP table).

b. For example, coding information (e.g., such as whether or not apply sample reordering, which sample reordering method is used, block availability, prediction mode, where or not merge coded, whether or not IBC coded, and etc.) may be stored for the derivation of the context of sample reordering syntax element(s).

General

3. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

4. Whether to and/or how to apply the disclosed methods above may be signalled at PB/TB/CB/PU/TU/CU/VPDU/CTU/CTU row/slice/tile/sub-picture/other kinds of region contain more than one sample or pixel.

5. Whether to and/or how to apply the disclosed methods above may be dependent on coded information, such as block size, colour format, single/dual tree partitioning, colour component, slice/picture type.

2.3.4 on Sample Reordering—Motion List Generation, Implicit Derivation, and how to Reorder The detailed embodiments below should be considered as examples to explain general concepts. These embodiments should not be interpreted in a narrow way. Furthermore, these embodiments can be combined in any manner.

The terms 'video unit' or 'coding unit' may represent a picture, a slice, a tile, a coding tree block (CTB), a coding tree unit (CTU), a coding block (CB), a CU, a PU, a TU, a PB, a TB.

The terms 'block' may represent a coding tree block (CTB), a coding tree unit (CTU), a coding block (CB), a CU, a PU, a TU, a PB, a TB.

It is noted that the terminologies mentioned below are not limited to the specific ones defined in existing standards. Any variance of the coding tool is also applicable.

1. About the motion candidate list generation for sample reordering (e.g., the 1st and related issues), the following methods are proposed:

b. For example, IBC merge motion candidate list may be used for both regular IBC merge mode and sample reordering based IBC merge mode.

c. For example, IBC amvp motion predictor candidate list may be used for both regular IBC amvp mode and sample reordering based IBC amvp mode.

d. For example, a new motion (predictor) candidate list may be generated for a target video unit coded with sample reordering.

a. For example, the new candidate list may only consider motion candidates with same reordering method as the reordering method of the target video unit.

b. For example, the new candidate list may only consider motion candidates coded with sample reordering (but no matter the type of sample reordering method).

c. Alternatively, the new candidate list may be generated without considering the sample reordering method of each motion candidate.

d. For example, non-adjacent motion candidates may be inserted to the new candidate list.

i. For example, non-adjacent candidates with sample reordering (but no matter the type of sample reordering method) may be inserted.

ii. For example, non-adjacent candidates with same reordering method as the reordering method of the target video unit may be inserted.

iii. For example, non-adjacent candidates may be inserted no matter the sample reordering method is used to the candidate or not.

e. For example, new motion candidates may be generated according to a certain rule and inserted to the new candidate list.

i. For example, the rule may be based on averaging process.

ii. For example, the rule may be based on clipping process.

iii. For example, the rule may be based on scaling process.

e. For example, the motion (predictor) candidate list generation for a target video unit may be dependent on the reordering method.

a. For example, the reordering method associated with each motion candidate (from spatial or temporal or history tables) may be inserted to the list, no matter the target video unit is to be coded with sample reordering or not.

b. For example, if the target video unit is to be coded with sample reordering, only those motion candidates (from spatial or temporal or history tables) who coded with same reordering method as the reordering method of the target video unit are inserted to the list.

c. For example, if the target video unit is to be coded with sample reordering, only those motion candidates (from spatial or temporal or history tables) who coded with sample reordering (but no matter the type of sample reordering method) are inserted to the list.

d. For example, if the target video unit is to be coded WITHOUT sample reordering, those motion candidates (from spatial or temporal or history tables) who coded with same reordering method may not be inserted to the list.

e. Alternatively, the motion list generation for a video unit may not be dependent on the reordering method associated with each motion candidate.

f. For example, the Adaptive Reordering of Merge Candidates (ARMC) of a video unit may be dependent on the reordering method.

a. For example, if the target video unit is to be coded with sample reordering, the motion candidates who coded with same reordering method as the reordering method of the target video unit may be put prior to those motion candidates who coded with different reordering method.

b. For example, if the target video unit is to be coded with sample reordering, the motion candidates who coded with sample reordering (but no matter the type of sample reordering method) may be put prior to those motion candidates who coded with different reordering method.

c. For example, if the target video unit is to be coded WITHOUT sample reordering, the motion candidates who coded without reordering method may be put prior to those motion candidates who coded with reordering method.

d. Alternatively, the ARMC may be applied to the video unit, no matter the reordering method associated with each motion candidate.

2. About the implicit determination of sample reordering (e.g., the 2nd and related issues), the following methods are proposed:

a. Whether or not reordering the reconstruction/original/prediction samples of a video unit may be implicitly derived from coded information at both encoder and decoder.

a. The implicit derivation may be based on costs/errors/differences calculated from coded information.

i. For example, costs/errors/differences may be calculated based on template matching.

ii. For example, the template matching may be conducted by comparing samples in a first template and a second template.

1. For example, the first template is constructed by a group of pre-defined samples neighboring to current video unit, while the second template is constructed by a group of corresponding samples neighboring to a reference video unit.

2. For example, the cost/error may refer to the accumulated sum of differences between samples in the first template and corresponding samples in the second template.

a. For example, the difference may be based on luma sample value.

3. For example, the sample may refer to reconstruction sample, or a variant based on reconstruction sample.

4. For example, the sample may refer to prediction sample, or a variant based on prediction sample.

b. For example, a first cost may be calculated without reordering (denoted by Cost0), a second cost may be calculated with reordering (denoted by Cost1). Eventually, the minimum cost value among {Cost0, Cost1} is identified and the corresponding coding method (without reorder, or, reorder) is determined as the final coding method of the video unit.

c. Alternatively, whether reordering the reconstruction/original/prediction samples of a video unit may be signalled in the bitstream.

i. For example, it may be signalled by a syntax element (e.g., flag).

b. Which reordering method is used to reorder the reconstruction/original/prediction samples may be implicitly derived from coded information at both encoder and decoder.

a. For example, whether horizontal flipping or vertical flipping.

b. The implicit derivation may be based on costs/errors/differences calculated from coded information.

i. For example, costs/errors/differences may be calculated based on template matching.

ii. For example, the template matching may be conducted by comparing samples in a first template and a second template.

1. For example, the first template is constructed by a group of pre-defined samples neighboring to current video unit, while the second template is constructed by a group of corresponding samples neighboring to a reference video unit.

2. For example, the cost/error may refer to the accumulated sum of differences between samples in the first template and corresponding samples in the second template.

a. For example, the difference may be based on luma sample value.

3. For example, the sample may refer to reconstruction sample, or a variant based on reconstruction sample.

4. For example, the sample may refer to prediction sample, or a variant based on prediction sample.

iii. For example, a first cost may be calculated without reordering method A (denoted by Cost0), a second cost may be calculated with reordering method B (denoted by Cost1). Eventually, the minimum cost value among {Cost0, Cost1} is identified and the corresponding coding method (reorder method A, reorder method B) is determined as the final coding method of the video unit.

c. Alternatively, which reordering method is used to reorder the reconstruction/original/prediction samples of a video unit may be signalled in the bitstream.

i. For example, it may be signalled by a syntax element (e.g., flag, or an index, or a parameter, or a variable).

c. Whether or not AND which reordering method is used to reorder the reconstruction/original/prediction samples of a video unit may be implicitly derived from coded information at both encoder and decoder.

a. For example, a first cost may be calculated without reordering (denoted by Cost0), a second cost may be calculated with reordering method A (denoted by Cost1); a third cost may be calculated with reordering method B (denoted by Cost2). Eventually, the minimum cost value among {Cost0, Cost1, Cost2} is identified and the corresponding coding method (without reorder, reorder method A, reorder method B) is determined as the final coding method of the video unit.

3. About how to reorder samples (e.g., the 3rd and related issues), the following methods are proposed:

b. A possible sample reordering method may refer to one or more processes as followings:

a. The reordering process may be applied based on video units.

i. For example, the reordering process may be based on a block/CU/PU/TU.

ii. For example, the reordering process may not be based on a tile/slice/picture.

b. Samples of a video unit may be transformed according to a M-parameter model (such as M=2 or 4 or 6 or 8).

c. Samples of a video unit may be reordered.

d. Samples of a video unit may be rotated.

e. Samples of a video unit may be transformed according to an affine model.

f. Samples of a video unit may be transformed according to a linear model.

g. Samples of a video unit may be transformed according to a projection model.

h. Samples of a video unit may be flipped along the horizontal direction.

i. Samples of a video unit may be flipped along the vertical direction.

General

4. Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

5. Whether to and/or how to apply the disclosed methods above may be signalled at PB/TB/CB/PU/TU/CU/VPDU/CTU/CTU row/slice/tile/sub-picture/other kinds of region contain more than one sample or pixel.

6. Whether to and/or how to apply the disclosed methods above may be dependent on coded information, such as block size, colour format, single/dual tree partitioning, colour component, slice/picture type.

3 PROBLEMS

1. As far as now, arbitrary motion vectors can be applied to coding units coded by IBC AMVP, however, a certain motion constraint may be applied, in case that sample reordering may or may not be used to the video unit.

2. In case that a certain motion constraint is applied to a video unit, the AMVR signalling may be changed based on the motion constraint.

3. The template matching based method (such as intra template matching, IBC with template matching) may be modified in case of enabling sample reordering.

4. Sample reordering can be extended to intra template matching. When sample reordering based intra template matching is used, new procedures need to be designed.

a. Moreover, sample reordering can be extended to IBC with template matching. When sample reordering based IBC template matching is used, new procedures need to be designed.

5. The motion search with template matching need to be specified when sampling reordering method is applied.

6. How to determine the sampling reordering method for a template matching (such as intra template matching, IBC with template matching, etc.) coded block need to be specified.

4 DETAIL SOLUTIONS

The detailed embodiments below should be considered as examples to explain general concepts. These embodiments should not be interpreted in a narrow way. Furthermore, these embodiments can be combined in any manner.

The terms 'video unit' or 'coding unit' may represent a picture, a slice, a tile, a coding tree block (CTB), a coding tree unit (CTU), a coding block (CB), a CU, a PU, a TU, a PB, a TB.

The terms 'block' may represent a coding tree block (CTB), a coding tree unit (CTU), a coding block (CB), a CU, a PU, a TU, a PB, a TB.

It is noted that the terminologies mentioned below are not limited to the specific ones defined in existing standards. Any variance of the coding tool is also applicable.

4.1 About the motion constraints for coding tools (e.g., the 1st problem and related issues), the following methods are proposed:

a. Motion vector of a video unit coded with a certain prediction method may be constrained by a certain rule.

a. The motion vector may refer to one or more items as followings:

i. motion vector difference, ii. motion vector, iii. motion vector predictor.

b. The prediction method may refer to one or more items as followings:

i. IBC AMVP mode, ii. IBC merge mode, iii. IBC merge mode with template matching, iv. Intra template matching, v. Sample reordering based IBC AMVP mode, vi. Sample reordering based IBC merge mode, vii. Sample reordering based IBC merge mode with template matching, viii. Sample reordering based intra template matching.

c. The rule may refer to one or more items as followings:

i. The horizontal component of motion vectors may be required to be equal to zero.

ii. The vertical component of motion vectors may be required to be equal to zero.

b. For example, given that a video unit is coded with IBC AMVP mode, the horizontal component of motion vectors may be required to be equal to zero.

a. Alternatively, given that a video unit is coded with IBC AMVP mode, the vertical component of motion vectors may be required to be equal to zero.

b. Furthermore, the IBC AMVP mode in the disclosed bullet may be replaced by IBC merge mode.

c. Furthermore, the IBC AMVP mode in the disclosed bullet may be replaced by IBC with template matching mode.

i. In one example, the template matching may be required to be searched along one direction (either horizontal or vertical).

d. Furthermore, the IBC AMVP mode in the disclosed bullet may be replaced by intra template matching mode.

i. In one example, the template matching may be required to be searched along one direction (either horizontal or vertical).

c. For example, given that a video unit is coded with sample reordering based IBC AMVP mode (such as samples are flipping horizontally), the vertical component of motion vectors may be treated/constrained/required to be equal to zero.

a. For example, given that a video unit is coded with sample reordering based IBC AMVP mode (such as samples are flipping vertically), the horizontal component of motion vectors may be treated/constrained/required to be equal to zero.

b. Furthermore, the IBC AMVP mode in the disclosed bullet may be replaced by IBC merge mode.

c. Furthermore, the IBC AMVP mode in the disclosed bullet may be replaced by IBC with template matching mode.

i. In one example, the template matching may be required to be searched along horizontal direction (vertical component of motion vectors equal to 0) for horizontal flip ii. In one example, the template matching may be required to be searched along vertical direction (horizontal component of motion vectors equal to 0) for vertical flip.

d. Furthermore, the IBC AMVP mode in the disclosed bullet may be replaced by intra template matching mode.

d. For example, if a certain component of a motion vector (such as MVx or MVy) of a video unit is treated/constrained/required to be equal to zero, a. The corresponding component of the motion vector difference (such as MVDx or MVDy) of the video unit may be treated/constrained/required to be equal to zero.

b. The corresponding component of the motion vector predictor (such as MVPx or MVPy) of the video unit may be treated/constrained/required to be equal to zero.

e. For example, if a certain component of a motion vector difference (such as MVDx or MVDy) of a video unit is treated/constrained/required to be equal to zero, a. The corresponding component of a motion vector difference may be not signalled but inferred to be equal to zero.

f. For example, the signaling of motion vector difference (MVD) for a certain video unit may be dependent on the motion constraint applied to the video unit.

a. For example, the sign of MVDx may be not signalled, given that MVDx of the video unit treated/constrained/required to be equal to zero.

b. For example, the sign of MVDy may be not signalled, given that MVDy of the video unit treated/constrained/required to be equal to zero.

g. For example, if a first component of a motion vector is treated/constrained/required to be equal to zero, the first component of the corresponding MVD/MVP is treated/constrained/required to be equal to zero.

h. "zero" in the above bullets may be replaced by any other fixed or derived or signaled value.

4.2 About the AMVR signalling based on the motion constraint (e.g., the 2nd problem and related issues), the following methods are proposed:

a. For example, the signaling of the resolution of the motion vector difference (e.g., amvr_precision_idx of AMVR) for a certain video unit may be dependent on the motion constraint applied to the video unit.

a. For example, the video unit may be coded with a kind of AMVP mode.

b. For example, the video unit may be coded with IBC AMVP.

c. For example, the video unit may be coded with sample reordering based IBC AMVP.

d. For example, the video unit may be coded with sample reordering based AMVP mode.

e. For example, the signalling/presence of the resolution of the motion vector difference (e.g., amvr_precision_idx) may be decoupled from MVDx. For example, the signaling may be only dependent on whether the value of MVDy is equal to zero (instead of checking both MVDx and MVDy), given that MVDx of the video unit treated/constrained/required to be equal to zero.

f. For example, the signalling/presence of the resolution of the motion vector difference (e.g., amvr_precision_idx) may be decoupled from MVDy. For example, the signaling may be only dependent on whether the value of MVDx is equal to zero (instead of checking both MVDx and MVDy), given that MVDy of the video unit treated/constrained/required to be equal to zero.

g. For example, if the resolution of the motion vector difference (e.g., amvr_precision_idx) is not signalled for such video unit, it may be inferred to be equal to a certain value (such as 0) indicating a default resolution is used.

i. For example, the default resolution may be 1-pel precision, in case the video unit is coded based on IBC AMVP mode.

ii. For example, the default resolution may be 1-pel precision, in case the video unit is coded based on sample reordering based IBC AMVP mode.

b. For example, the signaling of amvr_precision_idx for IBC AMVP coded block may be changed as follows (taking the syntax structure in the VVC spec as an example), wherein cu_ibc_reorder_type indicates whether and how samples in the IBC AMVP coded block are reordered.

```
...
else if( CuPredMode[ chType ][ x0 ][ y0 ] = = MODE_IBC ) {
    mvd_coding( x0, y0, 0, 0 )
    if( MaxNumIbcMergeCand > 1 )
        mvp_l0_flag[ x0 ][ y0 ]                                      ae(v)
    if( sps_amvr_enabled_flag
        ( MvdL0[ x0 ][ y0 ][ 0 ] != 0 || MvdL0[ x0 ][ y0 ][ 1 ] != 0 &&
cu_ibc_reorder_type == NO_FLIP) ||
(MvdL0[ x0 ][ y0 ][ 1 ] != 0 && cu_ibc_reorder_type == FLIP_HOR ) ||
( MvdL0[ x0 ][ y0 ][ 0 ] != 0 && cu_ibc_reorder_type == FLIP_VER )
    )
        amvr_precision_idx[ x0 ][ y0 ]                               ae(v)
    } else {
...
```

4.3 About the template matching (e.g., intra TM, IBC with TM) modification in case of enabling sample reordering (e.g., the 3rd problem and related issues), the following methods are proposed:

Suppose a first template is used for a first video unit coded with TM with sample reordering, and a second template is used for a second video unit coded with TM without sample reordering:

a. For example, the locations of samples that comprise the template may be dependent on the sample reordering method used to a video unit.

a. For example, the sample locations of the first template and the second template may be different.

b. For example, the second template may be constructed with samples above and left to the video unit.

c. For example, the first template may be constructed with samples above OR left to the video unit.

i. For example, if the first video unit is coded with horizontal flipping, then the first template may be constructed with samples above to the video unit.

ii. For example, if the first video unit is coded with vertical flipping, then the first template may be constructed with samples left to the video unit.

d. Alternatively, the sample locations of the first template and the second template may be same.

b. For example, the number of samples that comprise the template may be dependent on the sample reordering method used to a video unit.

a. For example, the number of rows and/or columns of the first template and the second template may be different.

b. For example, the second template may be constructed with M1 rows of samples above and N1 columns of samples left to the video unit, while the first template may be constructed with M2 rows of samples above and/or N2 columns of samples left to the video unit. The following rules may conform:

i. M1!=M2, ii. N1!=N2.

c. Alternatively, the number of rows and/or columns of the first template and the second template may be same.

4.4 About sample reordering based intra/IBC template matching (e.g., the 4th problem and related issues), the following methods are proposed:

a. How to derive the reference template of a sample reordering coded block may be dependent on coding information.

a. For example, it may be dependent on the sample reordering type and/or the template shape to be used to the current block.

b. The derivation of motion vector (block vector) of a sample reordering coded block may be dependent on coding information.

a. For example, it may be dependent on the sample reordering type and/or the template shape to be used to the current block.

b. For example, it may be dependent on the dimensions (such as width and/or height) of the current block.

c. For example, it may be dependent on the dimensions (such as width and/or height) of the template (or partial template).

d. For example, it may be dependent on the coordinates of positions of the current block or the template (such as a center sample location or the top-left sample location).

i. For example, the template may be current template and/pr reference template.

c. Eight examples of sample reordering based template matching are shown in FIG. 10A-FIG. 10H, respectively, wherein the dashed line denotes the flipping is performed across that dashed line (i.e., horizontal dash line indicates vertical flip which means flip upside down, vertical dashed line indicates horizontal flip which means flip left right), rectangles denote current block, current template, reference block and reference template. For example, the rectangle block with (x1, y1) as the top-left sample is the current block. The rectangular block with (x1', y1') as the top-left sample and the rectangular block with (x1", y1") as the top-left sample are current templates. The rectangle block with (x2, y2) as the top-left sample is the reference block. The rectangular block with (x2', y2') as the top-left sample and the rectangular block with (x2", y2") as the top-left sample are reference templates. BV'x and BV'y denote the horizontal and vertical displacement between the current template and the reference template, respectively. BVx and BVy denote the horizontal and vertical displacement between the current block and the reference block, respectively, $(W_{cur}, H_{cur})$ denotes the width and height of current block, $(W_{tmpH}, H_{tmpH})$ denotes the width and height of the horizontal template along the block width direction, $(W_{tmpV}, H_{tmpV})$ denotes the width and height of the vertical template along the block height direction, (x1, y1) and (x2, y2) represent the coordinates of top-left sample of the current block and the reference block, respectively, (x1', y1') and (x2', y2') represent the coordinates of top-left sample of the current horizontal template and the reference horizontal template, respectively, (x1", y1") and (x2", y2") represent the coordinates of top-left sample of the current vertical template and the reference vertical template, respectively.

a. For example, in case of horizontal template and horizontal flip (i.e., FIG. 10A), i. In one example, the current template comprises neighboring samples above to the current block, and the reference template comprises neighboring samples above to the reference block.

ii. In one example, the relative location of (current block, current template) and the relative location of (reference block, reference template) may be same.

1. In one example, $x1-x1'=x2-x2'$, and $y1-y1'=y2-y2'$,

2. In one example, $x1-x1'=0$, and $y1-y1'=H_{tmpH}$.

iii. In one example, either the samples in the current template or the samples in the reference template may be flipped.

iv. In one example, the samples in the current template may be flipped according to the flip type being checked (e.g., horizontal flip).

v. In one example, the samples in the reference template may be flipped according to the flip type being checked (e.g., horizontal flip).

vi. In one example, $BVx=BV'x$, vii. In one example, $x1'-x2'=x1-x2$.

b. For example, in case of vertical template and horizontal flip (i.e., FIG. 10B), i. In one example, the current template may comprises neighboring samples left to the current block, and the reference template may comprises neighboring samples right to the reference block.

ii. In one example, the relative location of (current block, current template) and the relative location of (reference block, reference template) may be different.

1. In one example, $x1-x1''!=x2-x2''$, and $y1-y1''=y2-y2''$,

2. In one example, $x1-x1''=W_{tmpV}$, and $y1-y1''=0$,

3. In one example, $x2-x2''=-W_{cur}$, and $y2-y2''=0$.

iii. In one example, either the samples in the current template or the samples in the reference template may be flipped.

iv. In one example, the samples in the current template may be flipped according to the flip type being checked (e.g., horizontal flip).

v. In one example, the samples in the reference template may be flipped according to the flip type being checked (e.g., horizontal flip).

vi. In one example, $BVx=BV'x-W_{cur}-W_{tmpV}$.

vii. In one example, $x2''-x1''-W_{cur}-W_{tmpV}=x2-x1$.

c. For example, in case of horizontal-vertical template (wherein $W_{tmpH}=W_{cur}$) and horizontal flip (i.e., FIG. 10C), i. In one example, the current template may comprises neighboring samples above and left to the current block, and the reference template may comprises neighboring samples above and right to the reference block.

ii. In one example, the relative location of (current block, current horizontal template) and the relative location of (reference block, reference horizontal template) may be same.

1. In one example, $x1-x1'=x2-x2'$, and $y1-y1'=y2-y2'$.

2. In one example, $x1-x1'=0$, and $y1-y1'=H_{tmpH}$.

iii. In one example, the relative location of (current block, current vertical template) and the relative location of (reference block, reference vertical template) may be not same.

1. In one example, $x1-x1''!=x2-x2''$, and $y1-y1''=y2-y2''$.

2. In one example, $x1-x1''=W_{tmpV}$, and $y1-y1''=0$.

3. In one example, $x2-x2''=-W_{cur}$, and $y2-y2''=0$.

iv. In one example, either the samples in the current horizontal template or the samples in the reference horizontal template may be flipped.

1. Furthermore, either the samples in the current vertical template or the samples in the reference vertical template may be flipped.

v. In one example, the samples in the current horizontal and vertical template may be flipped according to the flip type being checked (e.g., horizontal flip).

vi. In one example, the samples in the reference horizontal and vertical template may be flipped according to the flip type being checked (e.g., horizontal flip).

vii. In one example, $BVx=BV'x$.

viii. In one example, $x1'-x2'=x1-x2$.

d. For example, in case of horizontal-vertical template (wherein $W_{tmpH}=W_{cur}+W_{tmpV}$) and horizontal flip (i.e., FIG. 10D), i. In one example, the current template may comprises neighboring samples above and left to the current block, and the reference template may comprises neighboring samples above and right to the reference block.

ii. In one example, the relative location of (current block, current horizontal template) and the relative location of (reference block, reference horizontal template) may be not same.

1. In one example, $x1-x1'!=x2-x2'$, and $y1-y1'=y2-y2'$.

2. In one example, $x1-x1'=W_{tmpV}$, and $y1-y1'=H_{tmpH}$.

3. In one example, $x2-x2'=0$, and $y2-y2'=H_{tmpH}$.

iii. In one example, the relative location of (current block, current vertical template) and the relative location of (reference block, reference vertical template) may be not same.

1. In one example, $x1-x1''!=x2-x2''$, and $y1-y1''=y2-y2''$.

2. In one example, $x1-x1''=W_{tmpV}$, and $y1-y1''=0$.

3. In one example, $x2-x2''=-W_{cur}$, and $y2-y2''=0$.

iv. In one example, either the samples in the current horizontal template or the samples in the reference horizontal template may be flipped.

1. Furthermore, either the samples in the current vertical template or the samples in the reference vertical template may be flipped.

v. In one example, the samples in the current horizontal and vertical template may be flipped according to the flip type being checked (e.g., horizontal flip).

vi. In one example, the samples in the reference horizontal and vertical template may be flipped according to the flip type being checked (e.g., horizontal flip).

vii. In one example, $BVx=BV'x-W_{tmpV}$.

viii. In one example, $x2'-x1'-W_{tmpV}=x2-x1$.

e. For example, in case of horizontal template and vertical flip (i.e., FIG. 10E), i. In one example, the current template may comprise neighboring samples above to the current block, and the reference template may comprises neighboring samples below to the reference block.

ii. In one example, the relative location of (current block, current template) and the relative location of (reference block, reference template) may be not same.

1. In one example, $x1-x1'=x2-x2'$, and $y1-y1'!=y2-y2'$.

2. In one example, $x1-x1'=0$, and $y1-y1'=H_{tmpH}$.

3. In one example, $x2-x2'=0$, and $y2-y2'=-H_{cur}$.

iii. In one example, either the samples in the current template or the samples in the reference template may be flipped.

iv. In one example, the samples in the current template may be flipped according to the flip type being checked (e.g., vertical flip).

v. In one example, the samples in the reference template may be flipped according to the flip type being checked (e.g., vertical flip).

vi. In one example, $BVy=BV'y-H_{tmpH}-H_{cur}$.

vii. In one example, $y2'-y1'-H_{tmpH}-H_{cur}=y2-y1$.

f. For example, in case of vertical template and vertical flip (i.e., FIG. 10F), i. In one example, the current template may comprise neighboring samples left to the current block, and the reference template may comprise neighboring samples left to the reference block.

ii. In one example, the relative location of (current block, current template) and the relative location of (reference block, reference template) may be same.

1. In one example, $x1-x1''=x2-x2''$, and $y1-y1''=y2-y2''$.

2. In one example, $x1-x1''=W_{tmpV}$, and $y1-y1''=0$.

iii. In one example, either the samples in the current template or the samples in the reference template may be flipped.

iv. In one example, the samples in the current template may be flipped according to the flip type being checked (e.g., vertical flip).

v. In one example, the samples in the reference template may be flipped according to the flip type being checked (e.g., vertical flip).

vi. In one example, $BVy=BV'y$.

vii. In one example, $y1''-y2''=y1-y2$.

g. For example, in case of horizontal-vertical template (wherein $W_{tmpH}=W_{cur}$) and vertical flip (i.e., FIG. 10G), i. In one example, the current template may comprises neighboring samples above and left to the current block, and the reference template may comprises neighboring samples left and below to the reference block.

ii. In one example, the relative location of (current block, current horizontal template) and the relative location of (reference block, reference horizontal template) may be not same.

1. In one example, $x1-x1'=x2-x2'$, and $y1-y1'!=y2-y2'$.

2. In one example, $x1-x1'=0$, and $y1-y1'=H_{tmpH}$.

3. In one example, $x2-x2'=0$, and $y2-y2'=-H_{cur}$.

iii. In one example, the relative location of (current block, current vertical template) and the relative location of (reference block, reference vertical template) may be same.

1. In one example, $x1-x1''=x2-x2''$, and $y1-y1''=y2-y2''$.

2. In one example, $x1-x1''=W_{tmpV}$, and $y1-y1''=0$.

iv. In one example, either the samples in the current horizontal template or the samples in the reference horizontal template may be flipped.

1. Furthermore, either the samples in the current vertical template or the samples in the reference vertical template may be flipped.

v. In one example, the samples in the current horizontal and vertical template may be flipped according to the flip type being checked (e.g., vertical flip).

vi. In one example, the samples in the reference horizontal and vertical template may be flipped according to the flip type being checked (e.g., vertical flip).

vii. In one example, $BVy=BV'y-H_{tmpH}-H_{cur}$.

viii. In one example, $y2'-y1'-H_{tmpH}-H_{cur}=y2-y1$.

h. For example, in case of horizontal-vertical template (wherein $W_{tmpH}=W_{cur}+W_{tmpV}$) and vertical flip (i.e., FIG. 10H), i. In one example, the current template may comprises neighboring samples above and left to the current block, and the reference template may comprises neighboring samples left and below to the reference block.

ii. In one example, the relative location of (current block, current horizontal template) and the relative location of (reference block, reference horizontal template) may be not same.

1. In one example, $x1-x1'=x2-x2'$, and $y1-y1'!=y2-y2'$.

2. In one example, $x1-x1'=W_{tmpV}$, and $y1-y1'=H_{tmpH}$.

3. In one example, $x2-x2'=W_{tmpV}$, and $y2-y2'=-H_{cur}$.

iii. In one example, the relative location of (current block, current vertical template) and the relative location of (reference block, reference vertical template) may be same.

1. In one example, $x1-x1''=x2-x2''$, and $y1-y1''=y2-y2''$.

2. In one example, $x1-x1''=W_{tmpV}$, and $y1-y1''=0$.

iv. In one example, either the samples in the current horizontal template or the samples in the reference horizontal template may be flipped.

1. Furthermore, either the samples in the current vertical template or the samples in the reference vertical template may be flipped.

v. In one example, the samples in the current horizontal and vertical template may be flipped according to the flip type being checked (e.g., vertical flip).

vi. In one example, the samples in the reference horizontal and vertical template may be flipped according to the flip type being checked (e.g., vertical flip).

vii. In one example, $BVy=BV'y-H_{tmpH}-H_{cur}$.

viii. In one example, $y2'-y1'-H_{tmpH}-H_{cur}=y2-y1$.

4.5 About the motion search with template matching when sampling reordering method is applied, (e.g., the 5th problem and related issues), the following methods are proposed:

a. In one example, for a sample reordering method (such as vertical flip or horizontal flip) samples in the template around the current block may be reordered before being compared with samples (which are not reordered) in the template around the reference block to get a cost.

b. In one example, for a sample reordering method (such as vertical flip or horizontal flip) samples in the template around the reference block may be reordered before being compared with samples (which are not reordered) in the template around the current block to get a cost.

c. In one example, for a sample reordering method (such as vertical flip or horizontal flip) samples in both the template around the reference block and the template around the current block may be reordered before being compared to get a cost.

4.6 About how to determine the sampling reordering method (such as no flip, vertical flip or horizontal flip) for a template matching (such as intra template matching, and/or IBC mode with template matching) coded block (e.g., the 6th problem and related issues), the following methods are proposed:

a. In one example, the sampling reordering method may depend on at least one syntax element signaled from the encoder to the decoder.

i. In one example, the syntax element may indicate whether to and/or how to reorder samples for a template matching coded block (such as intra template matching, and/or IBC mode with template matching, etc.).

ii. The syntax element may be coded with the same manner as that used to indicate whether to and/or how to reorder samples for a certain prediction method (such as IBC) coded block.

b. In one example, the sampling reordering method may be derived based on at least one template cost.

i. In one example, motion search with template matching with different sampling reordering methods may be applied for a block, to derive the minimum costs for different sampling reordering methods.

ii. In one example, the sampling reordering method with the smallest template cost may be derived as the determined sampling reordering method.

General 4.7 Whether to and/or how to apply the disclosed methods above may be signalled at sequence level/group of pictures level/picture level/slice level/tile group level, such as in sequence header/picture header/SPS/VPS/DPS/DCI/PPS/APS/slice header/tile group header.

4.8 Whether to and/or how to apply the disclosed methods above may be signalled at PB/TB/CB/PU/TU/CU/VPDU/CTU/CTU row/slice/tile/sub-picture/other kinds of region contain more than one sample or pixel.

4.9 Whether to and/or how to apply the disclosed methods above may be dependent on coded information, such as block size, colour format, single/dual tree partitioning, colour component, slice/picture type.

The embodiments of the present disclosure are related to motion information determination. As used herein, the term "block" may represent a coding tree block (CTB), a coding tree unit (CTU), a coding block (CB), a coding unit (CU), a prediction unit (PU), a transform unit (TU), a prediction block (PB), a transform block (TB), or a video processing unit comprising a plurality of samples or pixels. A block may be rectangular or non-rectangular.

As used herein, the term "motion information" may refer to a motion vector (MV), a motion vector difference (MVD) or a motion vector predictor.

FIG. 11 illustrates a flowchart of a method 1100 for video processing in accordance with embodiments of the present disclosure. The method 1100 is implemented for a conversion between a current video block of a video and a bitstream of the video. In some embodiments, the conversion between the current video block and the bitstream may include encoding the current video block into the bitstream. Alternatively, or in addition, the conversion may include decoding the current video block from the bitstream.

At block 1110, motion information of the current video block is determined. The current video block is coded with at least one of: an intra block copy (IBC) merge mode, an IBC with template matching mode, or an intra template matching mode. At block 1120, the motion information is updated based on a constraint. The constraint indicates a target value of a component of the motion information. At block 1130, the conversion is performed based on the updated motion information.

The method 1100 enables updating the motion information based on a constraint. In this way, coding effectiveness and coding efficiency can be improved.

In some embodiments, the current video block is coded with at least one of: a sample reordering-based IBC merge mode, a sample reordering-based IBC with template matching mode, or a sample reordering-based intra template matching mode. A vertical component of the motion information may be undated to be the target value.

In some embodiments, a sample of the current video block is flipped horizontally.

In some embodiments, the current video block is coded with the sample reordering-based IBC with template matching mode. A template matching of the current video block is searched along a horizontal direction for a horizontal flip. In one example, the template matching may be required to be searched along horizontal direction (vertical component of motion vectors equal to 0) for horizontal flip.

In some embodiments, the current video block is coded with at least one of: a sample reordering-based IBC merge mode, a sample reordering-based IBC with template matching mode, or a sample reordering-based intra template matching mode. A horizontal component of the motion information may be updated to be the target value.

In some embodiments, a sample of the current video block is flipped vertically.

In some embodiments, the current video block is coded with the sample reordering-based IBC with template matching mode. A template matching of the current video block is searched along a vertical direction for a vertical flip. In one example, the template matching may be required to be searched along vertical direction (horizontal component of motion vectors equal to 0) for vertical flip.

In some embodiments, the current video block is coded with at least one of: an IBC merge mode, an IBC with template matching mode, or an intra template matching mode. The component of the motion information may be updated to be the target value.

In some embodiments, the component of the motion information comprises at least one of: a horizontal component of the motion information, or a vertical component of the motion information.

In some embodiments, the current video block is coded with at least one of: an IBC with template matching mode, or an intra template matching mode, and a template matching of the current video block is search along a single direction.

In some embodiments, the single direction comprises one of: a horizontal direction, or a vertical direction.

In some embodiments, the motion information comprises at least one of: a motion vector, a motion vector difference, or a motion vector predictor.

In some embodiments, the target value is zero.

In some embodiments, the target value is included in the bitstream. Alternatively, or in addition, in some embodiments, the target value is derived during the conversion.

According to further embodiments of the present disclosure, a non-transitory computer-readable recording medium is provided. The non-transitory computer-readable recording medium stores a bitstream of a video which is generated by a method performed by an apparatus for video processing. In the method, motion information of a current video block of the video is determined. The current video block is coded with at least one of: an intra block copy (IBC) merge mode, an IBC with template matching mode, or an intra template matching mode. The motion information is updated based on a constraint. The constraint indicates a target value of a component of the motion information. The bitstream is generated based on the updated motion information.

According to still further embodiments of the present disclosure, a method for storing bitstream of a video is provided. In the method, motion information of a current video block of the video is determined. The current video block is coded with at least one of: an intra block copy (IBC) merge mode, an IBC with template matching mode, or an intra template matching mode. The motion information is updated based on a constraint. The constraint indicates a target value of a component of the motion information. The bitstream is generated based on the updated motion information. The bitstream is stored in a non-transitory computer-readable recording medium.

FIG. 12 illustrates a flowchart of a method 1200 for video processing in accordance with embodiments of the present disclosure. The method 1200 is implemented for a conversion between a current video block of a video and a bitstream of the video. In some embodiments, the conversion between the current video block and the bitstream may include encoding the current video block into the bitstream. Alternatively, or in addition, the conversion may include decoding the current video block from the bitstream.

At block 1210, a reference template of the current video block is determined based on coding information of the current video block. The current video block is coded with a sample reordering mode. For example, how to derive the reference template of a sample reordering coded block may be dependent on coding information. At block 1220, the conversion is performed based on the reference template.

The method 1200 enables determining the reference template for the current video block coded with a sample reordering mode, and thus the coding efficiency and coding effectiveness can be improved.

In some embodiments, the coding information comprises at least one of: a sample reordering type of the sample reordering mode, or a template shape of the reference template.

In some embodiments, the method 1200 further comprises: determining motion information of the current video block based on the coding information of the current video block. For example, the derivation of motion vector (block vector) of a sample reordering coded block may be dependent on coding information.

In some embodiments, the motion information comprises one of: a motion vector of the current video block, or a block vector of the current video block.

In some embodiments, the coding information comprises at least one of: a sample reordering type of the sample reordering mode, a template shape of the reference template, a dimension of the current video block, a dimension of a template of the current video block, a dimension of a partial of the template, a location of the current video block, or a location of the template.

In some embodiments, the template of the current video block comprises at least one of: a current template of the current video block, or the reference template of the current video block.

In some embodiments, the dimension of the current video block comprises at least one of: a width of the current video block, or a height of the current video block.

In some embodiments, the dimension of the template or the dimension of the partial of the template comprises at least one of a width of the template or a width of the partial of the template, or a height of the template or a height of the partial of the template.

In some embodiments, a location of the current video block or a location of the template comprises at least one of: a location of a center sample of the current video block, a location of a center sample of the template, a location of a top-left sample of the current block, or a location of a top-left sample of the template.

Figure 10A:
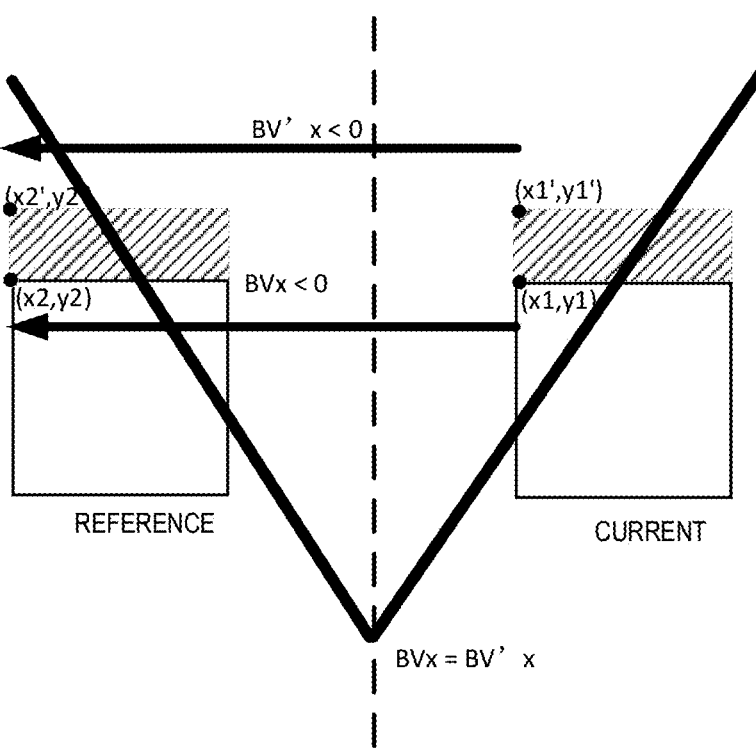
FIG. 10A-FIG. 10H illustrate examples of sample reordering based template matching, respectively.

In some embodiments, as shown in FIG. 10A, a current template of the current video block and the reference template of a reference block of the current video block are horizontal templates. A width of the horizontal templates is the same with a width of the current video block. The sample reordering mode comprises a horizontal flip reordering mode.

In some embodiments, the current template comprises a neighboring sample above to the current video block, and the reference template comprises a neighboring sample above to the reference block.

In some embodiments, a location difference between the current template and the current video block is the same with a location difference between the reference template and the reference block.

In some embodiments, a first horizontal distance between a top-left sample of the current template and a top-left sample of the current video block is the same with a second horizontal distance between a top-left sample of the reference template and a top-left sample of the reference block. A first vertical distance between the top-left sample of the current template and the top-left sample of the current video block is the same with a second vertical distance between the top-left sample of the reference template and the top-left sample of the reference block. For example, $x1-x1'=x2-x2'$, and $y1-y1'=y2-y2'$.

In some embodiments, the first and second horizontal distances are zero. The first and second vertical distances are a height of the current template or the reference template. For example, $x1-x1'=0$, and $y1-y1'=H_{tmpH}$.

In some embodiments, a distance between the top-left sample of the current template and the top-left sample of the reference template is the same with a distance between the top-left sample of the current video block and the top-left sample of the reference block. For example, $x1'-x2'=x1-x2$.

In some embodiments, at least one of a sample in the current template or a sample in the reference template is flipped.

In some embodiments, a flip type of the current video block is horizontal flip, and at least one of a sample in the current template or a sample in the reference template is flipped.

In some embodiments, a horizontal distance between the current video block and the reference block is the same with a horizontal distance between the current template and the reference template. For example, BVx=BV'x.

Figure 10B:
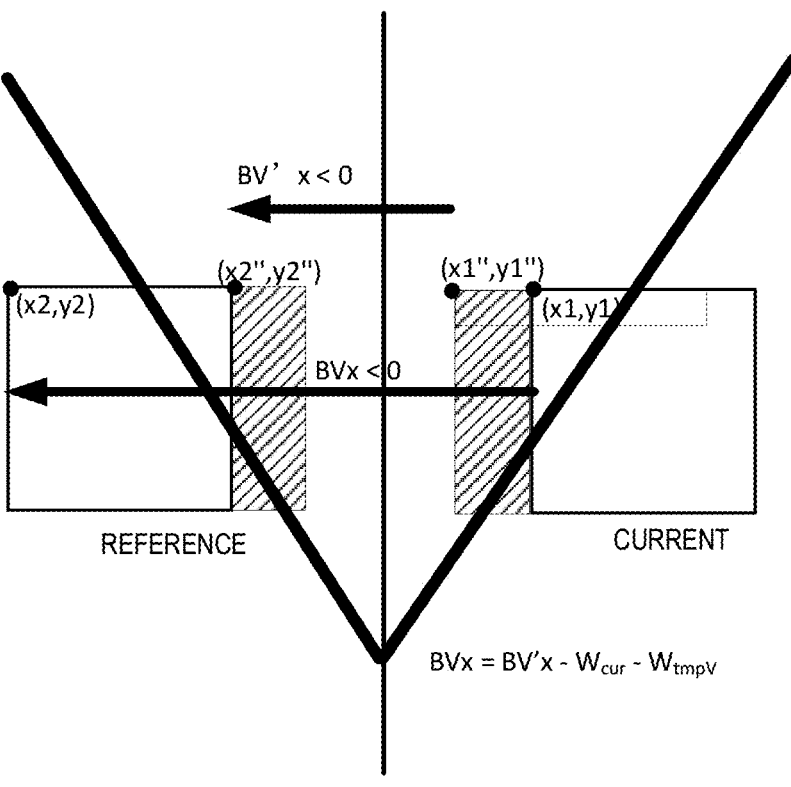

In some embodiments, as shown in FIG. 10B, a current template of the current video block and the reference template of a reference block of the current video block are vertical templates. A height of the vertical templates is the same with a height of the current video block. The sample reordering mode comprises a horizontal flip reordering mode.

In some embodiments, the current template comprises a neighboring sample left to the current video block, and the reference template comprises a neighboring sample right to the reference block.

In some embodiments, a location difference between the current template and the current video block is different from a location difference between the reference template and the reference block.

In some embodiments, a first horizontal distance between a top-left sample of the current template and a top-left sample of the current video block is different from a second horizontal distance between a top-left sample of the reference template and a top-left sample of the reference block. A first vertical distance between the top-left sample of the current template and the top-left sample of the current video block is the same with a second vertical distance between the top-left sample of the reference template and the top-left sample of the reference block. For example, x1−x1"!=x2−x2", and y1−y1"=y2−y2".

In some embodiments, the first horizontal distance is a width of the current template, and the first vertical distance is zero. For example, $x1-x1''=W_{tmpV}$, and y1−y1"=0.

In some embodiments, the second horizontal distance is a width of the current video block, the reference template being right to the reference block, and the second vertical distance is zero. For example, $x2-x2''=-W_{cur}$, and y2−y2"=0.

In some embodiments, a sum of a first distance between the top-left sample of the current template and the top-left sample of the reference template, a width of the current video block and a width of the current template is equal to a second distance between the top-left sample of the current video block and the top-left sample of the reference block. For example, $x2''-x1''-W_{cur}-W_{tmpV}=x2-x1$.

In some embodiments, at least one of a sample in the current template or a sample in the reference template is flipped.

In some embodiments, a flip type of the current video block is horizontal flip, and at least one of a sample in the current template or a sample in the reference template is flipped.

In some embodiments, a sum of a first horizontal distance between the current video block and the reference block, a width of the current video block and a width of the current template is equal to a second horizontal distance between the current template and the reference template. For example, $BVx=BV'x-W_{cur}-W_{tmpV}$.

In some embodiments, a current template of the current video block comprises a horizontal current template and a vertical current template. The reference template of a reference block of the current video block comprises a horizontal reference template and a vertical reference template. The sample reordering mode comprises a horizontal flip reordering mode.

Figure 10C:
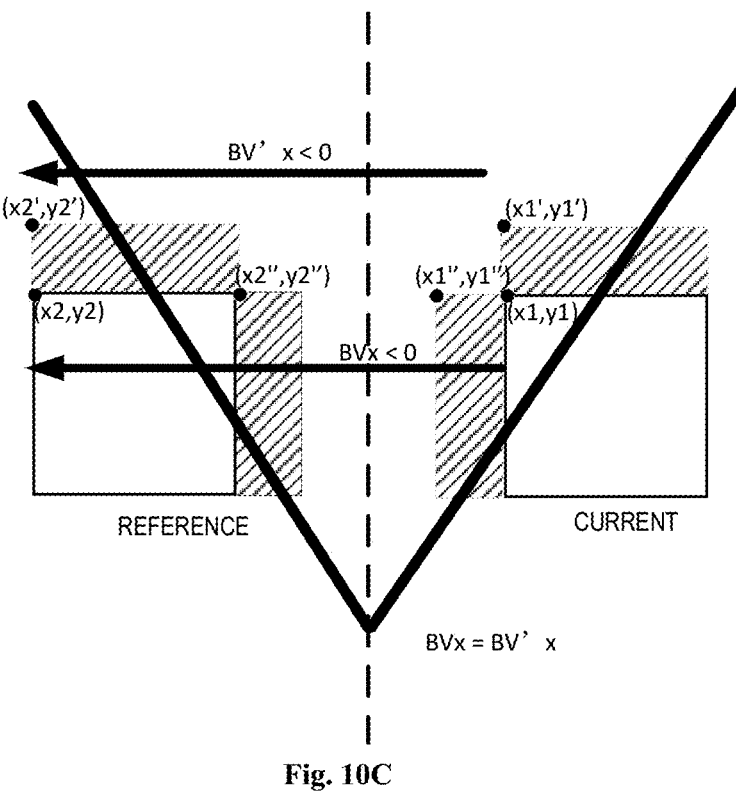

In some embodiments, as shown in FIG. 10C, a width of the horizontal current template and a width of the horizontal reference template is the same with a width of the current video block.

In some embodiments, the current template comprises a neighboring sample above to the current video block and a neighboring sample left to the current video block, and the reference template comprises a neighboring sample above to the reference block and a neighboring sample right to the reference block.

In some embodiments, a location difference between the horizontal current template and the current video block is the same with a location difference between the horizontal reference template and the reference block.

In some embodiments, a first horizontal distance between a top-left sample of the horizontal current template and a top-left sample of the current video block is the same with a second horizontal distance between a top-left sample of the horizontal reference template and a top-left sample of the reference block. A first vertical distance between the top-left sample of the horizontal current template and the top-left sample of the current video block is the same with a second vertical distance between the top-left sample of the horizontal reference template and the top-left sample of the reference block. For example, x1−x1'=x2−x2', and y1−y1'=y2−y2'.

In some embodiments, the first horizontal distance is zero, and the first vertical distance is a height of the horizontal current template. For example, x1−x1'=0, and $y1-y1'=H_{tmpH}$.

In some embodiments, a distance between the top-left sample of the horizontal current template and the top-left sample of the horizontal reference template is equal to a distance between the top-left sample of the current video block and the top-left sample of the reference block. For example, x1'−x2'=x1−x2.

In some embodiments, a location difference between the vertical current template and the current video block is different from a location difference between the vertical reference template and the reference block.

In some embodiments, a third horizontal distance between a top-left sample of the vertical current template and a top-left sample of the current video block is different from a fourth horizontal distance between a top-left sample of the vertical reference template and a top-left sample of the reference block. A third vertical distance between the top-left sample of the vertical current template and the top-left sample of the current video block is the same with a fourth vertical distance between the top-left sample of the vertical reference template and the top-left sample of the reference block. For example, x1−x1"!=x2−x2", and y1−y1"=y2−y2".

In some embodiments, the third horizontal distance is a width of the vertical current template, and the third vertical distance is zero. For example, $x1-x1''=W_{tmpV}$, and y1−y1"=0.

In some embodiments, the fourth horizontal distance is a width of the current video block, the vertical reference template being right to the reference block, and the fourth vertical distance is zero. For example, $x2-x2''=-W_{cur}$, and y2−y2"=0.

In some embodiments, at least one of a sample in the horizontal current template or a sample in the horizontal reference template is flipped.

In some embodiments, at least one of a sample in the vertical current template or a sample in the vertical reference template is flipped.

In some embodiments, a flip type of the current video block is horizontal flip, and a sample in the horizontal current template and a sample in the vertical current template are flipped.

In some embodiments, a flip type of the current video block is horizontal flip, and a sample in the horizontal reference template and a sample in the vertical reference template are flipped.

In some embodiments, a horizontal distance between the current video block and the reference block is equal to a horizontal distance between the horizontal current template and the horizontal reference template.

Figure 10D:
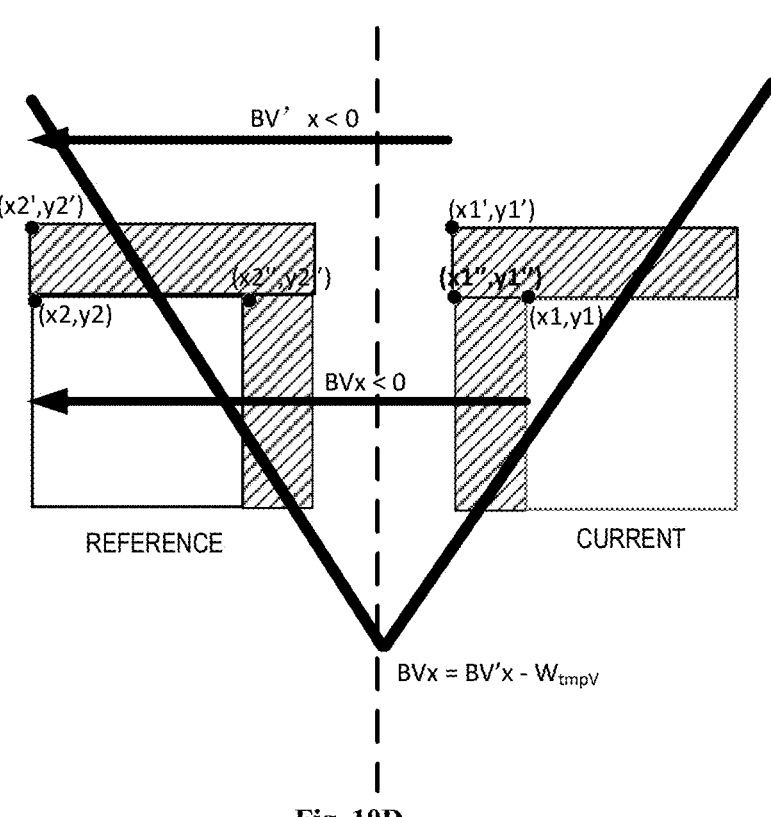

In some embodiments, as shown in FIG. 10D, a width of the horizontal current template and a width of the horizontal reference template are the same. A width of the vertical current template and a width of the vertical reference template are the same. The width of the horizontal current template is equal to a sum of a width of the current video block and a width of the vertical current template.

In some embodiments, the current template comprises a neighboring sample above to the current video block and a neighboring sample left to the current video block, and the reference template comprises a neighboring sample above to the reference block and a neighboring sample right to the reference block.

In some embodiments, a location difference between the horizontal current template and the current video block is different from a location difference between the horizontal reference template and the reference block.

In some embodiments, a first horizontal distance between a top-left sample of the horizontal current template and a top-left sample of the current video block is different from a second horizontal distance between a top-left sample of the horizontal reference template and a top-left sample of the reference block. A first vertical distance between the top-left sample of the horizontal current template and the top-left sample of the current video block is the same with a second vertical distance between the top-left sample of the horizontal reference template and the top-left sample of the reference block. For example, $x1-x1'!=x2-x2'$, and $y1-y1''=y2-y2'$.

In some embodiments, the first horizontal distance is a width of the vertical current template, and the first vertical distance is a height of the horizontal current template.

In some embodiments, the second horizontal distance is zero, and the second vertical distance is a height of the horizontal current template.

In some embodiments, a distance between the top-left sample of the horizontal current template and the top-left sample of the horizontal reference template is equal to a sum of a width of the vertical current template and a distance between the top-left sample of the current video block and the top-left sample of the reference block.

In some embodiments, a location difference between the vertical current template and the current video block is different from a location difference between the vertical reference template and the reference block.

In some embodiments, a third horizontal distance between a top-left sample of the vertical current template and a top-left sample of the current video block is different from a fourth horizontal distance between a top-left sample of the vertical reference template and a top-left sample of the reference block. A third vertical distance between the top-left sample of the vertical current template and the top-left sample of the current video block is the same with a fourth vertical distance between the top-left sample of the vertical reference template and the top-left sample of the reference block. For example, $x1-x1''!=x2-x2''$, and $y1-y1''=y2-y2''$.

In some embodiments, the third horizontal distance is a width of the vertical current template, and the third vertical distance is zero.

In some embodiments, the fourth horizontal distance is a width of the current video block, the vertical reference template being right to the reference block, and the fourth vertical distance is zero.

In some embodiments, at least one of a sample in the horizontal current template or a sample in the horizontal reference template is flipped.

In some embodiments, at least one of a sample in the vertical current template or a sample in the vertical reference template is flipped.

In some embodiments, a flip type of the current video block is horizontal flip, and a sample in the horizontal current template and a sample in the vertical current template are flipped.

In some embodiments, a flip type of the current video block is horizontal flip, and a sample in the horizontal reference template and a sample in the vertical reference template are flipped.

In some embodiments, a horizontal distance between the horizontal current template and the horizontal reference template is equal to a sum of a width of the vertical current template and a horizontal distance between the current video block and the reference block. For example, $BVx=BV'x-W_{tmpV}$.

Figure 10E:
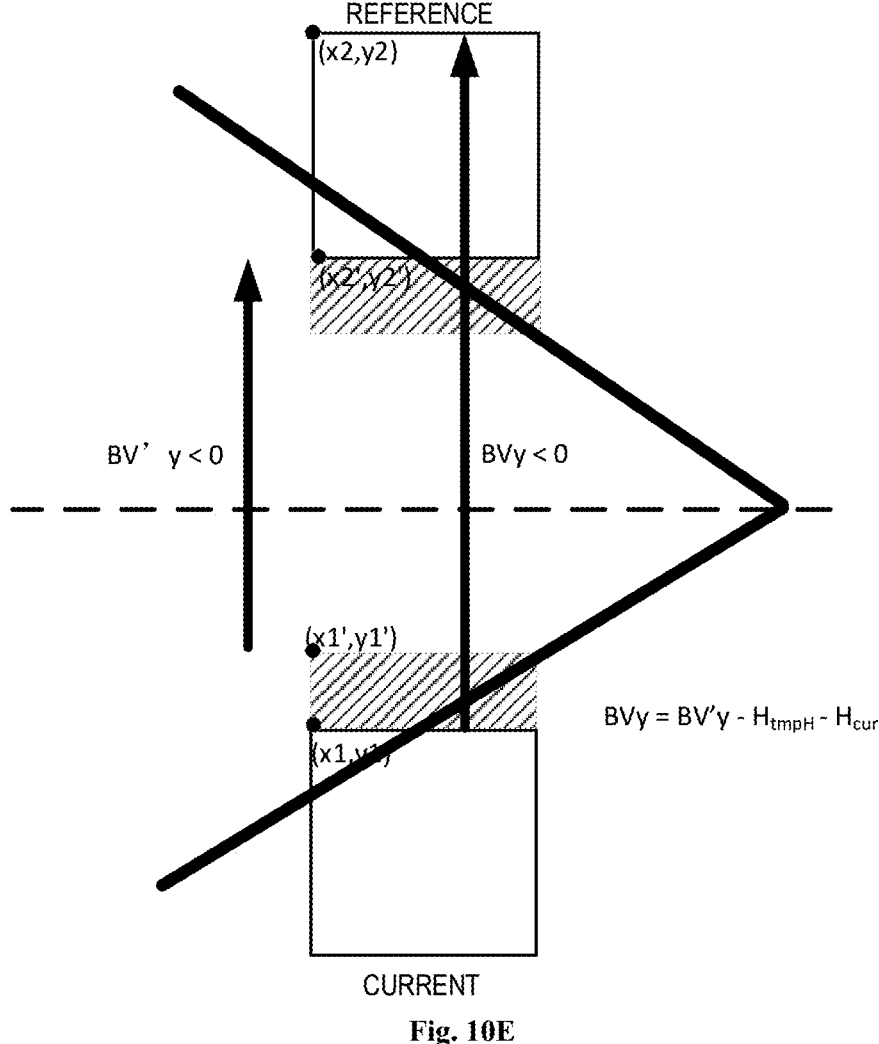

In some embodiments, as shown in FIG. 10E, a current template of the current video block and the reference template of a reference block of the current video block are horizontal templates. A width of the horizontal templates is the same with a width of the current video block. The sample reordering mode comprises a vertical flip reordering mode.

In some embodiments, the current template comprises a neighboring sample above to the current video block, and the reference template comprises a neighboring sample below to the reference block.

In some embodiments, a location difference between the current template and the current video block is different from a location difference between the reference template and the reference block.

In some embodiments, a first horizontal distance between a top-left sample of the current template and a top-left sample of the current video block is the same a second horizontal distance between a top-left sample of the reference template and a top-left sample of the reference block. A first vertical distance between the top-left sample of the current template and the top-left sample of the current video block is different from a second vertical distance between the top-left sample of the reference template and the top-left sample of the reference block. For example, $x1-x1'=x2-x2'$, and $y1-y1''!=y2-y2''$.

In some embodiments, the first horizontal distance is zero, and the first vertical distance is a height of the current template. For example, $x1-x1'=0$, and $y1-y1'=H_{tmpH}$.

In some embodiments, the second horizontal distance is zero, and the second vertical distance is a height of the current video block, the reference template being below to the reference block. For example, $x2-x2'=0$, and $y2-y2'=-H_{cur}$.

In some embodiments, a sum of a first distance between the top-left sample of the current template and the top-left sample of the reference template, a height of the current video block and a height of the current template is equal to a second distance between the top-left sample of the current video block and the top-left sample of the reference block. For example, $y2'-y1'-H_{tmpH}-H_{cur}=y2-y1$.

In some embodiments, at least one of a sample in the current template or a sample in the reference template is flipped.

In some embodiments, a flip type of the current video block is vertical flip, and at least one of a sample in the current template or a sample in the reference template is flipped.

In some embodiments, a sum of a first vertical distance between the current video block and the reference block, a height of the current video block and a height of the current template is equal to a second vertical distance between the current template and the reference template. For example, $BVy=BV'y-H_{tmpH}-H_{cur}$.

Figure 10F:
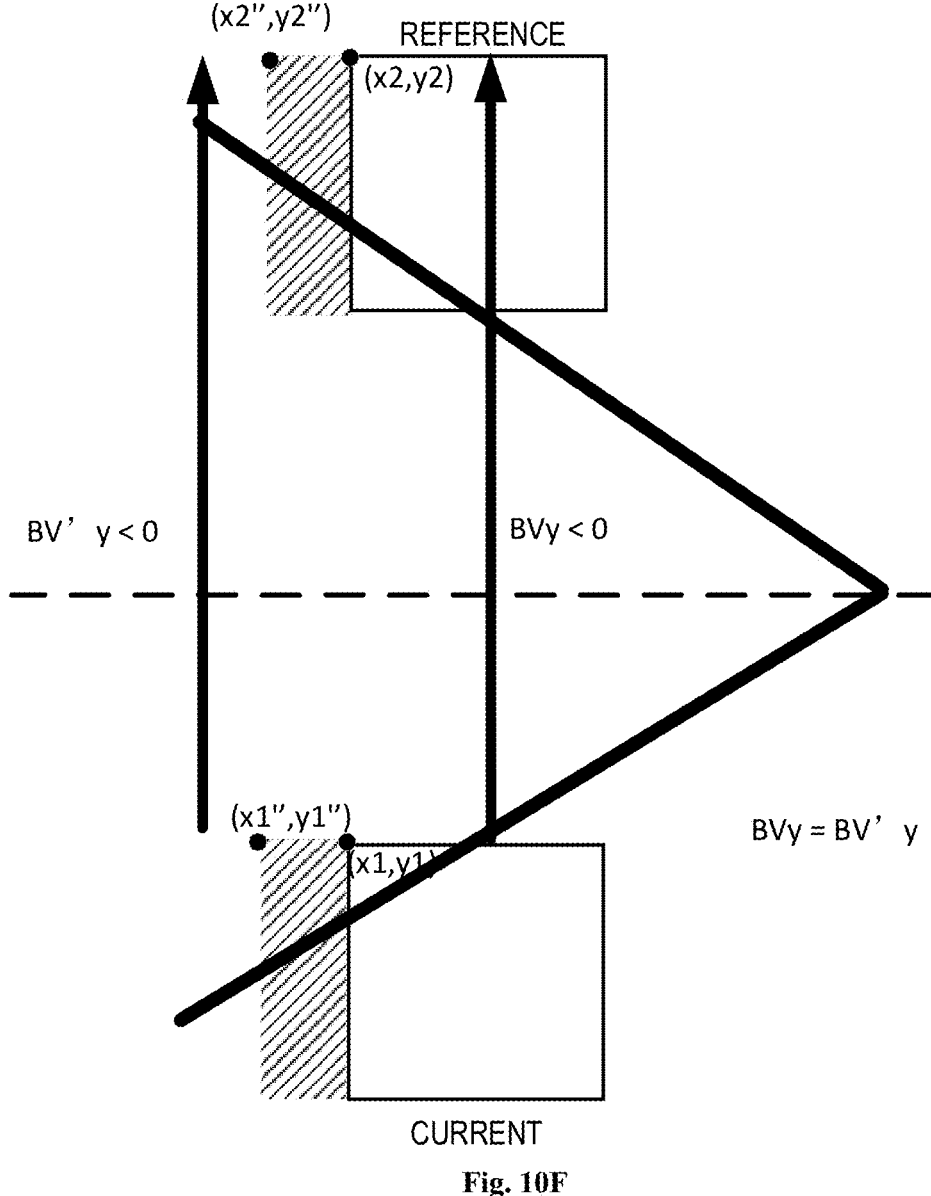

In some embodiments, as shown in FIG. 10F, a current template of the current video block and the reference template of a reference block of the current video block are vertical templates. A height of the vertical templates is the same with a height of the current video block. The sample reordering mode comprises a vertical flip reordering mode.

In some embodiments, the current template comprises a neighboring sample left to the current video block, and the reference template comprises a neighboring sample left to the reference block.

In some embodiments, a location difference between the current template and the current video block is the same with a location difference between the reference template and the reference block.

In some embodiments, a first horizontal distance between a top-left sample of the current template and a top-left sample of the current video block is the same with a second horizontal distance between a top-left sample of the reference template and a top-left sample of the reference block. A first vertical distance between the top-left sample of the current template and the top-left sample of the current video block is the same with a second vertical distance between the top-left sample of the reference template and the top-left sample of the reference block. For example, $x1-x1''=x2-x2''$, and $y1-y1''=y2-y2''$.

In some embodiments, the first and second horizontal distances are a width of the current template or the reference template, and the first and second vertical distances are zero. For example, $x1-x1''=W_{tmpV}$, and $y1-y1''=0$.

In some embodiments, a distance between the top-left sample of the current template and the top-left sample of the reference template is the same with a distance between the top-left sample of the current video block and the top-left sample of the reference block. For example, $y1''-y2''=y1-y2$.

In some embodiments, at least one of a sample in the current template or a sample in the reference template is flipped.

In some embodiments, a flip type of the current video block is vertical flip, and at least one of a sample in the current template or a sample in the reference template is flipped.

In some embodiments, a vertical distance between the current video block and the reference block is the same with a vertical distance between the current template and the reference template. For example, $BVy=BV'y$.

In some embodiments, a current template of the current video block comprises a horizontal current template and a vertical current template, the reference template of a reference block of the current video block comprises a horizontal reference template and a vertical reference template, and the sample reordering mode comprises a vertical flip reordering mode.

Figure 10G:
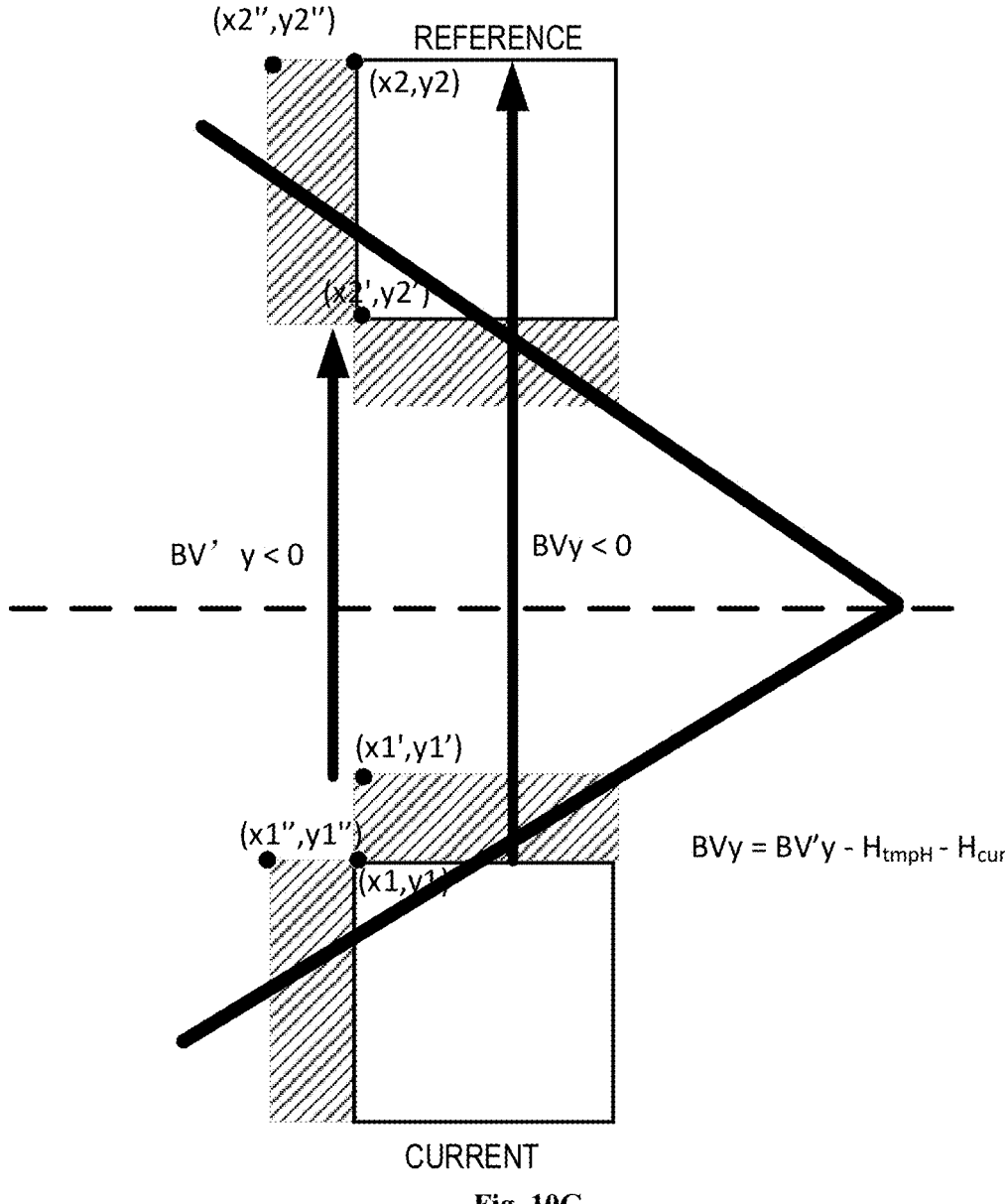

In some embodiments, as shown in FIG. 10G, a width of the horizontal current template and a width of the horizontal reference template is the same with a width of the current video block.

In some embodiments, the current template comprises a neighboring sample above to the current video block and a neighboring sample left to the current video block, and the reference template comprises a neighboring sample below to the reference block and a neighboring sample left to the reference block.

In some embodiments, a location difference between the horizontal current template and the current video block is different from a location difference between the horizontal reference template and the reference block.

In some embodiments, a first horizontal distance between a top-left sample of the horizontal current template and a top-left sample of the current video block is the same with a second horizontal distance between a top-left sample of the horizontal reference template and a top-left sample of the reference block. A first vertical distance between the top-left sample of the horizontal current template and the top-left sample of the current video block is different from a second vertical distance between the top-left sample of the horizontal reference template and the top-left sample of the reference block. For example, $x1-x1'=x2-x2'$, and $y1-y1'!=y2-y2'$.

In some embodiments, the first horizontal distance is zero, and the first vertical distance is a height of the horizontal current template. For example, $x1-x1'=0$, and $y1-y1'=H_{tmpH}$.

In some embodiments, the second horizontal distance is zero, and the second vertical distance is a height of the current video block, the horizontal reference template being below to the reference block. For example, $x2-x2'=0$, and $y2-y2'=-H_{cur}$.

In some embodiments, a distance between the top-left sample of the horizontal current template and the top-left sample of the horizontal reference template is equal to a sum of a height of the current video block, a height of the horizontal current template and a distance between the top-left sample of the current video block and the top-left sample of the reference block.

In some embodiments, a location difference between the vertical current template and the current video block is the same with a location difference between the vertical reference template and the reference block.

In some embodiments, a third horizontal distance between a top-left sample of the vertical current template and a top-left sample of the current video block is the same with a fourth horizontal distance between a top-left sample of the vertical reference template and a top-left sample of the reference block. A third vertical distance between the top-left sample of the vertical current template and the top-left sample of the current video block is the same with a fourth vertical distance between the top-left sample of the vertical reference template and the top-left sample of the reference block. For example, $x1-x1''=x2-x2''$, and $y1-y1''=y2-y2''$.

In some embodiments, the third horizontal distance is a width of the vertical current template, and the third vertical distance is zero. For example, $x1-x1''=W_{tmpV}$, and $y1-y1''=0$.

In some embodiments, at least one of a sample in the horizontal current template or a sample in the horizontal reference template is flipped.

In some embodiments, at least one of a sample in the vertical current template or a sample in the vertical reference template is flipped.

In some embodiments, a flip type of the current video block is vertical flip, and a sample in the horizontal current template and a sample in the vertical current template are flipped.

In some embodiments, a flip type of the current video block is vertical flip, and a sample in the horizontal reference template and a sample in the vertical reference template are flipped.

In some embodiments, a vertical distance between the horizontal current template and the horizontal reference template is equal to a sum of a height of the current video block, a height of the horizontal current template and a vertical distance between the current video block and the reference block.

Figure 10H:
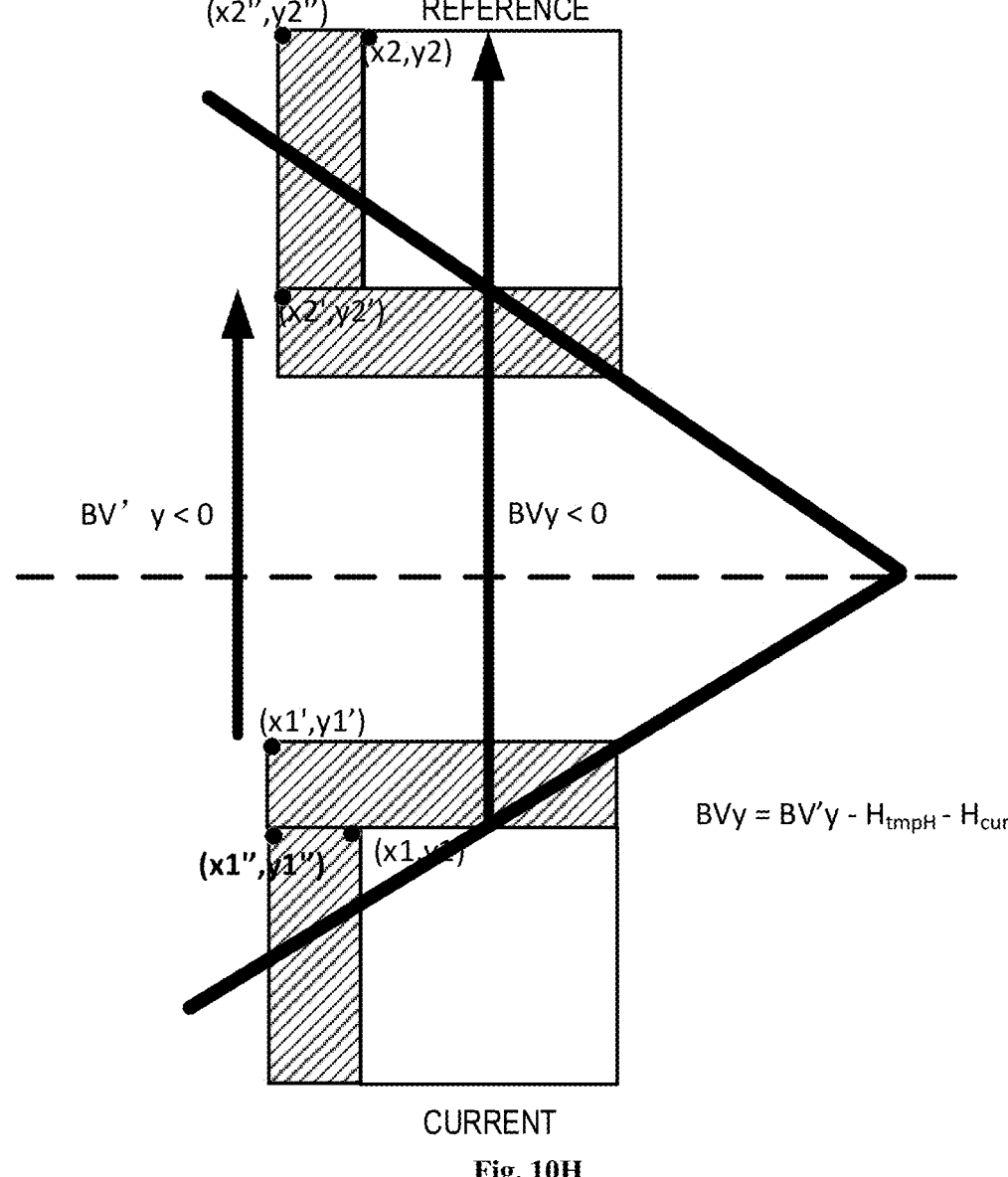

In some embodiments, as shown in FIG. 10H, a width of the horizontal current template and a width of the horizontal reference template are the same. A width of the vertical current template and a width of the vertical reference template are the same. The width of the horizontal current template is equal to a sum of a width of the current video block and a width of the vertical current template.

In some embodiments, the current template comprises a neighboring sample above to the current video block and a neighboring sample left to the current video block, and the reference template comprises a neighboring sample below to the reference block and a neighboring sample left to the reference block.

In some embodiments, a location difference between the horizontal current template and the current video block is different from a location difference between the horizontal reference template and the reference block.

In some embodiments, a first horizontal distance between a top-left sample of the horizontal current template and a top-left sample of the current video block is the same with a second horizontal distance between a top-left sample of the horizontal reference template and a top-left sample of the reference block. A first vertical distance between the top-left sample of the horizontal current template and the top-left sample of the current video block is different from a second vertical distance between the top-left sample of the horizontal reference template and the top-left sample of the reference block. For example, $x1-x1'=x2-x2'$, and $y1-y1'!=y2-y2'$.

In some embodiments, the first horizontal distance is a width of the vertical current template, and the first vertical distance is a height of the horizontal current template.

In some embodiments, the second horizontal distance is a width of the vertical current template, and the second vertical distance is a height of the current video block, the horizontal reference template being below the reference block.

In some embodiments, a distance between the top-left sample of the horizontal current template and the top-left sample of the horizontal reference template is equal to a sum of a height of the current video block, a height of the horizontal current template and a distance between the top-left sample of the current video block and the top-left sample of the reference block.

In some embodiments, a location difference between the vertical current template and the current video block is the same with a location difference between the vertical reference template and the reference block.

In some embodiments, a third horizontal distance between a top-left sample of the vertical current template and a top-left sample of the current video block is the same with a fourth horizontal distance between a top-left sample of the vertical reference template and a top-left sample of the reference block. A third vertical distance between the top-left sample of the vertical current template and the top-left sample of the current video block is the same with a fourth vertical distance between the top-left sample of the vertical reference template and the top-left sample of the reference block. For example, $x1-x1''=x2-x2''$, and $y1-y1''=y2-y2''$.

In some embodiments, the third horizontal distance is a width of the vertical current template, and the third vertical distance is zero. For example, $x1-x1''=W_{tmpV}$, and $y1-y1''=0$.

In some embodiments, at least one of a sample in the horizontal current template or a sample in the horizontal reference template is flipped.

In some embodiments, at least one of a sample in the vertical current template or a sample in the vertical reference template is flipped.

In some embodiments, a flip type of the current video block is vertical flip, and a sample in the horizontal current template and a sample in the vertical current template are flipped.

In some embodiments, a flip type of the current video block is vertical flip, and a sample in the horizontal reference template and a sample in the vertical reference template are flipped.

In some embodiments, a vertical distance between the horizontal current template and the horizontal reference template is equal to a sum of a height of the current video block, a height of the horizontal current template and a vertical distance between the current video block and the reference block.

According to further embodiments of the present disclosure, a non-transitory computer-readable recording medium is provided. The non-transitory computer-readable recording medium stores a bitstream of a video which is generated by a method performed by an apparatus for video processing. In the method, a reference template of a current video block of the video is determined based on coding information of the current video block. The current video block is coded with a sample reordering mode. The bitstream is generated based on the reference template.

According to still further embodiments of the present disclosure, a method for storing bitstream of a video is provided. In the method, a reference template of a current video block of the video is determined based on coding information of the current video block. The current video block is coded with a sample reordering mode. The bitstream is generated based on the reference template. The bitstream is stored in a non-transitory computer-readable recording medium.

FIG. 13 illustrates a flowchart of a method 1300 for video processing in accordance with embodiments of the present disclosure. The method 1300 is implemented for a conversion between a current video block of a video and a bitstream of the video. In some embodiments, the conversion between the current video block and the bitstream may include encoding the current video block into the bitstream. Alternatively, or in addition, the conversion may include decoding the current video block from the bitstream.

At block 1310, a first plurality of samples in a first template associated with the current video block is determined. The current video block is coded with a sample reordering mode. At block 1320, the first plurality of samples is reordered. At block 1330, a cost is determined by comparing the first plurality of samples with a second plurality of samples in a second template associated with the current video block. At block 1340, the conversion is performed based on the cost.

The method 1300 enables reordering a plurality of samples before determining a cost, and thus the coding efficiency and coding effectiveness can be improved.

In some embodiments, the first template is a template around the current video block. The second template is a template around a reference block of the current video block.

In some embodiments, the first template is a template around a reference block of the current video block. The second template is a template around the current video block.

In some embodiments, the second plurality of samples are not reordered.

In some embodiments, the second plurality of samples are reordered before being compared with the first plurality of samples.

In some embodiments, the sample reordering mode comprises one of: horizontal flip, or vertical flip.

According to further embodiments of the present disclosure, a non-transitory computer-readable recording medium is provided. The non-transitory computer-readable recording medium stores a bitstream of a video which is generated by a method performed by an apparatus for video processing. In the method, a first plurality of samples in a first template associated with a current video block of the video is determined. The current video block is coded with a sample reordering mode. The first plurality of samples is reordered. A cost is determined by comparing the first plurality of samples with a second plurality of samples in a second template associated with the current video block. The bitstream is generated based on the cost.

According to still further embodiments of the present disclosure, a method for storing bitstream of a video is provided. In the method, a first plurality of samples in a first template associated with a current video block of the video is determined. The current video block is coded with a sample reordering mode. The first plurality of samples is reordered. A cost is determined by comparing the first plurality of samples with a second plurality of samples in a second template associated with the current video block. The bitstream is generated based on the cost. The bitstream is stored in a non-transitory computer-readable recording medium.

FIG. 14 illustrates a flowchart of a method 1400 for video processing in accordance with embodiments of the present disclosure. The method 1400 is implemented for a conversion between a current video block of a video and a bitstream of the video. In some embodiments, the conversion between the current video block and the bitstream may include encoding the current video block into the bitstream. Alternatively, or in addition, the conversion may include decoding the current video block from the bitstream.

At block 1410, a sample reordering mode for the current video block is determined based on at least one of: a syntax element in the bitstream, or a template cost of the current video block. At block 1420, the conversion is performed based on the sample reordering mode.

The method 1400 enables determining a sample reordering mode for the current video block based on a syntax element or a template cost, and thus the coding efficiency and coding effectiveness can be improved.

In some embodiments, the syntax element indicates information regarding reordering samples for the current video block coded with a template matching coding tool.

In some embodiments, the template matching coding tool comprises at least one of: an intra template matching coding tool, or an intra block copy (IBC) mode with template matching.

In some embodiments, coding of the syntax element is the same with coding of a further syntax element, the further syntax element being associated with reordering samples for a video block coded with a prediction mode. In some embodiments, the prediction mode comprises an intra block copy (IBC) mode.

In some embodiments, the method 1400 further comprises: determining a plurality of template costs of a plurality of candidate sample reordering modes for the current video block; and determining a candidate sample reordering mode with a minimum template cost as the sample reordering mode.

In some embodiments, the plurality of template costs is determined by applying a motion search with template matching with the plurality of candidate sample reordering modes to the current video block.

According to further embodiments of the present disclosure, a non-transitory computer-readable recording medium is provided. The non-transitory computer-readable recording medium stores a bitstream of a video which is generated by a method performed by an apparatus for video processing. In the method, a sample reordering mode for a current video block of the video is determined based on at least one of: a syntax element in the bitstream, or a template cost of the current video block. The bitstream is generated based on the sample reordering mode.

According to still further embodiments of the present disclosure, a method for storing bitstream of a video is provided. In the method, a sample reordering mode for a current video block of the video is determined based on at least one of: a syntax element in the bitstream, or a template cost of the current video block. The bitstream is generated based on the sample reordering mode. The bitstream is stored in a non-transitory computer-readable recording medium.

In some embodiments, the method 1100, 1200, 1300 or method 1400 further comprises: indicating further information on whether to and/or how to apply the method in the bitstream.

In some embodiments, the further information is indicated at one of: a sequence level, a group of pictures level, a picture level, a slice level or a tile group level.

In some embodiments, the further information is indicated in a sequence header, a picture header, a sequence parameter set (SPS), a Video Parameter Set (VPS), a decoded parameter set (DPS), Decoding Capability Information (DCI), a Picture Parameter Set (PPS), an Adaptation Parameter Set (APS), a slice header or a tile group header.

In some embodiments, the further information is indicated in a region containing more than one sample or pixel.

In some embodiments, the region comprising one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a subpicture.

In some embodiments, the further information depends on coded information.

In some embodiments, the coded information comprises at least one of: a coding mode, a block size, a colour format, a single or dual tree partitioning, a colour component, a slice type, or a picture type.

It is to be understood that the above method 1100, method 1200, method 1300 and/or method 1400 may be used in combination or separately. Any suitable combination of these methods may be applied. Scope of the present disclosure is not limited in this regard.

By using these methods 1100, 1200, 1300 and 1400 separately or in combination, the motion information may be improved. In this way, the coding effectiveness and coding efficiency can be improved.

Implementations of the present disclosure can be described in view of the following clauses, the features of which can be combined in any reasonable manner.

Clause 1. A method for video processing, comprising: determining, for a conversion between a current video block of a video and a bitstream of the video, motion information of the current video block, the current video block being coded with at least one of: an intra block copy (IBC) merge mode, an IBC with template matching mode, or an intra template matching mode; updating the motion information based on a constraint, the constraint indicating a target value of a component of the motion information; and performing the conversion based on the updated motion information.

Clause 2. The method of clause 1, wherein the current video block is coded with at least one of: a sample reordering-based IBC merge mode, a sample reordering-based IBC with template matching mode, or a sample reordering-based intra template matching mode, and wherein updating the motion information based on a constraint comprises: updating a vertical component of the motion information to be the target value.

Clause 3. The method of clause 2, wherein a sample of the current video block is flipped horizontally.

Clause 4. The method of clause 2 or clause 3, wherein the current video block is coded with the sample reordering-based IBC with template matching mode, and a template matching of the current video block is searched along a horizontal direction for a horizontal flip.

Clause 5. The method of clause 1, wherein the current video block is coded with at least one of: a sample reordering-based IBC merge mode, a sample reordering-based IBC with template matching mode, or a sample reordering-based intra template matching mode, and wherein updating the motion information based on a constraint comprises: updating a horizontal component of the motion information to be the target value.

Clause 6. The method of clause 5, wherein a sample of the current video block is flipped vertically.

Clause 7. The method of clause 5 or clause 6, wherein the current video block is coded with the sample reordering-based IBC with template matching mode, and a template matching of the current video block is searched along a vertical direction for a vertical flip.

Clause 8. The method of clause 1, wherein the current video block is coded with at least one of: an IBC merge mode, an IBC with template matching mode, or an intra template matching mode, and wherein updating the motion information based on a constraint comprises: updating the component of the motion information to be the target value.

Clause 9. The method of clause 8, wherein the component of the motion information comprises at least one of: a horizontal component of the motion information, or a vertical component of the motion information.

Clause 10. The method of clause 8 or clause 9, wherein the current video block is coded with at least one of: an IBC with template matching mode, or an intra template matching mode, and a template matching of the current video block is search along a single direction.

Clause 11. The method of clause 10, wherein the single direction comprises one of: a horizontal direction, or a vertical direction.

Clause 12. The method of any of clauses 1-11, wherein the motion information comprises at least one of: a motion vector, a motion vector difference, or a motion vector predictor.

Clause 13. The method of any of clauses 1-12, wherein the target value is zero.

Clause 14. The method of any of clauses 1-13, wherein the target value is included in the bitstream.

Clause 15. The method of any of clauses 1-14, wherein the target value is derived during the conversion.

Clause 16. A method for video processing, comprising: determining, for a conversion between a current video block of a video and a bitstream of the video, a reference template of the current video block based on coding information of the current video block, the current video block being coded with a sample reordering mode; and performing the conversion based on the reference template.

Clause 17. The method of clause 16, wherein the coding information comprises at least one of: a sample reordering type of the sample reordering mode, or a template shape of the reference template.

Clause 18. The method of clause 16 or clause 17, further comprising: determining motion information of the current video block based on the coding information of the current video block.

Clause 19. The method of clause 18, wherein the motion information comprises one of: a motion vector of the current video block, or a block vector of the current video block.

Clause 20. The method of clause 18 or clause 19, wherein the coding information comprises at least one of: a sample reordering type of the sample reordering mode, a template shape of the reference template, a dimension of the current video block, a dimension of a template of the current video block, a dimension of a partial of the template, a location of the current video block, or a location of the template.

Clause 21. The method of clause 20, wherein the template of the current video block comprises at least one of: a current template of the current video block, or the reference template of the current video block.

Clause 22. The method of clause 20 or clause 21, wherein the dimension of the current video block comprises at least one of: a width of the current video block, or a height of the current video block.

Clause 23. The method of any of clauses 20-22, wherein the dimension of the template or the dimension of the partial of the template comprises at least one of a width of the template or a width of the partial of the template, or a height of the template or a height of the partial of the template.

Clause 24. The method of any of clauses 20-23, wherein a location of the current video block or a location of the template comprises at least one of: a location of a center sample of the current video block, a location of a center sample of the template, a location of a top-left sample of the current block, or a location of a top-left sample of the template.

Clause 25. The method of any of clauses 16-24, wherein a current template of the current video block and the reference template of a reference block of the current video block are horizontal templates, a width of the horizontal templates being the same with a width of the current video block, and the sample reordering mode comprises a horizontal flip reordering mode.

Clause 26. The method of clause 25, wherein the current template comprises a neighboring sample above to the current video block, and the reference template comprises a neighboring sample above to the reference block.

Clause 27. The method of clause 25 or clause 26, wherein a location difference between the current template and the current video block is the same with a location difference between the reference template and the reference block.

Clause 28. The method of any of clauses 25-27, wherein a first horizontal distance between a top-left sample of the current template and a top-left sample of the current video block is the same with a second horizontal distance between a top-left sample of the reference template and a top-left sample of the reference block, and a first vertical distance between the top-left sample of the current template and the top-left sample of the current video block is the same with a second vertical distance between the top-left sample of the reference template and the top-left sample of the reference block.

Clause 29. The method of clause 28, wherein the first and second horizontal distances are zero, and the first and second vertical distances are a height of the current template or the reference template.

Clause 30. The method of clause 28 or clause 29, wherein a distance between the top-left sample of the current template and the top-left sample of the reference template is the same with a distance between the top-left sample of the current video block and the top-left sample of the reference block.

Clause 31. The method of any of clauses 25-30, wherein at least one of a sample in the current template or a sample in the reference template is flipped.

Clause 32. The method of any of clauses 25-31, wherein a flip type of the current video block is horizontal flip, and at least one of a sample in the current template or a sample in the reference template is flipped.

Clause 33. The method of any of clauses 25-32, wherein a horizontal distance between the current video block and the reference block is the same with a horizontal distance between the current template and the reference template.

Clause 34. The method of any of clauses 16-24, wherein a current template of the current video block and the reference template of a reference block of the current video block are vertical templates, a height of the vertical templates being the same with a height of the current video block, and the sample reordering mode comprises a horizontal flip reordering mode.

Clause 35. The method of clause 34, wherein the current template comprises a neighboring sample left to the current video block, and the reference template comprises a neighboring sample right to the reference block.

Clause 36. The method of clause 34 or clause 35, wherein a location difference between the current template and the current video block is different from a location difference between the reference template and the reference block.

Clause 37. The method of any of clauses 34-36, wherein a first horizontal distance between a top-left sample of the current template and a top-left sample of the current video block is different from a second horizontal distance between a top-left sample of the reference template and a top-left sample of the reference block, and a first vertical distance between the top-left sample of the current template and the top-left sample of the current video block is the same with a second vertical distance between the top-left sample of the reference template and the top-left sample of the reference block.

Clause 38. The method of clause 37, wherein the first horizontal distance is a width of the current template, and the first vertical distance is zero.

Clause 39. The method of clause 37 or clause 38, wherein the second horizontal distance is a width of the current video block, the reference template being right to the reference block, and the second vertical distance is zero.

Clause 40. The method of any of clauses 37-39, wherein a sum of a first distance between the top-left sample of the current template and the top-left sample of the reference template, a width of the current video block and a width of the current template is equal to a second distance between the top-left sample of the current video block and the top-left sample of the reference block.

Clause 41. The method of any of clauses 34-40, wherein at least one of a sample in the current template or a sample in the reference template is flipped.

Clause 42. The method of any of clauses 34-41, wherein a flip type of the current video block is horizontal flip, and at least one of a sample in the current template or a sample in the reference template is flipped.

Clause 43. The method of any of clauses 34-42, wherein a sum of a first horizontal distance between the current video block and the reference block, a width of the current video block and a width of the current template is equal to a second horizontal distance between the current template and the reference template.

Clause 44. The method of any of clauses 16-24, wherein a current template of the current video block comprises a horizontal current template and a vertical current template, the reference template of a reference block of the current video block comprises a horizontal reference template and a vertical reference template, and the sample reordering mode comprises a horizontal flip reordering mode.

Clause 45. The method of clause 44, wherein a width of the horizontal current template and a width of the horizontal reference template is the same with a width of the current video block.

Clause 46. The method of clause 44 or clause 45, wherein the current template comprises a neighboring sample above to the current video block and a neighboring sample left to the current video block, and the reference template comprises a neighboring sample above to the reference block and a neighboring sample right to the reference block.

Clause 47. The method of any of clauses 44-46, wherein a location difference between the horizontal current template and the current video block is the same with a location difference between the horizontal reference template and the reference block.

Clause 48. The method of any of clauses 44-47, wherein a first horizontal distance between a top-left sample of the horizontal current template and a top-left sample of the current video block is the same with a second horizontal distance between a top-left sample of the horizontal reference template and a top-left sample of the reference block, and a first vertical distance between the top-left sample of the horizontal current template and the top-left sample of the current video block is the same with a second vertical distance between the top-left sample of the horizontal reference template and the top-left sample of the reference block.

Clause 49. The method of clause 48, wherein the first horizontal distance is zero, and the first vertical distance is a height of the horizontal current template.

Clause 50. The method of clause 48 or 49, wherein a distance between the top-left sample of the horizontal current template and the top-left sample of the horizontal reference template is equal to a distance between the top-left sample of the current video block and the top-left sample of the reference block.

Clause 51. The method of any of clauses 44-50, wherein a location difference between the vertical current template and the current video block is different from a location difference between the vertical reference template and the reference block.

Clause 52. The method of any of clauses 44-51, wherein a third horizontal distance between a top-left sample of the vertical current template and a top-left sample of the current video block is different from a fourth horizontal distance between a top-left sample of the vertical reference template and a top-left sample of the reference block, and a third vertical distance between the top-left sample of the vertical current template and the top-left sample of the current video block is the same with a fourth vertical distance between the top-left sample of the vertical reference template and the top-left sample of the reference block.

Clause 53. The method of clause 52, wherein the third horizontal distance is a width of the vertical current template, and the third vertical distance is zero.

Clause 54. The method of clause 52 or clause 53, wherein the fourth horizontal distance is a width of the current video block, the vertical reference template being right to the reference block, and the fourth vertical distance is zero.

Clause 55. The method of any of clauses 44-54, wherein at least one of a sample in the horizontal current template or a sample in the horizontal reference template is flipped.

Clause 56. The method of any of clauses 44-55, wherein at least one of a sample in the vertical current template or a sample in the vertical reference template is flipped.

Clause 57. The method of any of clauses 44-56, wherein a flip type of the current video block is horizontal flip, and a sample in the horizontal current template and a sample in the vertical current template are flipped.

Clause 58. The method of any of clauses 44-57, wherein a flip type of the current video block is horizontal flip, and a sample in the horizontal reference template and a sample in the vertical reference template are flipped.

Clause 59. The method of any of clauses 44-58, wherein a horizontal distance between the current video block and the reference block is equal to a horizontal distance between the horizontal current template and the horizontal reference template.

Clause 60. The method of clause 44, wherein a width of the horizontal current template and a width of the horizontal reference template are the same, a width of the vertical current template and a width of the vertical reference template are the same, and the width of the horizontal current template is equal to a sum of a width of the current video block and a width of the vertical current template.

Clause 61. The method of clause 60, wherein the current template comprises a neighboring sample above to the current video block and a neighboring sample left to the current video block, and the reference template comprises a neighboring sample above to the reference block and a neighboring sample right to the reference block.

Clause 62. The method of clause 60 or clause 61, wherein a location difference between the horizontal current template and the current video block is different from a location difference between the horizontal reference template and the reference block.

Clause 63. The method of any of clauses 60-62, wherein a first horizontal distance between a top-left sample of the horizontal current template and a top-left sample of the current video block is different from a second horizontal distance between a top-left sample of the horizontal reference template and a top-left sample of the reference block, and a first vertical distance between the top-left sample of the horizontal current template and the top-left sample of the current video block is the same with a second vertical distance between the top-left sample of the horizontal reference template and the top-left sample of the reference block.

Clause 64. The method of clause 63, wherein the first horizontal distance is a width of the vertical current template, and the first vertical distance is a height of the horizontal current template.

Clause 65. The method of clause 63 or clause 64, wherein the second horizontal distance is zero, and the second vertical distance is a height of the horizontal current template.

Clause 66. The method of any of clauses 63-65, wherein a distance between the top-left sample of the horizontal current template and the top-left sample of the horizontal reference template is equal to a sum of a width of the vertical current template and a distance between the top-left sample of the current video block and the top-left sample of the reference block.

Clause 67. The method of any of clauses 60-66, wherein a location difference between the vertical current template and the current video block is different from a location difference between the vertical reference template and the reference block.

Clause 68. The method of any of clauses 60-67, wherein a third horizontal distance between a top-left sample of the vertical current template and a top-left sample of the current video block is different from a fourth horizontal distance between a top-left sample of the vertical reference template and a top-left sample of the reference block, and a third vertical distance between the top-left sample of the vertical current template and the top-left sample of the current video block is the same with a fourth vertical distance between the top-left sample of the vertical reference template and the top-left sample of the reference block.

Clause 69. The method of clause 68, wherein the third horizontal distance is a width of the vertical current template, and the third vertical distance is zero.

Clause 70. The method of clause 68 or clause 69, wherein the fourth horizontal distance is a width of the current video block, the vertical reference template being right to the reference block, and the fourth vertical distance is zero.

Clause 71. The method of any of clauses 60-70, wherein at least one of a sample in the horizontal current template or a sample in the horizontal reference template is flipped.

Clause 72. The method of any of clauses 60-71, wherein at least one of a sample in the vertical current template or a sample in the vertical reference template is flipped.

Clause 73. The method of any of clauses 60-72, wherein a flip type of the current video block is horizontal flip, and a sample in the horizontal current template and a sample in the vertical current template are flipped.

Clause 74. The method of any of clauses 60-73, wherein a flip type of the current video block is horizontal flip, and a sample in the horizontal reference template and a sample in the vertical reference template are flipped.

Clause 75. The method of any of clauses 60-74, wherein a horizontal distance between the horizontal current template and the horizontal reference template is equal to a sum of a width of the vertical current template and a horizontal distance between the current video block and the reference block.

Clause 76. The method of any of clauses 16-24, wherein a current template of the current video block and the reference template of a reference block of the current video block are horizontal templates, a width of the horizontal templates being the same with a width of the current video block, and the sample reordering mode comprises a vertical flip reordering mode.

Clause 77. The method of clause 76, wherein the current template comprises a neighboring sample above to the current video block, and the reference template comprises a neighboring sample below to the reference block.

Clause 78. The method of clause 76 or clause 77, wherein a location difference between the current template and the current video block is different from a location difference between the reference template and the reference block.

Clause 79. The method of any of clauses 76-78, wherein a first horizontal distance between a top-left sample of the current template and a top-left sample of the current video block is the same a second horizontal distance between a top-left sample of the reference template and a top-left sample of the reference block, and a first vertical distance between the top-left sample of the current template and the top-left sample of the current video block is different from a second vertical distance between the top-left sample of the reference template and the top-left sample of the reference block.

Clause 80. The method of clause 79, wherein the first horizontal distance is zero, and the first vertical distance is a height of the current template.

Clause 81. The method of clause 79 or clause 80, wherein the second horizontal distance is zero, and the second vertical distance is a height of the current video block, the reference template being below to the reference block.

Clause 82. The method of any of clauses 79-81, wherein a sum of a first distance between the top-left sample of the current template and the top-left sample of the reference template, a height of the current video block and a height of the current template is equal to a second distance between the top-left sample of the current video block and the top-left sample of the reference block.

Clause 83. The method of any of clauses 76-82, wherein at least one of a sample in the current template or a sample in the reference template is flipped.

Clause 84. The method of any of clauses 76-83, wherein a flip type of the current video block is vertical flip, and at least one of a sample in the current template or a sample in the reference template is flipped.

Clause 85. The method of any of clauses 76-84, wherein a sum of a first vertical distance between the current video block and the reference block, a height of the current video block and a height of the current template is equal to a second vertical distance between the current template and the reference template.

Clause 86. The method of any of clauses 16-24, wherein a current template of the current video block and the reference template of a reference block of the current video block are vertical templates, a height of the vertical templates being the same with a height of the current video block, and the sample reordering mode comprises a vertical flip reordering mode.

Clause 87. The method of clause 86, wherein the current template comprises a neighboring sample left to the current video block, and the reference template comprises a neighboring sample left to the reference block.

Clause 88. The method of clause 86 or clause 87, wherein a location difference between the current template and the current video block is the same with a location difference between the reference template and the reference block.

Clause 89. The method of any of clauses 86-88, wherein a first horizontal distance between a top-left sample of the current template and a top-left sample of the current video block is the same with a second horizontal distance between a top-left sample of the reference template and a top-left sample of the reference block, and a first vertical distance between the top-left sample of the current template and the top-left sample of the current video block is the same with a second vertical distance between the top-left sample of the reference template and the top-left sample of the reference block.

Clause 90. The method of clause 89, wherein the first and second horizontal distances are a width of the current template or the reference template, and the first and second vertical distances are zero.

Clause 91. The method of clause 89 or clause 90, wherein a distance between the top-left sample of the current template and the top-left sample of the reference template is the same with a distance between the top-left sample of the current video block and the top-left sample of the reference block.

Clause 92. The method of any of clauses 86-91, wherein at least one of a sample in the current template or a sample in the reference template is flipped.

Clause 93. The method of any of clauses 86-92, wherein a flip type of the current video block is vertical flip, and at least one of a sample in the current template or a sample in the reference template is flipped.

Clause 94. The method of any of clauses 86-93, wherein a vertical distance between the current video block and the reference block is the same with a vertical distance between the current template and the reference template.

Clause 95. The method of any of clauses 16-24, wherein a current template of the current video block comprises a horizontal current template and a vertical current template, the reference template of a reference block of the current video block comprises a horizontal reference template and a vertical reference template, and the sample reordering mode comprises a vertical flip reordering mode.

Clause 96. The method of clause 95, wherein a width of the horizontal current template and a width of the horizontal reference template is the same with a width of the current video block.

Clause 97. The method of clause 95 or clause 96, wherein the current template comprises a neighboring sample above to the current video block and a neighboring sample left to the current video block, and the reference template comprises a neighboring sample below to the reference block and a neighboring sample left to the reference block.

Clause 98. The method of any of clauses 95-97, wherein a location difference between the horizontal current template and the current video block is different from a location difference between the horizontal reference template and the reference block.

Clause 99. The method of any of clauses 95-98, wherein a first horizontal distance between a top-left sample of the horizontal current template and a top-left sample of the current video block is the same with a second horizontal distance between a top-left sample of the horizontal reference template and a top-left sample of the reference block, and a first vertical distance between the top-left sample of the horizontal current template and the top-left sample of the current video block is different from a second vertical distance between the top-left sample of the horizontal reference template and the top-left sample of the reference block.

Clause 100. The method of clause 99, wherein the first horizontal distance is zero, and the first vertical distance is a height of the horizontal current template.

Clause 101. The method of clause 99 or clause 100, wherein the second horizontal distance is zero, and the second vertical distance is a height of the current video block, the horizontal reference template being below to the reference block.

Clause 102. The method of any of clauses 99-101, wherein a distance between the top-left sample of the horizontal current template and the top-left sample of the horizontal reference template is equal to a sum of a height of the current video block, a height of the horizontal current template and a distance between the top-left sample of the current video block and the top-left sample of the reference block.

Clause 103. The method of any of clauses 95-102, wherein a location difference between the vertical current template and the current video block is the same with a location difference between the vertical reference template and the reference block.

Clause 104. The method of any of clauses 95-103, wherein a third horizontal distance between a top-left sample of the vertical current template and a top-left sample of the current video block is the same with a fourth horizontal distance between a top-left sample of the vertical reference template and a top-left sample of the reference block, and a third vertical distance between the top-left sample of the vertical current template and the top-left sample of the current video block is the same with a fourth vertical distance between the top-left sample of the vertical reference template and the top-left sample of the reference block.

Clause 105. The method of clause 104, wherein the third horizontal distance is a width of the vertical current template, and the third vertical distance is zero.

Clause 106. The method of any of clauses 95-105, wherein at least one of a sample in the horizontal current template or a sample in the horizontal reference template is flipped.

Clause 107. The method of any of clauses 95-106, wherein at least one of a sample in the vertical current template or a sample in the vertical reference template is flipped.

Clause 108. The method of any of clauses 95-107, wherein a flip type of the current video block is vertical flip, and a sample in the horizontal current template and a sample in the vertical current template are flipped.

Clause 109. The method of any of clauses 95-108, wherein a flip type of the current video block is vertical flip, and a sample in the horizontal reference template and a sample in the vertical reference template are flipped.

Clause 110. The method of any of clauses 95-109, wherein a vertical distance between the horizontal current template and the horizontal reference template is equal to a sum of a height of the current video block, a height of the horizontal current template and a vertical distance between the current video block and the reference block.

Clause 111. The method of clause 95, wherein a width of the horizontal current template and a width of the horizontal reference template are the same, a width of the vertical current template and a width of the vertical reference template are the same, and the width of the horizontal current template is equal to a sum of a width of the current video block and a width of the vertical current template.

Clause 112. The method of clause 111, wherein the current template comprises a neighboring sample above to the current video block and a neighboring sample left to the current video block, and the reference template comprises a neighboring sample below to the reference block and a neighboring sample left to the reference block.

Clause 113. The method of clause 111 or clause 112, wherein a location difference between the horizontal current template and the current video block is different from a location difference between the horizontal reference template and the reference block.

Clause 114. The method of any of clauses 111-113, wherein a first horizontal distance between a top-left sample of the horizontal current template and a top-left sample of the current video block is the same with a second horizontal distance between a top-left sample of the horizontal reference template and a top-left sample of the reference block, and a first vertical distance between the top-left sample of the horizontal current template and the top-left sample of the current video block is different from a second vertical distance between the top-left sample of the horizontal reference template and the top-left sample of the reference block.

Clause 115. The method of clause 114, wherein the first horizontal distance is a width of the vertical current template, and the first vertical distance is a height of the horizontal current template.

Clause 116. The method of clause 114 or clause 115, wherein the second horizontal distance is a width of the vertical current template, and the second vertical distance is a height of the current video block, the horizontal reference template being below the reference block.

Clause 117. The method of any of clauses 114-116, wherein a distance between the top-left sample of the horizontal current template and the top-left sample of the horizontal reference template is equal to a sum of a height of the current video block, a height of the horizontal current template and a distance between the top-left sample of the current video block and the top-left sample of the reference block.

Clause 118. The method of any of clauses 111-117, wherein a location difference between the vertical current template and the current video block is the same with a location difference between the vertical reference template and the reference block.

Clause 119. The method of any of clauses 111-118, wherein a third horizontal distance between a top-left sample of the vertical current template and a top-left sample of the current video block is the same with a fourth horizontal distance between a top-left sample of the vertical reference template and a top-left sample of the reference block, and a third vertical distance between the top-left sample of the vertical current template and the top-left sample of the current video block is the same with a fourth vertical distance between the top-left sample of the vertical reference template and the top-left sample of the reference block.

Clause 120. The method of clause 119, wherein the third horizontal distance is a width of the vertical current template, and the third vertical distance is zero.

Clause 121. The method of any of clauses 111-120, wherein at least one of a sample in the horizontal current template or a sample in the horizontal reference template is flipped.

Clause 122. The method of any of clauses 111-121, wherein at least one of a sample in the vertical current template or a sample in the vertical reference template is flipped.

Clause 123. The method of any of clauses 111-122, wherein a flip type of the current video block is vertical flip, and a sample in the horizontal current template and a sample in the vertical current template are flipped.

Clause 124. The method of any of clauses 111-123, wherein a flip type of the current video block is vertical flip, and a sample in the horizontal reference template and a sample in the vertical reference template are flipped.

Clause 125. The method of any of clauses 111-124, wherein a vertical distance between the horizontal current template and the horizontal reference template is equal to a sum of a height of the current video block, a height of the horizontal current template and a vertical distance between the current video block and the reference block.

Clause 126. A method for video processing, comprising: determining, for a conversion between a current video block of a video and a bitstream of the video, a first plurality of samples in a first template associated with the current video block, the current video block being coded with a sample reordering mode; reordering the first plurality of samples; determining a cost by comparing the first plurality of samples with a second plurality of samples in a second template associated with the current video block; and performing the conversion based on the cost.

Clause 127. The method of clause 126, wherein the first template is a template around the current video block, and the second template is a template around a reference block of the current video block.

Clause 128. The method of clause 126, wherein the first template is a template around a reference block of the current video block, and the second template is a template around the current video block.

Clause 129. The method of clause 127 or clause 128, wherein the second plurality of samples are not reordered.

Clause 130. The method of clause 127 or clause 128, wherein the second plurality of samples are reordered before being compared with the first plurality of samples.

Clause 131. The method of any of clauses 126-130, wherein the sample reordering mode comprises one of: horizontal flip, or vertical flip.

Clause 132. A method for video processing, comprising: determining, for a conversion between a current video block of a video and a bitstream of the video, a sample reordering mode for the current video block based on at least one of: a syntax element in the bitstream, or a template cost of the current video block; and performing the conversion based on the sample reordering mode.

Clause 133. The method of clause 132, wherein the syntax element indicates information regarding reordering samples for the current video block coded with a template matching coding tool.

Clause 134. The method of clause 133, wherein the template matching coding tool comprises at least one of: an intra template matching coding tool, or an intra block copy (IBC) mode with template matching.

Clause 135. The method of any of clauses 132-134, wherein coding of the syntax element is the same with coding of a further syntax element, the further syntax element being associated with reordering samples for a video block coded with a prediction mode.

Clause 136. The method of clause 135, wherein the prediction mode comprises an intra block copy (IBC) mode.

Clause 137. The method of any of clauses 132-134, further comprising: determining a plurality of template costs of a plurality of candidate sample reordering modes for the current video block; and determining a candidate sample reordering mode with a minimum template cost as the sample reordering mode.

Clause 138. The method of clause 137, wherein the plurality of template costs is determined by applying a motion search with template matching with the plurality of candidate sample reordering modes to the current video block.

Clause 139. The method of any of clauses 1-138, further comprising: indicating further information on whether to and/or how to apply the method in the bitstream.

Clause 140. The method of clause 139, wherein the further information is indicated at one of: a sequence level, a group of pictures level, a picture level, a slice level or a tile group level.

Clause 141. The method of clause 139 or clause 140, wherein the further information is indicated in a sequence header, a picture header, a sequence parameter set (SPS), a Video Parameter Set (VPS), a decoded parameter set (DPS), Decoding Capability Information (DCI), a Picture Parameter Set (PPS), an Adaptation Parameter Set (APS), a slice header or a tile group header.

Clause 142. The method of any of clauses 139-141, wherein the further information is indicated in a region containing more than one sample or pixel.

Clause 143. The method of clause 142, wherein the region comprising one of: a prediction block (PB), a transform block (TB), a coding block (CB), a prediction unit (PU), a transform unit (TU), a coding unit (CU), a virtual pipeline data unit (VPDU), a coding tree unit (CTU), a CTU row, a slice, a tile, a subpicture.

Clause 144. The method of any of clauses 139-143, wherein the further information depends on coded information.

Clause 145. The method of clause 144, wherein the coded information comprises at least one of: a coding mode, a block size, a colour format, a single or dual tree partitioning, a colour component, a slice type, or a picture type.

Clause 146. The method of any of clauses 1-145, wherein the conversion includes encoding the current video block into the bitstream.

Clause 147. The method of any of clauses 1-145, wherein the conversion includes decoding the current video block from the bitstream.

Clause 148. An apparatus for video processing comprising a processor and a non-transitory memory with instructions thereon, wherein the instructions upon execution by the processor, cause the processor to perform a method in accordance with any of clauses 1-147.

Clause 149. A non-transitory computer-readable storage medium storing instructions that cause a processor to perform a method in accordance with any of clauses 1-147.

Clause 150. A non-transitory computer-readable recording medium storing a bitstream of a video which is generated by a method performed by an apparatus for video processing, wherein the method comprises: determining motion information of a current video block of the video, the current video block being coded with at least one of: an intra block copy (IBC) merge mode, an IBC with template matching mode, or an intra template matching mode; updating the motion information based on a constraint, the constraint indicating a target value of a component of the motion information; and generating the bitstream based on the updated motion information.

Clause 151. A method for storing a bitstream of a video, comprising: determining motion information of a current video block of the video, the current video block being coded with at least one of: an intra block copy (IBC) merge mode, an IBC with template matching mode, or an intra template matching mode; updating the motion information based on a constraint, the constraint indicating a target value of a component of the motion information; generating the bitstream based on the updated motion information; and storing the bitstream in a non-transitory computer-readable recording medium.

Clause 152. A non-transitory computer-readable recording medium storing a bitstream of a video which is generated by a method performed by an apparatus for video processing, wherein the method comprises: determining a reference template of a current video block of the video based on coding information of the current video block, the current video block being coded with a sample reordering mode; and generating the bitstream based on the reference template.

Clause 153. A method for storing a bitstream of a video, comprising: determining a reference template of a current video block of the video based on coding information of the current video block, the current video block being coded with a sample reordering mode; generating the bitstream based on the reference template; and storing the bitstream in a non-transitory computer-readable recording medium.

Clause 154. A non-transitory computer-readable recording medium storing a bitstream of a video which is generated by a method performed by an apparatus for video processing, wherein the method comprises: determining a first plurality of samples in a first template associated with a current video block of the video, the current video block being coded with a sample reordering mode; reordering the first plurality of samples; determining a cost by comparing the first plurality of samples with a second plurality of samples in a second template associated with the current video block; and generating the bitstream based on the cost.

Clause 155. A method for storing a bitstream of a video, comprising: determining a first plurality of samples in a first template associated with a current video block of the video, the current video block being coded with a sample reordering mode; reordering the first plurality of samples; determining a cost by comparing the first plurality of samples with a second plurality of samples in a second template associated with the current video block; generating the bitstream based on the cost; and storing the bitstream in a non-transitory computer-readable recording medium.

Clause 156. A non-transitory computer-readable recording medium storing a bitstream of a video which is generated by a method performed by an apparatus for video processing, wherein the method comprises: determining a sample reordering mode for a current video block of the video based on at least one of: a syntax element in the bitstream, or a template cost of the current video block; and generating the bitstream based on the sample reordering mode.

Figure 15:
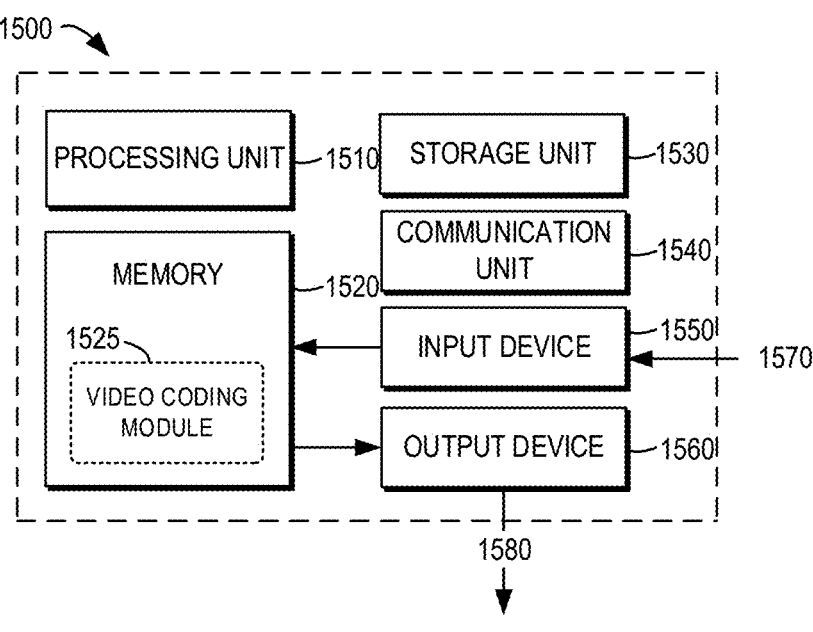
FIG. 15 illustrates a block diagram of a computing device in which various embodiments of the present disclosure can be implemented.

Clause 157. A method for storing a bitstream of a video, comprising: determining a sample reordering mode for a current video block of the video based on at least one of: a syntax element in the bitstream, or a template cost of the current video block; generating the bitstream based on the sample reordering mode; and storing the bitstream in a non-transitory computer-readable recording medium.
Example Device FIG. 15 illustrates a block diagram of a computing device 1500 in which various embodiments of the present disclosure can be implemented. The computing device 1500 may be implemented as or included in the source device 110 (or the video encoder 114 or 200) or the destination device 120 (or the video decoder 124 or 300).

It would be appreciated that the computing device 1500 shown in FIG. 15 is merely for purpose of illustration, without suggesting any limitation to the functions and scopes of the embodiments of the present disclosure in any manner.

As shown in FIG. 15, the computing device 1500 includes a general-purpose computing device 1500. The computing device 1500 may at least comprise one or more processors or processing units 1510, a memory 1520, a storage unit 1530, one or more communication units 1540, one or more input devices 1550, and one or more output devices 1560.

In some embodiments, the computing device 1500 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 1500 can support any type of interface to a user (such as "wearable" circuitry and the like).

The processing unit 1510 may be a physical or virtual processor and can implement various processes based on programs stored in the memory 1520. In a multi-processor system, multiple processing units execute computer executable instructions in parallel so as to improve the parallel processing capability of the computing device 1500. The processing unit 1510 may also be referred to as a central processing unit (CPU), a microprocessor, a controller or a microcontroller.

The computing device 1500 typically includes various computer storage medium. Such medium can be any medium accessible by the computing device 1500, including, but not limited to, volatile and non-volatile medium, or detachable and non-detachable medium. The memory 1520 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage unit 1530 may be any detachable or non-detachable medium and may include a machine-readable medium such as a memory, flash memory drive, magnetic disk or another other media, which can be used for storing information and/or data and can be accessed in the computing device 1500.

The computing device 1500 may further include additional detachable/non-detachable, volatile/non-volatile memory medium. Although not shown in FIG. 15, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 1540 communicates with a further computing device via the communication medium. In addition, the functions of the components in the computing device 1500 can be implemented by a single computing cluster or multiple computing machines that can communicate via communication connections. Therefore, the computing device 1500 can operate in a networked environment using a logical connection with one or more other servers, networked personal computers (PCs) or further general network nodes.

The input device 1550 may be one or more of a variety of input devices, such as a mouse, keyboard, tracking ball, voice-input device, and the like. The output device 1560 may be one or more of a variety of output devices, such as a display, loudspeaker, printer, and the like. By means of the communication unit 1540, the computing device 1500 can further communicate with one or more external devices (not shown) such as the storage devices and display device, with one or more devices enabling the user to interact with the computing device 1500, or any devices (such as a network card, a modem and the like) enabling the computing device 1500 to communicate with one or more other computing devices, if required. Such communication can be performed via input/output (I/O) interfaces (not shown).

In some embodiments, instead of being integrated in a single device, some or all components of the computing device 1500 may also be arranged in cloud computing architecture. In the cloud computing architecture, the components may be provided remotely and work together to implement the functionalities described in the present disclosure. In some embodiments, cloud computing provides computing, software, data access and storage service, which will not require end users to be aware of the physical locations or configurations of the systems or hardware providing these services. In various embodiments, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 1500 may be used to implement video encoding/decoding in embodiments of the present disclosure. The memory 1520 may include one or more video coding modules 1525 having one or more program instructions. These modules are accessible and executable by the processing unit 1510 to perform the functionalities of the various embodiments described herein.

In the example embodiments of performing video encoding, the input device 1550 may receive video data as an input 1570 to be encoded. The video data may be processed, for example, by the video coding module 1525, to generate an encoded bitstream. The encoded bitstream may be provided via the output device 1560 as an output 1580.

In the example embodiments of performing video decoding, the input device 1550 may receive an encoded bitstream as the input 1570. The encoded bitstream may be processed, for example, by the video coding module 1525, to generate decoded video data. The decoded video data may be provided via the output device 1560 as the output 1580.

While this disclosure has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting.

We claim:

1. A method for video processing, comprising:

determining, for a conversion between a current video block of a video and a bitstream of the video, a reference template of the current video block based on coding information of the current video block, the current video block being coded with a sample reordering mode; and performing the conversion based on the reference template.

2. The method of claim 1, wherein the coding information comprises at least one of:

a sample reordering type of the sample reordering mode, or a template shape of the reference template.

3. The method of claim 1, further comprising: determining motion information of the current video block based on the coding information of the current video block, wherein the motion information comprises one of: a motion vector of the current video block, or a block vector of the current video block, wherein the coding information comprises at least one of: a sample reordering type of the sample reordering mode, a template shape of the reference template, a dimension of the current video block, a dimension of a template of the current video block, a dimension of a partial of the template, a location of the current video block, or a location of the template, wherein the template of the current video block comprises at least one of: a current template of the current video block, or the reference template of the current video block, wherein the dimension of the current video block comprises at least one of: a width of the current video block, or a height of the current video block, wherein the dimension of the template or the dimension of the partial of the template comprises at least one of: a width of the template or a width of the partial of the template, or a height of the template or a height of the partial of the template, or wherein a location of the current video block or a location of the template comprises at least one of: a location of a center sample of the current video block, a location of a center sample of the template, a location of a top-left sample of the current video block, or a location of a top-left sample of the template.

4. The method of claim 1, wherein a current template of the current video block and the reference template of a reference block of the current video block are horizontal templates, a width of the horizontal templates being the same with a width of the current video block, and the sample reordering mode comprises a horizontal flip reordering mode, wherein the current template comprises a neighboring sample above to the current video block, and the reference template comprises a neighboring sample above to the reference block, wherein a location difference between the current template and the current video block is the same with a location difference between the reference template and the reference block, wherein a first horizontal distance between a top-left sample of the current template and a top-left sample of the current video block is the same with a second horizontal distance between a top-left sample of the reference template and a top-left sample of the reference block, and a first vertical distance between the top-left sample of the current template and the top-left sample of the current video block is the same with a second vertical distance between the top-left sample of the reference template and the top-left sample of the reference block, wherein the first and second horizontal distances are zero, and the first and second vertical distances are a height of the current template or the reference template, or wherein a distance between the top-left sample of the current template and the top-left sample of the reference template is the same with a distance between the top-left sample of the current video block and the top-left sample of the reference block.

5. The method of claim 4, wherein at least one of a sample in the current template or a sample in the reference template is flipped, wherein a flip type of the current video block is horizontal flip, and at least one of a sample in the current template or a sample in the reference template is flipped, or wherein a horizontal distance between the current video block and the reference block is the same with a horizontal distance between the current template and the reference template.

6. The method of claim 1, wherein a current template of the current video block and the reference template of a reference block of the current video block are vertical templates, a height of the vertical templates being the same with a height of the current video block, and the sample reordering mode comprises a horizontal flip reordering mode, wherein the current template comprises a neighboring sample left to the current video block, and the reference template comprises a neighboring sample right to the reference block, wherein a location difference between the current template and the current video block is different from a location difference between the reference template and the reference block, wherein a first horizontal distance between a top-left sample of the current template and a top-left sample of the current video block is different from a second horizontal distance between a top-left sample of the reference template and a top-left sample of the reference block, and a first vertical distance between the top-left sample of the current template and the top-left sample of the current video block is the same with a second vertical distance between the top-left sample of the reference template and the top-left sample of the reference block, wherein the first horizontal distance is a width of the current template, and the first vertical distance is zero, wherein the second horizontal distance is a width of the current video block, the reference template being right to the reference block, and the second vertical distance is zero, or wherein a sum of a first distance between the top-left sample of the current template and the top-left sample of the reference template, a width of the current video block and a width of the current template is equal to a second distance between the top-left sample of the current video block and the top-left sample of the reference block.

7. The method of claim 6, wherein at least one of a sample in the current template or a sample in the reference template is flipped, wherein a flip type of the current video block is horizontal flip, and at least one of a sample in the current template or a sample in the reference template is flipped, or wherein a sum of a first horizontal distance between the current video block and the reference block, a width of the current video block and a width of the current template is equal to a second horizontal distance between the current template and the reference template.

8. The method of claim 1, wherein a current template of the current video block comprises a horizontal current template and a vertical current template, the reference template of a reference block of the current video block comprises a horizontal reference template and a vertical reference template, and the sample reordering mode comprises a horizontal flip reordering mode.

9. The method of claim 8, wherein a width of the horizontal current template and a width of the horizontal reference template is the same with a width of the current video block, wherein the current template comprises a neighboring sample above to the current video block and a neighboring sample left to the current video block, and the reference template comprises a neighboring sample above to the reference block and a neighboring sample right to the reference block, wherein a location difference between the horizontal current template and the current video block is the same with a location difference between the horizontal reference template and the reference block, wherein a first horizontal distance between a top-left sample of the horizontal current template and a top-left sample of the current video block is the same with a second horizontal distance between a top-left sample of the horizontal reference template and a top-left sample of the reference block, and a first vertical distance between the top-left sample of the horizontal current template and the top-left sample of the current video block is the same with a second vertical distance between the top-left sample of the horizontal reference template and the top-left sample of the reference block, wherein the first horizontal distance is zero, and the first vertical distance is a height of the horizontal current template, wherein a distance between the top-left sample of the horizontal current template and the top-left sample of the horizontal reference template is equal to a distance between the top-left sample of the current video block and the top-left sample of the reference block, wherein a location difference between the vertical current template and the current video block is different from a location difference between the vertical reference template and the reference block, wherein a third horizontal distance between a top-left sample of the vertical current template and a top-left sample of the current video block is different from a fourth horizontal distance between a top-left sample of the vertical reference template and a top-left sample of the reference block, and a third vertical distance between the top-left sample of the vertical current template and the top-left sample of the current video block is the same with a fourth vertical distance between the top-left sample of the vertical reference template and the top-left sample of the reference block, wherein the third horizontal distance is a width of the vertical current template, and the third vertical distance is zero, wherein the fourth horizontal distance is a width of the current video block, the vertical reference template being right to the reference block, and the fourth vertical distance is zero, wherein at least one of a sample in the horizontal current template or a sample in the horizontal reference template is flipped, wherein at least one of a sample in the vertical current template or a sample in the vertical reference template is flipped, wherein a flip type of the current video block is horizontal flip, and a sample in the horizontal current template and a sample in the vertical current template are flipped, wherein a flip type of the current video block is horizontal flip, and a sample in the horizontal reference template and a sample in the vertical reference template are flipped, or wherein a horizontal distance between the current video block and the reference block is equal to a horizontal distance between the horizontal current template and the horizontal reference template.

10. The method of claim 8, wherein a width of the horizontal current template and a width of the horizontal reference template are the same, a width of the vertical current template and a width of the vertical reference template are the same, and the width of the horizontal current template is equal to a sum of a width of the current video block and a width of the vertical current template, wherein the current template comprises a neighboring sample above to the current video block and a neighboring sample left to the current video block, and the reference template comprises a neighboring sample above to the reference block and a neighboring sample right to the reference block, wherein a location difference between the horizontal current template and the current video block is different from a location difference between the horizontal reference template and the reference block, wherein a first horizontal distance between a top-left sample of the horizontal current template and a top-left sample of the current video block is different from a second horizontal distance between a top-left sample of the horizontal reference template and a top-left sample of the reference block, and a first vertical distance between the top-left sample of the horizontal current template and the top-left sample of the current video block is the same with a second vertical distance between the top-left sample of the horizontal reference template and the top-left sample of the reference block, wherein the first horizontal distance is a width of the vertical current template, and the first vertical distance is a height of the horizontal current template, wherein the second horizontal distance is zero, and the second vertical distance is a height of the horizontal current template, wherein a distance between the top-left sample of the horizontal current template and the top-left sample of the horizontal reference template is equal to a sum of a width of the vertical current template and a distance between the top-left sample of the current video block and the top-left sample of the reference block, wherein a location difference between the vertical current template and the current video block is different from a location difference between the vertical reference template and the reference block, wherein a third horizontal distance between a top-left sample of the vertical current template and a top-left sample of the current video block is different from a fourth horizontal distance between a top-left sample of the vertical reference template and a top-left sample of the reference block, and a third vertical distance between the top-left sample of the vertical current template and the top-left sample of the current video block is the same with a fourth vertical distance between the top-left sample of the vertical reference template and the top-left sample of the reference block, wherein the third horizontal distance is a width of the vertical current template, and the third vertical distance is zero, wherein the fourth horizontal distance is a width of the current video block, the vertical reference template being right to the reference block, and the fourth vertical distance is zero, wherein at least one of a sample in the horizontal current template or a sample in the horizontal reference template is flipped, wherein at least one of a sample in the vertical current template or a sample in the vertical reference template is flipped, wherein a flip type of the current video block is horizontal flip, and a sample in the horizontal current template and a sample in the vertical current template are flipped, wherein a flip type of the current video block is horizontal flip, and a sample in the horizontal reference template and a sample in the vertical reference template are flipped, or wherein a horizontal distance between the horizontal current template and the horizontal reference template is equal to a sum of a width of the vertical current template and a horizontal distance between the current video block and the reference block.

11. The method of claim 1, wherein a current template of the current video block and the reference template of a reference block of the current video block are horizontal templates, a width of the horizontal templates being the same with a width of the current video block, and the sample reordering mode comprises a vertical flip reordering mode, wherein the current template comprises a neighboring sample above to the current video block, and the reference template comprises a neighboring sample below to the reference block, wherein a location difference between the current template and the current video block is different from a location difference between the reference template and the reference block, wherein a first horizontal distance between a top-left sample of the current template and a top-left sample of the current video block is the same a second horizontal distance between a top-left sample of the reference template and a top-left sample of the reference block, and a first vertical distance between the top-left sample of the current template and the top-left sample of the current video block is different from a second vertical distance between the top-left sample of the reference template and the top-left sample of the reference block, wherein the first horizontal distance is zero, and the first vertical distance is a height of the current template, wherein the second horizontal distance is zero, and the second vertical distance is a height of the current video block, the reference template being below to the reference block, wherein a sum of a first distance between the top-left sample of the current template and the top-left sample of the reference template, a height of the current video block and a height of the current template is equal to a second distance between the top-left sample of the current video block and the top-left sample of the reference block, wherein at least one of a sample in the current template or a sample in the reference template is flipped, wherein a flip type of the current video block is vertical flip, and at least one of a sample in the current template or a sample in the reference template is flipped, or wherein a sum of a first vertical distance between the current video block and the reference block, a height of the current video block and a height of the current template is equal to a second vertical distance between the current template and the reference template.

12. The method of claim 1, wherein a current template of the current video block and the reference template of a reference block of the current video block are vertical templates, a height of the vertical templates being the same with a height of the current video block, and the sample reordering mode comprises a vertical flip reordering mode, wherein the current template comprises a neighboring sample left to the current video block, and the reference template comprises a neighboring sample left to the reference block, wherein a location difference between the current template and the current video block is the same with a location difference between the reference template and the reference block, wherein a first horizontal distance between a top-left sample of the current template and a top-left sample of the current video block is the same with a second horizontal distance between a top-left sample of the reference template and a top-left sample of the reference block, and a first vertical distance between the top-left sample of the current template and the top-left sample of the current video block is the same with a second vertical distance between the top-left sample of the reference template and the top-left sample of the reference block, wherein the first and second horizontal distances are a width of the current template or the reference template, and the first and second vertical distances are zero, wherein a distance between the top-left sample of the current template and the top-left sample of the reference template is the same with a distance between the top-left sample of the current video block and the top-left sample of the reference block, wherein at least one of a sample in the current template or a sample in the reference template is flipped, wherein a flip type of the current video block is vertical flip, and at least one of a sample in the current template or a sample in the reference template is flipped, or wherein a vertical distance between the current video block and the reference block is the same with a vertical distance between the current template and the reference template.

13. The method of claim 1, wherein a current template of the current video block comprises a horizontal current template and a vertical current template, the reference template of a reference block of the current video block comprises a horizontal reference template and a vertical reference template, and the sample reordering mode comprises a vertical flip reordering mode.

14. The method of claim 13, wherein a width of the horizontal current template and a width of the horizontal reference template is the same with a width of the current video block, wherein the current template comprises a neighboring sample above to the current video block and a neighboring sample left to the current video block, and the reference template comprises a neighboring sample below to the reference block and a neighboring sample left to the reference block, wherein a location difference between the horizontal current template and the current video block is different from a location difference between the horizontal reference template and the reference block, wherein a first horizontal distance between a top-left sample of the horizontal current template and a top-left sample of the current video block is the same with a second horizontal distance between a top-left sample of the horizontal reference template and a top-left sample of the reference block, and a first vertical distance between the top-left sample of the horizontal current template and the top-left sample of the current video block is different from a second vertical distance between the top-left sample of the horizontal reference template and the top-left sample of the reference block, wherein the first horizontal distance is zero, and the first vertical distance is a height of the horizontal current template, wherein the second horizontal distance is zero, and the second vertical distance is a height of the current video block, the horizontal reference template being below to the reference block, wherein a distance between the top-left sample of the horizontal current template and the top-left sample of the horizontal reference template is equal to a sum of a height of the current video block, a height of the horizontal current template and a distance between the top-left sample of the current video block and the top-left sample of the reference block, wherein a location difference between the vertical current template and the current video block is the same with a location difference between the vertical reference template and the reference block, wherein a third horizontal distance between a top-left sample of the vertical current template and a top-left sample of the current video block is the same with a fourth horizontal distance between a top-left sample of the vertical reference template and a top-left sample of the reference block, and a third vertical distance between the top-left sample of the vertical current template and the top-left sample of the current video block is the same with a fourth vertical distance between the top-left sample of the vertical reference template and the top-left sample of the reference block, wherein the third horizontal distance is a width of the vertical current template, and the third vertical distance is zero, wherein at least one of a sample in the horizontal current template or a sample in the horizontal reference template is flipped, wherein at least one of a sample in the vertical current template or a sample in the vertical reference template is flipped, wherein a flip type of the current video block is vertical flip, and a sample in the horizontal current template and a sample in the vertical current template are flipped, wherein a flip type of the current video block is vertical flip, and a sample in the horizontal reference template and a sample in the vertical reference template are flipped, or wherein a vertical distance between the horizontal current template and the horizontal reference template is equal to a sum of a height of the current video block, a height of the horizontal current template and a vertical distance between the current video block and the reference block.

15. The method of claim 13, wherein a width of the horizontal current template and a width of the horizontal reference template are the same, a width of the vertical current template and a width of the vertical reference template are the same, and the width of the horizontal current template is equal to a sum of a width of the current video block and a width of the vertical current template, wherein the current template comprises a neighboring sample above to the current video block and a neighboring sample left to the current video block, and the reference template comprises a neighboring sample below to the reference block and a neighboring sample left to the reference block, wherein a location difference between the horizontal current template and the current video block is different from a location difference between the horizontal reference template and the reference block, wherein a first horizontal distance between a top-left sample of the horizontal current template and a top-left sample of the current video block is the same with a second horizontal distance between a top-left sample of the horizontal reference template and a top-left sample of the reference block, and a first vertical distance between the top-left sample of the horizontal current template and the top-left sample of the current video block is different from a second vertical distance between the top-left sample of the horizontal reference template and the top-left sample of the reference block, wherein the first horizontal distance is a width of the vertical current template, and the first vertical distance is a height of the horizontal current template, wherein the second horizontal distance is a width of the vertical current template, and the second vertical distance is a height of the current video block, the horizontal reference template being below the reference block, wherein a distance between the top-left sample of the horizontal current template and the top-left sample of the horizontal reference template is equal to a sum of a height of the current video block, a height of the horizontal current template and a distance between the top-left sample of the current video block and the top-left sample of the reference block, wherein a location difference between the vertical current template and the current video block is the same with a location difference between the vertical reference template and the reference block, wherein a third horizontal distance between a top-left sample of the vertical current template and a top-left sample of the current video block is the same with a fourth horizontal distance between a top-left sample of the vertical reference template and a top-left sample of the reference block, and a third vertical distance between the top-left sample of the vertical current template and the top-left sample of the current video block is the same with a fourth vertical distance between the top-left sample of the vertical reference template and the top-left sample of the reference block, wherein the third horizontal distance is a width of the vertical current template, and the third vertical distance is zero, wherein at least one of a sample in the horizontal current template or a sample in the horizontal reference template is flipped, wherein at least one of a sample in the vertical current template or a sample in the vertical reference template is flipped, wherein a flip type of the current video block is vertical flip, and a sample in the horizontal current template and a sample in the vertical current template are flipped, wherein a flip type of the current video block is vertical flip, and a sample in the horizontal reference template and a sample in the vertical reference template are flipped, or wherein a vertical distance between the horizontal current template and the horizontal reference template is equal to a sum of a height of the current video block, a height of the horizontal current template and a vertical distance between the current video block and the reference block.

16. The method of claim 1, wherein the conversion includes encoding the current video block into the bitstream.

17. The method of claim 1, wherein the conversion includes decoding the current video block from the bitstream.

18. An apparatus for processing video data comprising a processor and a non-transitory memory with instructions thereon, wherein the instructions upon execution by the processor, cause the processor to:

determine, for a conversion between a current video block of a video and a bitstream of the video, a reference template of the current video block based on coding information of the current video block, the current video block being coded with a sample reordering mode; and perform the conversion based on the reference template.

19. A non-transitory computer-readable storage medium storing instructions that cause a processor to:

determine, for a conversion between a current video block of a video and a bitstream of the video, a reference template of the current video block based on coding information of the current video block, the current video block being coded with a sample reordering mode; and perform the conversion based on the reference template.

20. A non-transitory computer-readable recording medium storing a bitstream of a video which is generated by a method performed by a video processing apparatus, wherein the method comprises:

determining a reference template of a current video block of the video based on coding information of the current video block, the current video block being coded with a sample reordering mode; and generating the bitstream based on the reference template.

* * * * *